US012018522B2

(12) United States Patent
Lam

(10) Patent No.: US 12,018,522 B2
(45) Date of Patent: *Jun. 25, 2024

(54) MAGNETIC LEVITATING DOOR

(71) Applicant: Tony Lam, Costa Mesa, CA (US)

(72) Inventor: Tony Lam, Costa Mesa, CA (US)

( * ) Notice: Subject to any disclaimer, the term of this patent is extended or adjusted under 35 U.S.C. 154(b) by 634 days.

This patent is subject to a terminal disclaimer.

(21) Appl. No.: 17/245,125

(22) Filed: Apr. 30, 2021

(65) Prior Publication Data

US 2021/0246698 A1 Aug. 12, 2021

Related U.S. Application Data

(63) Continuation of application No. 16/803,907, filed on Feb. 27, 2020, now Pat. No. 11,021,900, which is a continuation-in-part of application No. 16/554,084, filed on Aug. 28, 2019, now Pat. No. 10,597,920.

(60) Provisional application No. 62/892,325, filed on Aug. 27, 2019, provisional application No. 62/861,262, filed on Jun. 13, 2019, provisional application No. 62/861,196, filed on Jun. 13, 2019, provisional application No. 62/846,131, filed on May 10, 2019.

(51) Int. Cl.
*E05D 15/06* (2006.01)
*A47K 3/34* (2006.01)

(52) U.S. Cl.
CPC ............ *E05D 15/0626* (2013.01); *A47K 3/34* (2013.01); *E05D 15/0652* (2013.01); *E05D 2015/0695* (2013.01); *E05Y 2900/114* (2013.01)

(58) Field of Classification Search
CPC .............................................. E05D 2015/0626
See application file for complete search history.

(56) References Cited

U.S. PATENT DOCUMENTS

| | | | |
|---|---|---|---|
| 2,707,098 | A | 4/1955 | Turpin |
| 3,150,548 | A | 9/1964 | Roberts |
| 3,208,253 | A | 9/1965 | Roberts |
| 3,334,442 | A | 8/1967 | Boettcher |
| 3,346,993 | A | 10/1967 | Johnson |

(Continued)

FOREIGN PATENT DOCUMENTS

| | | | |
|---|---|---|---|
| CA | 3044430 | A | 5/2018 |
| CL | 45120 | | 12/2004 |

(Continued)

OTHER PUBLICATIONS

Taiwanese Office Action issued in App. No. TW109113846, dated Jul. 5, 2023, 5 pages.

(Continued)

*Primary Examiner* — Catherine A Kelly
(74) *Attorney, Agent, or Firm* — DANE IP Law PC

(57) ABSTRACT

A magnetically levitating door is disclosed herein. The door may have a bracket having a magnet that is repelled from a magnet of a track. The magnet field of the bracket and the magnet field of the track may have different widths. The track may be disposed adjacent to a door opening. The bracket may have a guard in slidable engagement with the track to limit lateral movement of the magnet of the bracket disposed above and repelling the magnet of the track to levitate the door off of the track while preventing excessive lateral forces on the guard. The bracket may have at least one guide in slidable engagement with the track to secure the engagement of the bracket to the track and maintain vertical alignment of the bracket to the track.

20 Claims, 69 Drawing Sheets

(56) References Cited

U.S. PATENT DOCUMENTS

| | | | |
|---|---|---|---|
| 3,442,051 | A | 5/1969 | Johnson |
| 3,523,437 | A | 8/1970 | Bales, Jr. |
| 3,605,473 | A | 9/1971 | Lyon |
| 3,648,497 | A | 3/1972 | Long, Jr. |
| 4,090,265 | A | 5/1978 | Baus |
| 4,192,100 | A | 3/1980 | Klema |
| 4,575,966 | A | 3/1986 | Gerritsen |
| 4,606,081 | A | 8/1986 | Baus |
| 4,698,876 | A | 10/1987 | Karita |
| 4,876,765 | A | 10/1989 | Karita |
| 5,134,324 | A | 7/1992 | Sakagami |
| 6,832,449 | B2 | 12/2004 | Rennetaud |
| 7,592,720 | B2 | 9/2009 | Busch |
| 7,608,949 | B2 | 10/2009 | Busch |
| 7,752,810 | B2 | 7/2010 | Haab |
| 8,020,346 | B2 | 9/2011 | Singiser |
| 8,051,536 | B2 | 11/2011 | Konecek-Hughes |
| 8,132,653 | B2 | 3/2012 | Flynn |
| 8,646,211 | B2 | 2/2014 | Rosenbeck-Mortensen |
| 8,707,626 | B2 | 4/2014 | Martin |
| 9,433,306 | B2 | 9/2016 | Rainis |
| 9,719,282 | B2 | 8/2017 | Bellei |
| 9,879,458 | B2 | 1/2018 | Gabriel |
| 10,113,348 | B2 | 10/2018 | Lam |
| 10,316,562 | B2 | 6/2019 | Lam |
| 10,577,844 | B2 | 3/2020 | Lam |
| 2001/0011439 | A1 | 8/2001 | Maki |
| 2004/0163354 | A1 | 8/2004 | Esposito |
| 2009/0044916 | A1 | 2/2009 | Singiser |
| 2011/0132698 | A1 | 6/2011 | Yu |
| 2012/0255229 | A1 | 10/2012 | Rosenbeck-Mortensen |
| 2014/0016885 | A1 | 1/2014 | Rainis |
| 2015/0211276 | A1 | 7/2015 | Gabriel |
| 2015/0345198 | A1 | 12/2015 | Bellei |
| 2016/0340952 | A1 | 11/2016 | Brun |
| 2018/0148965 | A1 | 5/2018 | Lam |

FOREIGN PATENT DOCUMENTS

| | | | |
|---|---|---|---|
| CN | 201687320 | U | 12/2010 |
| CN | 202926068 | U | 5/2013 |
| CN | 105484592 | A | 4/2016 |
| CN | 205531884 | U | 8/2016 |
| CN | 205638021 | U | 10/2016 |
| CN | 107780781 | A | 3/2018 |
| CO | 11139184 | | 10/2011 |
| DE | 3622157 | A1 | 1/1987 |
| DE | 3622159 | A1 | 1/1988 |
| DE | 4016948 | A | 11/1991 |
| DE | 4016948 | A1 | 11/1991 |
| DE | 20121499 | | 12/2002 |
| DE | 20121499 | U1 | 12/2002 |
| DE | 102008023511 | A1 | 11/2009 |
| DE | 201120001534 | | 3/2011 |
| DE | 102012015708 | A1 | 2/2014 |
| DE | 202016103716 | U1 | 7/2016 |
| EP | 0241063 | | 10/1987 |
| EP | 0241063 | A1 | 10/1987 |
| EP | 1082511 | | 3/2001 |
| EP | 2995761 | | 3/2016 |
| ES | 1212346 | U | 5/2018 |
| JP | 2002220179 | A | 8/2002 |
| JP | 2004204483 | | 7/2004 |
| JP | 2004204483 | A | 7/2004 |
| JP | 2014234615 | A | 12/2014 |
| KR | 20110090208 | A | 8/2011 |
| WO | 200509772 | | 4/2006 |
| WO | 200513394 | | 7/2006 |
| WO | 2009023083 | A1 | 2/2009 |
| WO | 2011016114 | | 2/2011 |
| WO | 2011016114 | A | 2/2011 |
| WO | 2011016114 | A1 | 2/2011 |
| WO | 2011090369 | A1 | 7/2011 |
| WO | 2011142780 | | 11/2011 |
| WO | 2011142780 | A1 | 11/2011 |

OTHER PUBLICATIONS

Search Report issued in App. No. AEP6000709/19, dated Jun. 20, 2023, 10 pages.

International Preliminary Report on Patentability for App. No. PCT/US2020/028562, dated Nov. 16, 2021, 7 pages.

Egyptian Examination Report for App. No. 727/2019, dated Oct. 12, 2021, 3 pages.

Chinese Office Action for App. No. CN201780050876.9, dated Nov. 22, 2021, 6 pages.

Colombian Office Action for App. No. NC2019/0005097, dated Jul. 6, 2021, 10 pages.

Mexican Office Action issued for App. No. MX/a/2019/005807, dated Aug. 8, 2022, 4 pages.

Israeli Office Action issued in App. No. NC 266684, dated Mar. 9, 2022, 3 pages.

Brazilian Office Action issued in App. No. BR112019010078-4, dated May 20, 2022, 4 pages.

Chinese Office Action (including English translation) issued in App. No. CN201780050876.9, dated Feb. 21, 2022, 6 pages.

Mexican Office Action (including partial English translation) issued for App. No. MX/a/2019/005807, dated Feb. 28, 2022, 3 pages.

IP Office of Singapore Notice of Intention to Refuse Patent Application and Examination Report issued for App. No. SG11201901349Q, dated Mar. 1, 2022, 8 pages.

Machine translation of CN201687320U.

Chinese Office Action for App. No. CN201780050876.9, dated Apr. 16, 2021, 8 pages.

Machine translation of JP 2004-204483A.

Korean Office Action issued in App. No. KR10-2019-7005097, dated Jul. 6, 2022, 8 pages.

Machine translation of JP 2002220179A.

Floating Door System, Mondoor, Brochure, Published at least as early as Sep. 2012.

International Search Report on related PCT application (PCT/US2017/062633) from International Searching Authority (RU) dated Feb. 21, 2018.

Written Opinion on related PCT application (PCT/US2017/062633) from International Searching Authority (RU) dated Feb. 21, 2018.

International Preliminary Report on Patentability on related PCT application (PCT/US2017/062633) from International Searching Authority (RU) dated May 28, 2019.

Chilean Office Action and Search Report for corresponding CL Application No. 201901347 dated Mar. 9, 2020 (13 pages).

International Search Report and Written Opinion on related PCT application (PCT/US2020/028562) from International Searching Authority (RU) dated Jun. 25, 2020.

IP Office of Singapore Search Report and Written Opinion for App. No. 11201901349Q, dated Sep. 10, 2020, 14 pages.

Colombian Office Action and Search Report for App. No. NC2019/0005097, dated Sep. 23, 2020, 15 pages.

Indian Examination Report for App. No. IN201927006746, dated Mar. 12, 2021, 6 pages.

Office Action for Indonesia Patent App. No. PID201901509, dated Apr. 5, 2021, 2 pages.

IP Office of Singapore Written Opinion for App. No. 11201901349Q, dated Apr. 1, 2021, 8 pages.

Philippines Office Action for App. No. 1-2019-500364, dated Apr. 29, 2021, 5 pages.

Mexican Office Action issued for App. No. MX/a/2019/005807, dated Mar. 23, 2023, 7 pages.

European Patent Office Communication pursuant to Article 94(3) EPC issued in App. No. EP17874212, dated May 2, 2023, 4 pages.

Japanese Office Action for App. No. JP2019-548864, dated Sep. 21, 2021, 7 pages.

Extended European Search Report issued in App. No. EP20804934, dated Jan. 2, 2023, 8 pages.

Examination Report issued in App. No. KW/PCT/167/2019, dated Jul. 28, 2021, 4 pages.

IL Office Action issued in App. No. IL287778, dated Mar. 28, 2024, 3 pages.

MAGNETIC LEVITATING DOOR

CROSS-REFERENCE TO RELATED APPLICATIONS

This application is a continuation of U.S. application Ser. No. 16/803,907, filed on 2020 Feb. 27, which is a continuation-in-part of U.S. application Ser. No. 16/554,084, filed on 2019 Aug. 28, which claims the benefit of U.S. Provisional Application No. 62/846,131, filed on 2019 May 10, U.S. Provisional Application No. 62/861,196, filed on 2019 Jun. 13, U.S. Provisional Application No. 62/861,262, filed on 2019 Jun. 13, and U.S. Provisional Application No. 62/892,325, filed on 2019 Aug. 27, the entire contents of which are incorporated herein by reference.

STATEMENT RE: FEDERALLY SPONSORED RESEARCH/DEVELOPMENT

Not Applicable

BACKGROUND

The various aspects and embodiments described herein relate to a mechanism for a sliding door.

A sliding door may have a track on which the door slides to traverse the door between an opened and closed position. The rolling friction between the track and the door may be excessive due to doors that are very heavy. In this instance, it may be difficult to traverse the door between the closed and opened positions. Moreover, the very heavy door may cause other failures because of the repetitive and cyclical opening and closing of the door over a long period of time.

Accordingly, there is a need in the art for improved mechanism for a sliding door.

BRIEF SUMMARY

This application is related to U.S. patent application Ser. No. 16/392,347, filed on Apr. 23, 2019, U.S. patent application Ser. No. 16/032,455, filed on Jul. 11, 2018, U.S. Prov. Pat. App. No. 62/525,118, filed on Jun. 26, 2017, and U.S. Prov. Pat. App. No. 62/427,024, filed on Nov. 28, 2016, the entire contents of which are expressly incorporated by reference herein.

A track that extends across the door opening and a door that magnetically engages the track are disclosed herein. The door does not physically contact the track and if the door does physically contact the track, only a small fraction of the weight of the door is transferred to the track. In this regard, the lack of physical contact between the track and the door allows the door to be traversed smoothly between the opened and closed positions and the rolling friction between the door and the track is substantially eliminated or minimized. The track and the door may have magnets that repel each other and lift the door away from the track so that the door does not contact the track. A stabilizing roller may also be utilized so that the door and the track remain aligned as the door is traverse between the opened and closed positions.

More particularly, a door assembly with a door disposable in front of a door opening and traversable between an open position and closed position is disclosed. The door assembly may comprise the door, a bracket, a first magnet, a track, a second magnet and a stabilizing roller. The door may slide to the open and closed positions. The first door may define a length. The bracket may be attached to the first door. The first magnet may be attached to the bracket. The first magnet may have a length less than the length of the first door. The track may be disposed adjacent to the door opening. The track may define a length about two times a length of the first door. The bracket may be slidably mounted to the track. The second magnet may be attached to the track. The second magnet may have a length greater than a length of the door. The first and second magnets may be vertically aligned to each other. The stabilizing roller may be attached to the track and disposed within the track for vertically aligning the first and second magnets as the door is traversed between the open and closed positions.

The bracket may comprise first and second brackets disposed on either side of a vertical midline of the door.

The second magnet may be about greater than 80% of a length of the track.

The track may be embedded into a threshold of the structure surrounding the door opening. The track may be attached to left and right posts and/or header of the door which define the door opening.

The track may comprise a base and an insert having a cavity for receiving the second magnet. The insert may be inserted into a cavity defined by the base. The base may have a cavity in which a protrusion of the insert is freely insertable, and the protrusion of the insert may be held in place in the cavity of the base with an adhesive.

The first magnet may comprise a plurality of magnets disposed on opposed sides of the door so that the door is balanced on the second magnet.

The second magnet may be a single continuous magnet or a plurality of magnets positioned end to end to suspend the door evenly as the door is traversed between the open and closed positions.

A repelling force of the first and second magnets may be equal a weight of the door. It is also contemplated that the repelling force of the first and second magnets may be less than a weight of the door.

Another aspect of the present disclosure is a door assembly with a door disposable in front of a door opening and traversable between an open position and closed position. The door assembly may comprise the door. The door may be slidable to the open and closed positions. The door may define a length.

The door assembly may further comprise a bracket attached to the door. The door assembly may further comprise a first permanent magnet. The first permanent magnet may comprise a plurality of permanent magnets attached to the bracket. The first permanent magnet may define a length and a width. The first permanent magnet may have north and south poles. The first permanent magnet with may be horizontally transverse to the length of the door.

The door assembly may further comprise a guard attached to the bracket between each of the plurality of permanent magnets. The guard may extend out of the bracket at a direction horizontally transverse to the length of the door.

The door assembly may further comprise a track disposed adjacent to the door opening. The bracket may be slidably mounted to the track.

The door assembly may further comprise a second permanent magnet attached to the track. The second permanent magnet may have north and south poles. The like poles of the first and second permanent magnet may face each other to repulsively lift an entire weight of the door up. The second permanent magnet may have a width horizontally transverse to the length of the door. The second permanent magnet width may be different than the first permanent magnet width. The second permanent magnet may have a length greater than a length of the door. The first and second permanent magnets may be vertically aligned to each other.

The door assembly may further comprise at least one guide attached to the bracket along a direction of the length of the first permanent magnet to slidably mount the bracket to the track and maintain vertical alignment and engagement between the track and bracket as the door is traversed between the open and closed positions. The guard may limit lateral movement of the first permanent magnet relative to the second permanent magnet such that the entire weight of the door is lifted magnetically when the door moves laterally The bracket may comprise first and second brackets disposed on either side of a vertical midline of the door.

The length of the second permanent magnet may be greater than 80% of the length of the track.

The second permanent magnet may be a plurality of permanent magnets. Each permanent magnet of the plurality of permanent magnets may have a length less than the length of the door. The plurality of permanent magnets may collectively have a length greater than the length of the door.

Some of the plurality of permanent magnets of the first permanent magnet may be disposed on opposed sides of the door so that the door is balanced on the second permanent magnet.

The second permanent magnet may be a single continuous permanent magnet or a plurality of permanent magnets positioned end to end to suspend the door evenly as the door is traversed between the open and closed positions.

The repelling force of the first and second permanent magnets may be equal to or less than a weight of the door.

The second permanent magnet may have a width greater or less than the first permanent magnet width.

The guard and the at least one mounting may each have curved surfaces directly and slidably contacting the track.

The door assembly may be a first door assembly. The door assembly may further comprise a second door assembly mirroring the first door assembly about a vertical plane. The door of the first door assembly and the door of the second door assembly may be slidable independent from each other.

The magnetic field of the first permanent magnet may be wider or narrower compared to a magnetic field of the second permanent magnet.

Another aspect of the present disclosure is a door assembly with a cover disposable in front of a door opening and traversable between an open position and closed position. The door assembly may comprise the cover. The cover may be slidable to the open and closed positions. The cover may define a length.

The door assembly may further comprise a bracket attached to the cover.

The door assembly may further comprise a first permanent magnet comprising a plurality of permanent magnets attached to the bracket. The first permanent magnet may define a path as the cover slides between the open and closed positions. The first permanent magnet may define a width horizontally transverse to the path of the moving first permanent.

The door assembly may further comprise a guard attached to the bracket between each of the plurality of permanent magnets. The guard may extend out of the bracket at a direction horizontally transverse to the path of the moving first permanent magnet.

The door assembly may further comprise a guard attached to the bracket between each of the plurality of permanent magnets. The guard may extend out of the bracket at a direction horizontally transverse to the path of the moving first permanent magnet.

The door assembly may further comprise a track disposed adjacent to the door opening. The bracket may be slidably mounted to the track.

The door assembly may further comprise a second permanent magnet attached to the track. The second permanent magnet may define a width horizontally transverse to the first permanent magnet path. The first and second magnets may be vertically aligned. The like poles of the first and second permanent magnets may face each other to repulsively lift the door. Strengths of the first and second permanent magnets may be sufficiently strong to repulsively lift and entire weight of the door.

The door assembly may further comprise at least one guide attached to the bracket along the path of the moving first permanent magnet to slidably mount the bracket to the track and maintain vertical alignment and engagement between the track and bracket as the cover is traversed between the open and closed positions.

The cover may be a door or a curtain.

The track may define a length and the length of the track may be greater than the length of the cover.

The magnetic field of the first permanent magnet may have a first range and the magnetic field of the second permanent magnet may have a second range, the first range being greater or smaller than the second range.

Another aspect of the current disclosure is a method of assembling a cover assembly with a cover disposable in front of a cover opening and traversable between an open position and a closed position. The method may comprise the step of providing the cover. The cover may be slidable to the open and closed positions after assembly of the cover assembly. The cover may define a length.

The method may further comprise the step of providing a bracket attachable to the cover.

The method may further comprise the step of providing a first permanent magnet comprising a plurality of permanent magnets attachable to the bracket. The first permanent magnet may define a path as the cover slides between the open and closed positions. The first permanent magnet may define a width transverse to the path of the moving first permanent magnet.

The method may further comprise the step of providing a guard attachable to the bracket between each of the plurality of permanent magnets.

The method may further comprise the step of providing a track disposable adjacent to the cover opening. The bracket may be slidably mountable to the track. The track may have a recess along a length of the track.

The method may further comprise the step of providing a second permanent magnet attachable to the track. The second permanent magnet may have a length greater than a length of the cover. The first and second permanent magnets may be vertically alignable to each other. The second permanent magnet may define a width transverse to the first permanent magnet path. The width of the second permanent magnet width may be different than the first permanent magnet width.

The method may further comprise the step of providing at least one guide attachable to the bracket.

The method may further comprise the step of attaching the first permanent magnet to the bracket.

The method may further comprise the step of attaching the guard to the bracket between each of the plurality of permanent magnets of the first permanent magnet.

The method may further comprise the step of disposing the track adjacent to the cover opening.

The method may further comprise the step of attaching the at least one guide to the bracket along the path of the moving first permanent magnet.

The method may further comprise the step of slidably mounting the bracket to the track. The track may be in direct contact with the guard and the at least one guide.

The method may further comprise the step of vertically aligning the first and second permanent magnets to each other with like poles of the first and second permanent magnets facing each other. The strengths of the first and second permanent magnets may be sufficiently strong to repulsively lift and entire weight of the door.

The method may further comprise disposing the first and second permanent magnets vertically above each other. The guard may limit lateral movement of the first permanent magnet relative to the second permanent magnet such that the door is repulsively lifted when the door moves laterally.

The second permanent magnet may be a plurality of permanent magnets. Each permanent magnet of the plurality of permanent magnets may have a length less than the length of the cover. The plurality of permanent magnets may collectively have a length greater than the length of the cover.

Some of the plurality of permanent magnets of the first permanent magnet may be disposed on opposed sides of the cover so that the cover is balanced on the second permanent magnet.

The second permanent magnet may be a single continuous permanent magnet or a plurality of permanent magnets positioned end to end to suspend the cover evenly as the cover is traversed between the open and closed positions.

The step of providing the first permanent magnet and the step of providing the second permanent magnet may include the step of providing the first permanent magnet with a magnetic field wider or narrower than a magnetic field of the second permanent magnet.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
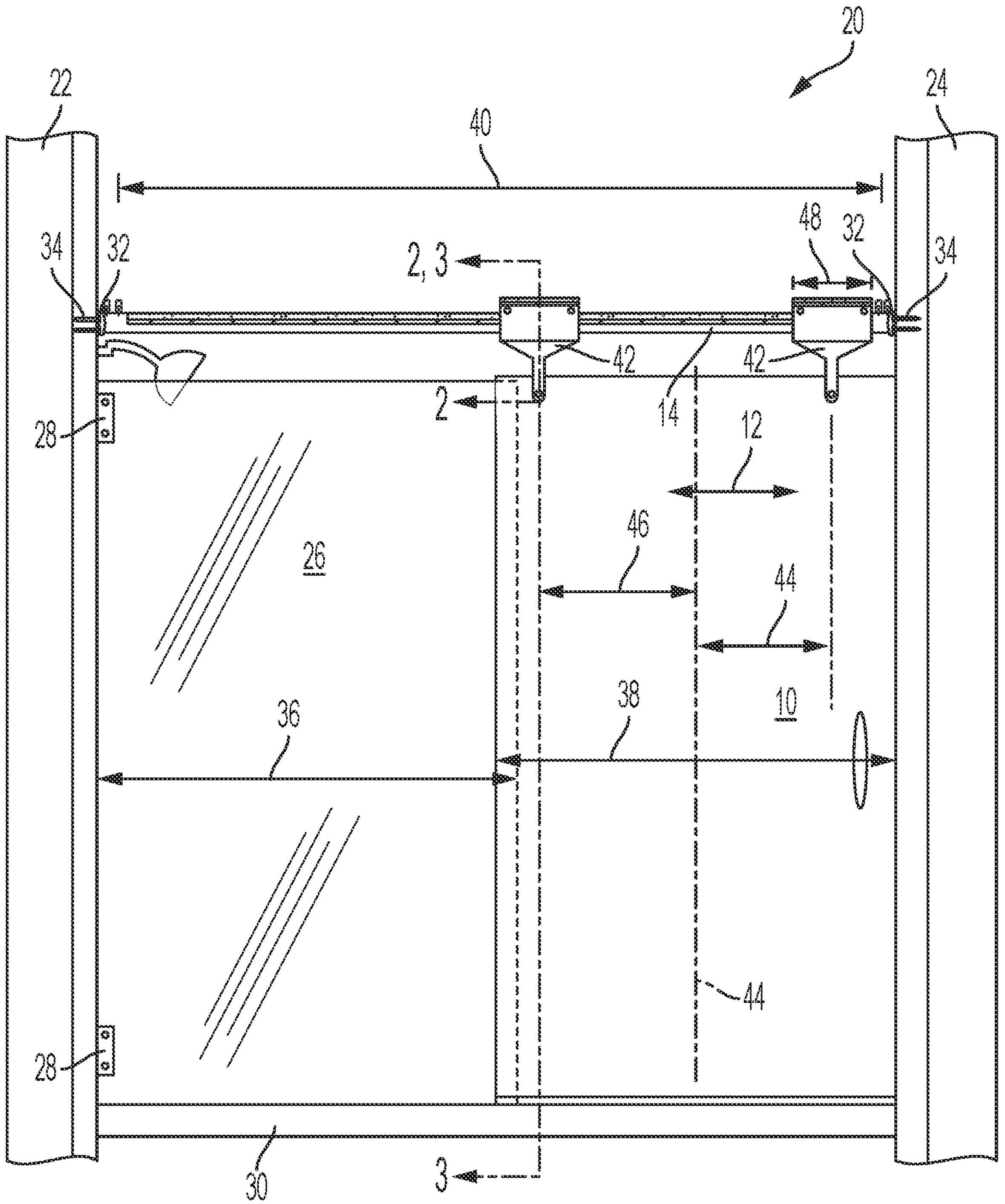
FIG. 1 is a front view of a first embodiment of a shower door.

Referring now to the drawings, a magnetically levitated shower glass door 10, 100, 200, 300, 400, 500, 600, 700, 800 is shown. The glass door 10, 100, 200, 300, 400, 500, 600, 700, 800 may be slid horizontally in the direction of arrow 12 on track 14, 114, 214, 314, 414, 514, 614, 714, 814. The glass door 10, 100, 200, 300, 400, 500, 600, 700, 800 may have a short magnet 16, 116, 216, 316, 416, 516, 616, 716, 816. The track 14, 114, 214, 314, 414, 514, 614, 714, 814 may have a long magnet 18, 118, 218, 318, 418, 518, 618, 718. The magnets 16, 116, 216, 316, 416, 516, 616, 716 may be repelled by the magnets 18, 118, 218, 218, 318, 418, 518, 618, 718 to vertically lift the glass door 10, 100, 200, 300, 400, 500, 600, 700 so that as the glass door 10, 100, 200, 300, 400, 500, 600, 700 moves horizontally in the direction of arrow 12, 112, 212, 312, 412, 512, 612, 712 and the weight of the glass door 10, 100, 200, 300, 400, 500, 600, 700 is transferred to the track 14, 114, 214, 314, 414, 514, 614, 714 through the short magnets 16, 116, 216, 316, 416, 516, 616, 716 and the long magnets 18, 118, 218, 318, 418, 518, 618, 718. A minimal amount of contact occurs between the track 14, 114, 214, 314, 414, 514, 614, 714 and the glass door 10, 100, 200, 300, 400, 500, 600, 700 so that the horizontal movement of the glass door 10, 100, 200, 300, 400, 500, 600, 700 is quiet and smooth.

Figure 2:
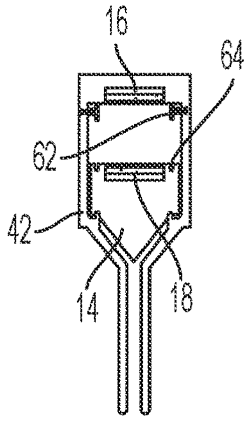
FIG. 2 is a cross-sectional view of a glass door, track and bracket of the shower door shown in FIG. 1.
Figure 3:
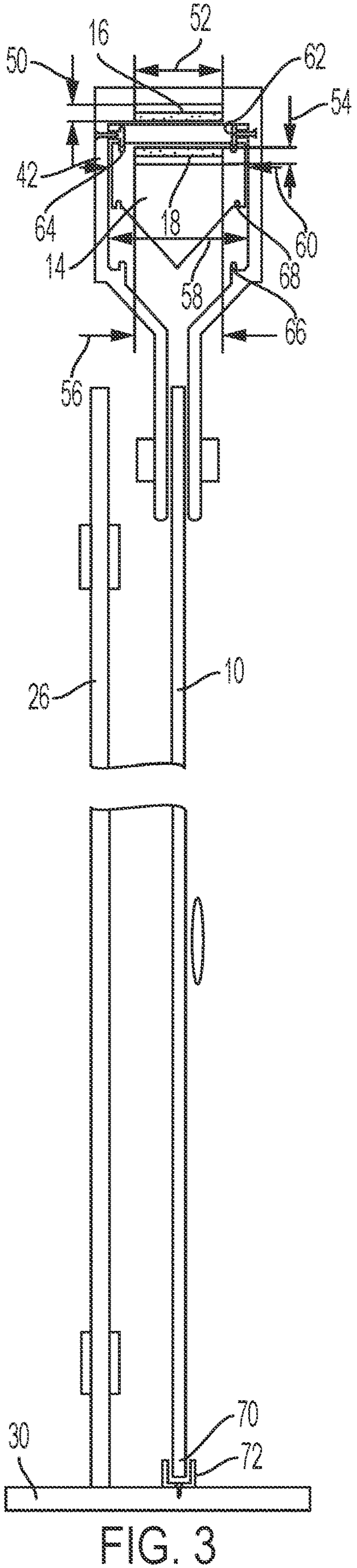
FIG. 3 is a cross-sectional view of the shower door shown in FIG. 1.

Referring now to FIGS. 1-3, a shower 20 is shown. The shower 20 has opposed first and second walls 22, 24. The shower also has a stationary glass door 26 that is secured to the first wall 22 with brackets 28. A bottom edge of the glass door 26 is also connected to a sill 30. The stationary glass door 26 is also offset from the sliding glass door 10 as shown in FIG. 3. This allows the glass door 10 to move to the left as shown in FIG. 1 and allow a person to walk through the door opening and into the shower 20. As the glass door 10 is slid to the left and the glass door 10 being magnetically lifted up, the movement of the glass door 10 is quiet and smooth.

The track 14 extends from the first wall 22 to the second wall 24 and is secured with a bracket 32 (see FIG. 2) with a fastener. Referring now to FIG. 3, the track 14 may have a magnet 18 that extends along the length of the track 14. More particularly, the magnet 18 extends along the track 14 to the extent that the sliding door 10 needs to slide so that a person can enter through a door opening to enter the shower 20. In the example shown in FIG. 1, a length 36 of the stationary door 26 is about equal to a length 38 of the sliding door 10 so that the door 10 can be fully slid away. Accordingly, the length 40 of the magnet 18 is about equal to twice or slightly less than twice (e.g., 180%) the length 38 of the sliding door 10.

The sliding door 10 may be attached to at least two brackets 42. The brackets 42 position the magnet 16 above the magnet 18 to lift the door 10 upward due to the repelling force of the magnets 16, 18. Two brackets 42 are needed and are attached to the door 10 on either side of a vertical midline 44 of the door 10 which bisects the length 38 or at a center of gravity of the door 10. Preferably, the brackets 42 are placed equidistantly away from the vertical midline 44 so that each of the brackets 42 and the magnets 16 support the door 10 evenly. In this regard, a distance 44 from the midline 44 to one of the brackets 42 is equal to the distance 46 from the midline 44 to the other one of the brackets 42.

The figures and the description refer to two brackets 42. However, it is also contemplated that the two brackets 42 may be replaced with one long bracket having either two magnets 16 on both sides of the vertical midline 44 of the door 10 or one long magnet 16 that extends to both sides of the vertical midline 44 of the door 10. Preferably, the magnet 16 extends as far to the opposed sides of the door 10 as possible to provide as much balance to the door 10 as it is slid left to right. Additionally, when two magnets 16 are used, it is preferable that the magnets 16 are disposed as far away from the vertical midline 44 or center of gravity as possible. Once again, this is to provide as much balance as possible to the door 10 as the door 10 is being slid left to right.

The magnets 16 of the sliding door 10 are repelled away from the magnet 18. The repelling force of the magnets 16 is sufficiently strong so that the bracket 42 does not physically contact a top of the track 14 but is vertically lifted up due to the magnetic repelling forces. Alternatively, the repelling force of the magnets 16 may be sufficiently weak so that the bracket 42 may physically contact the top of the track 14 but only a small portion of the weight of the glass door 10 is physically supported by contact of the bracket 42 on top of the track 14. That small portion may be between about 1% to 30% of the weight of the glass door 10, and is more preferably about between 1% to 10% of the weight of the glass door 10. Since there are two magnets 16, one magnet 16 for each of the brackets 42, each magnet 16 is sufficiently strong to support half of the weight of the glass door 10. As a further alternative, the repelling force of the magnets 16 may be sufficiently strong so that the bracket 42 may physically contact a bottom of the track 14 and apply about a 2 lbs. to 20 lbs. force. The prongs 66 may be replaced with rollers that ride within the grooves 68.

The repelling force of the magnet 16 to the magnet 18 may be adjusted by increasing or decreasing a length 48 (see FIG. 1), a height 50 and/or a width 52 to respectively increase or decrease the repelling force generated between the magnets 16, 18. Additionally or alternatively, the height 54 and/or the width 56 of the magnet 18 may be adjusted to respectively increase or decrease the repelling force generated between the magnets 16, 18. Any adjustment to the repelling force in the other two embodiments may also be adjusted by increasing or decreasing a length, height or width of the respective magnets and those other embodiments discussed herein.

For example, if the sliding glass door 10 weighs about 50 pounds, then each pair of magnets 16, 18 would produce a repelling force of about 25 pounds. In this way, at least a majority of the weight if not all of the weight of the sliding door 10 is supported by the repelling forces of the magnets 16.

The door 10 may have at least two brackets 42. The bracket 42 may circumscribe the track 14. An internal width 58 may be greater than an external width 60 of the track 14. This allows the bracket 14 to be horizontally traversed left and right in the direction of arrow 12. Moreover, an internal height of the bracket 42 may be greater than an external height of the track 14. The bracket 42 may have at least two rollers 62 that allow the bracket 42 to roll on the track 14. More particularly, the rollers 62 may be aligned to grooves 64 formed along a length of the track 14. The rollers 62 may engage the grooves 64 when the repelling forces created by the magnets 16, 18 are not sufficient to fully lift the door 10. Nevertheless, an insignificant amount of weight may be supported by the rollers 62 because the magnets 16, 18 may be sized to provide repelling forces that carry 80%, and more preferably 95%, if not 100% of the weight of the door 10.

The bracket may have tongues 66 that are aligned to grooves 68 and support the bracket 42 when the door is not mounted to the bracket 42, and the repelling forces created by the magnets 16, 18 drive the bracket 42 upward, as shown in FIG. 2.

The bracket 42 may be fabricated from a metallic material. The brackets 42 may be mounted (i.e., slid on) on the track 14 first, then the track 14 mounted to the first and second walls 22, 24. Thereafter, the glass door 10 may be mounted to the bracket 42. Alternatively, the bracket 42 may be fabricated from a plastic material and the bracket 42 slipped over the track 14 by bending the bracket 42 outward and over the track 14.

The door 10 may define a lower end portion 70 that fits within a guide 72 that extends along the entire sill 30 so that the door 10 remains vertically upright when it is slid left and right.

Figure 4:
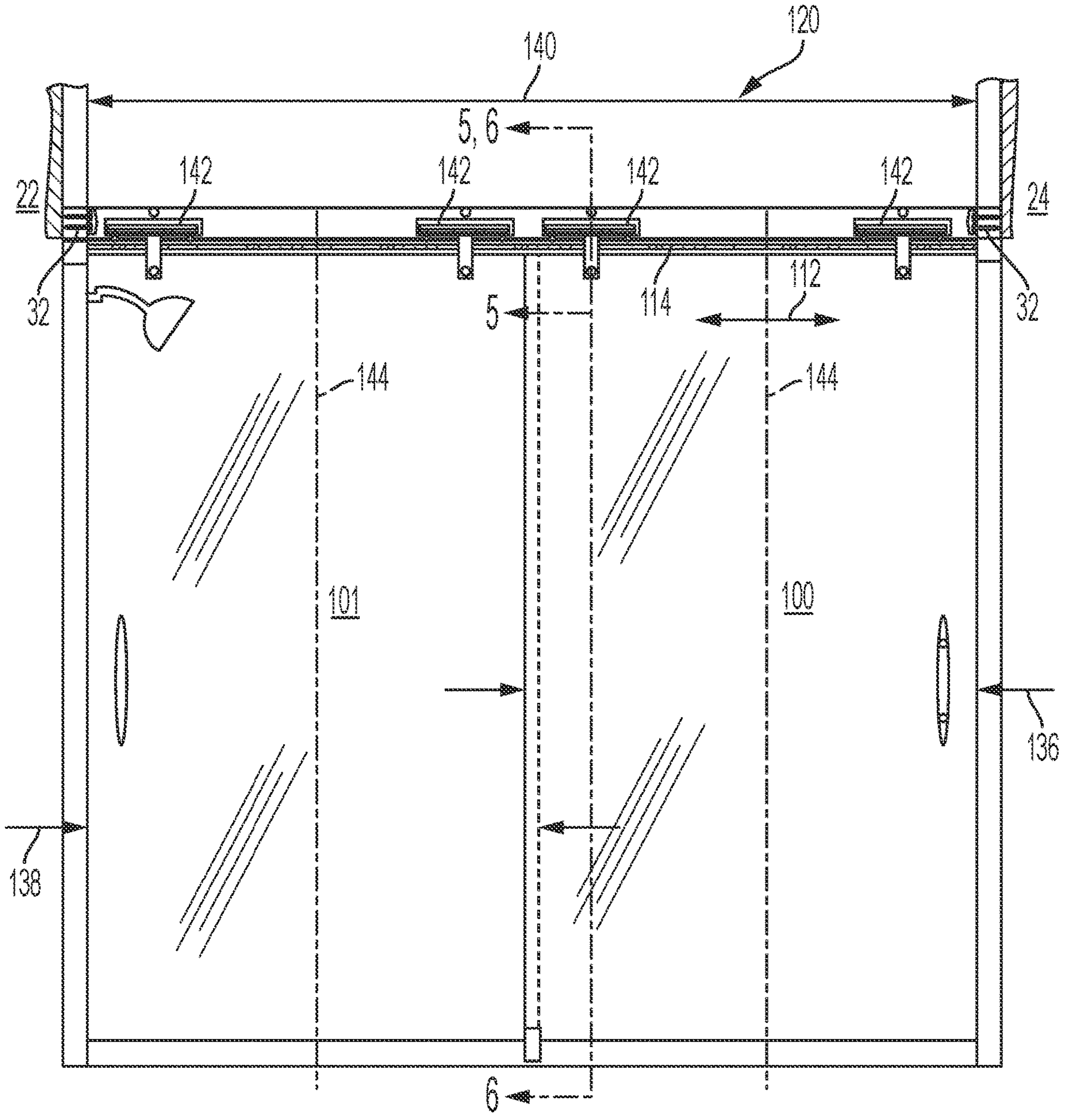
FIG. 4 is a front view of a second embodiment of the shower door.
Figure 5:
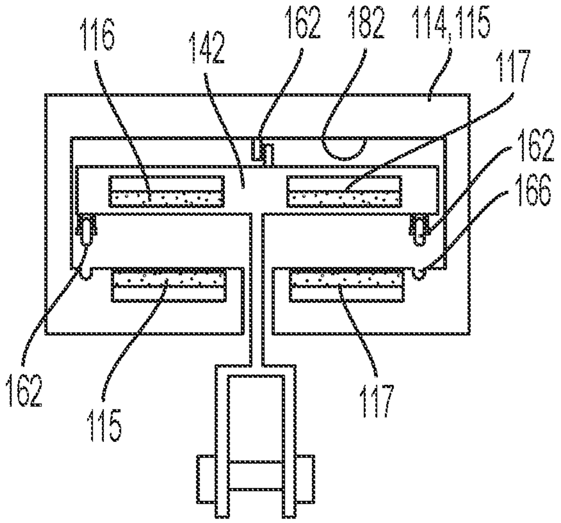
FIG. 5 is a cross-sectional view of a glass door, track and bracket of the shower door shown in FIG. 4.
Figure 6:
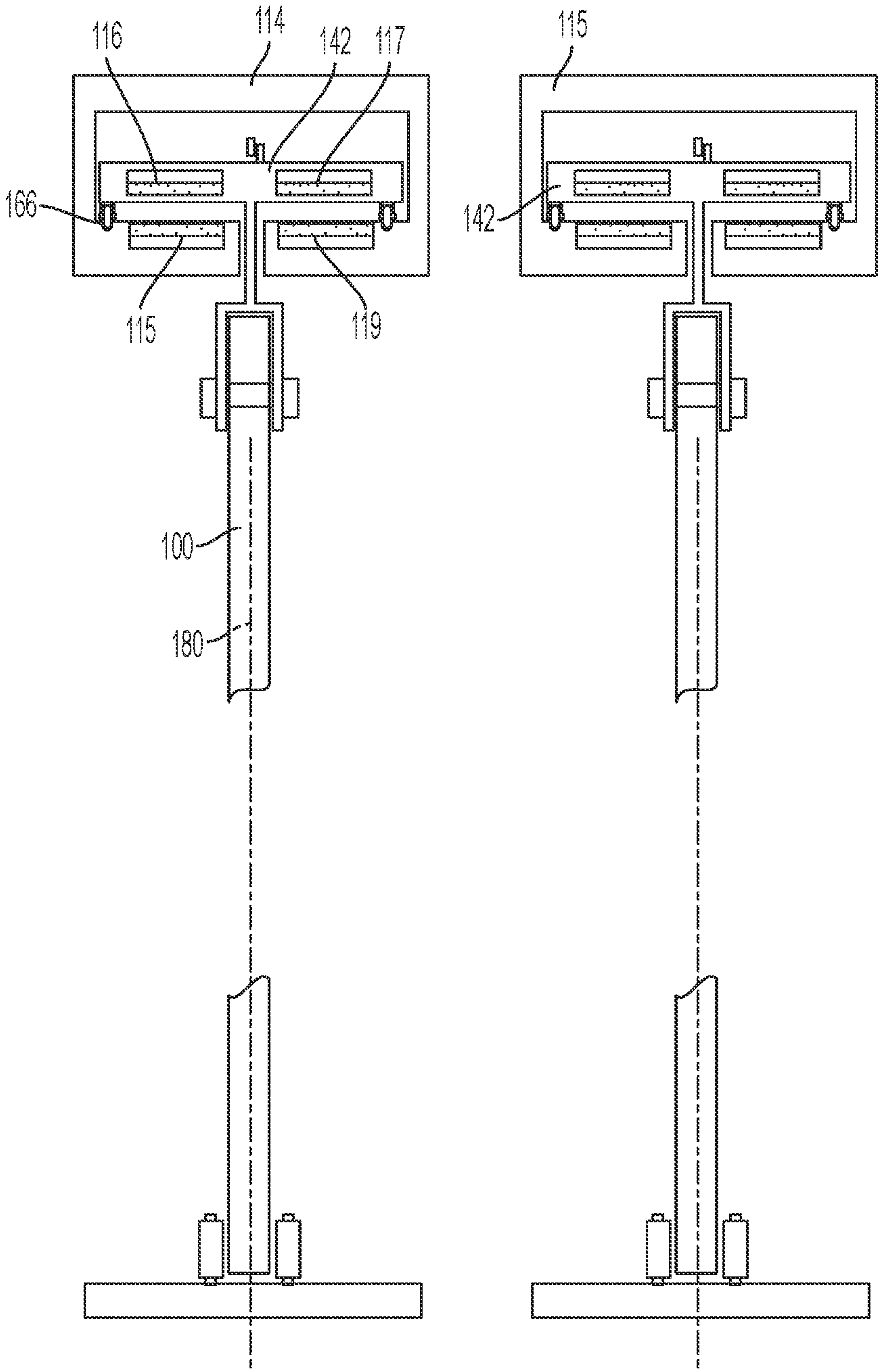
FIG. 6 is a cross-sectional view of the shower door shown in FIG. 4.

Referring now to FIGS. 4-6, a shower 120 is shown. The shower 120 has opposed first and second walls 22, 24. The shower may have the two (2) sliding glass doors 100, 101. It is also contemplated that one of the doors 100, 101 may be stationary while the other door is slidable so that a person can walk into and out of the shower 120. The glass doors 100, 101 are offset from each other, as shown in FIG. 6. Each of the glass doors 100, 101 may have brackets 142 that are slidably received into the tracks 114, 115.

The tracks 114, 115 may extend from the first wall 22 to the second wall and may be secured with a bracket and fastener 132. Referring now to FIG. 6, the tracks 114, 115 may have magnets 218, 219 that extend along the length of the tracks 114, 115. More particularly, the magnets 218, 219 may extend along the tracks 114, 115 to the extent that the sliding doors 100, 101 allow a person to enter through the door opening and into the shower 120. For example, in the shower 120 shown in FIG. 4, a length 136 of the door 100 does not necessarily have to be equal to a length 138 of the door 101. The length 140 of the magnets 218, 219 of the track 114 may be equal to about twice or slightly less than the length 136 of the sliding door 100.

The bracket 142 may have one magnet vertically aligned above a center of gravity of the door 100 or 101. Alternatively, as shown in FIG. 6, there may be two magnets 116, 117 equidistantly spaced apart from each other about a vertical plane 180 of the door 100 or 101.

The tracks 114, 115 may have corresponding magnets 115, 119. These magnets 116, 115 and magnets 117, 119 produce repelling forces that carry about 80%, more preferably 95% to 100% of the weight of the door 100 or 101. Since there are two brackets 42 for each of the doors 100, 101 and there are two magnets 116, 115 and 117, 119 for each bracket 142, each magnet 116, 117 may be designed to carry about 25% of the weight of the door 100 or 101. By way of example and not limitation, the repelling forces may be adjusted by increasing or decreasing a width, height or length of the magnets 116, 115, 117, 119.

The tracks 114, 115 may have internal grooves 166 that receive rollers 162 when the door 100, 101 is mounted to the bracket 114, 115. A majority or all of the weight may be supported by the repelling forces created by the magnets 116, 115 and the magnets 117, 119. In FIG. 6, some of the weight of the door 100, 101 is supported by the rollers 162.

Referring now to FIG. 5, when the door 100, 101 is not attached to the bracket 142, the repelling forces generated by the magnets 116, 115, 117, 119 pushes the bracket 142 and is stopped by the roller 162 which contacts a lower roof 182 of the track 114, 115.

The brackets 142 are mounted equidistantly from a vertical midline 144 of the door 100 or 101.

Figure 7:
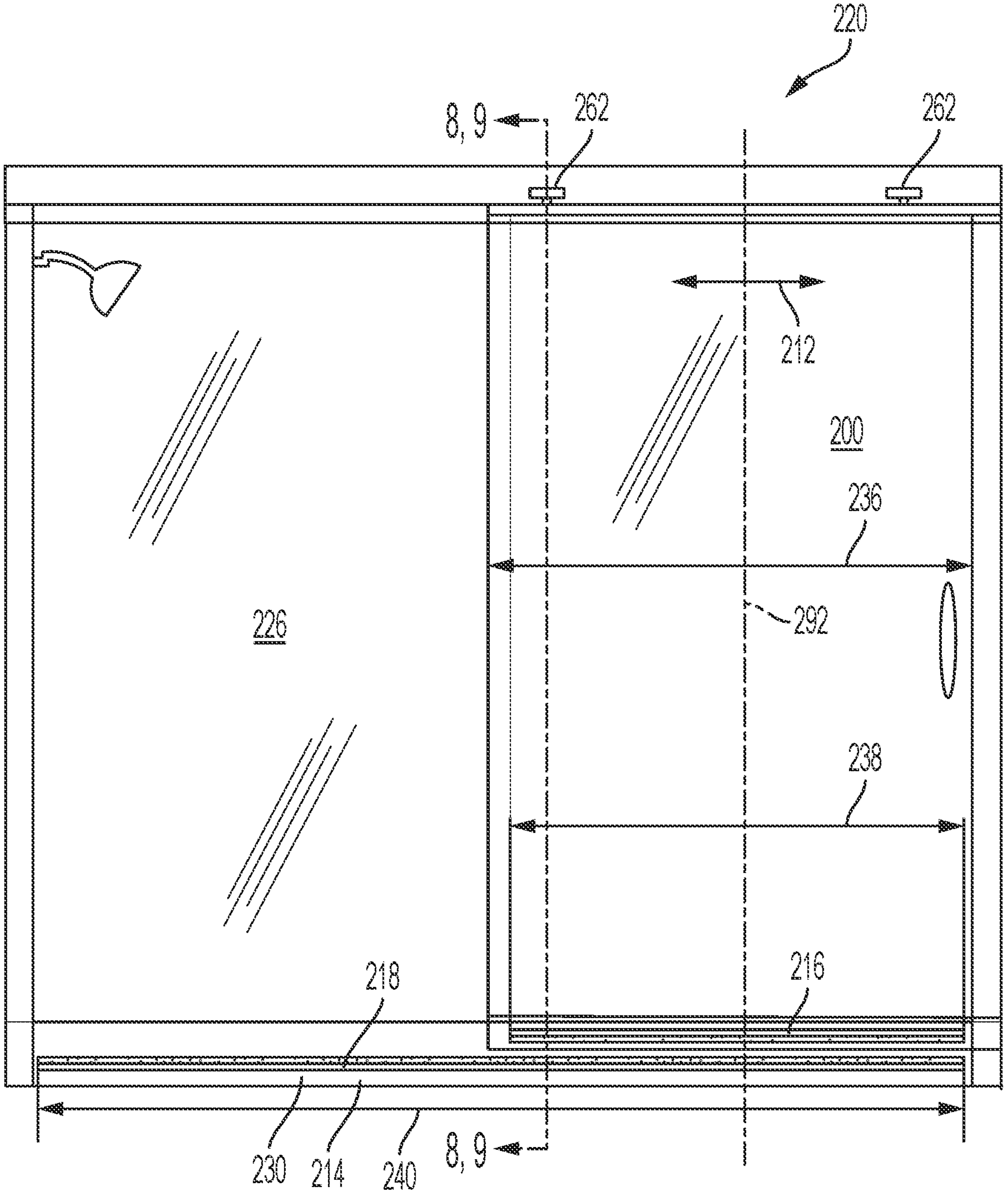
FIG. 7 is a front view of a third embodiment of the shower door.
Figure 8:
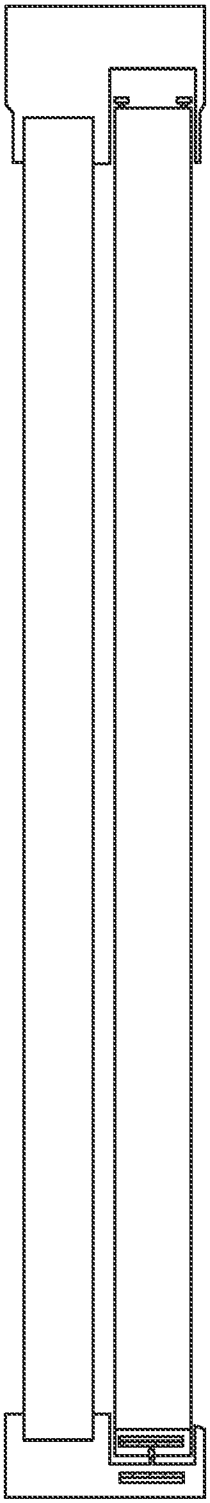
FIG. 8 is a cross-sectional view of a glass door, track and bracket of the shower door shown in FIG. 7.
Figure 9:
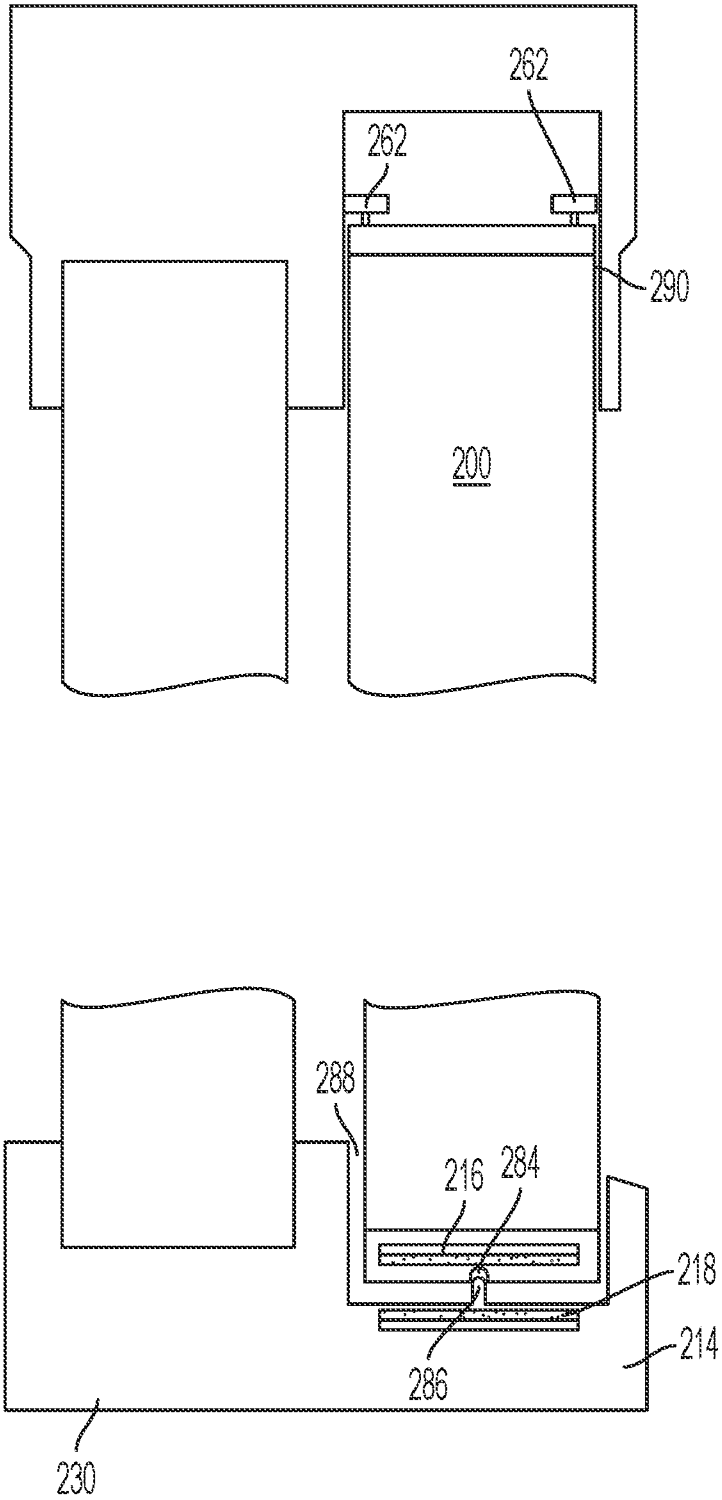
FIG. 9 is a cross-sectional view of the shower door shown in FIG. 7.
Figure 10:
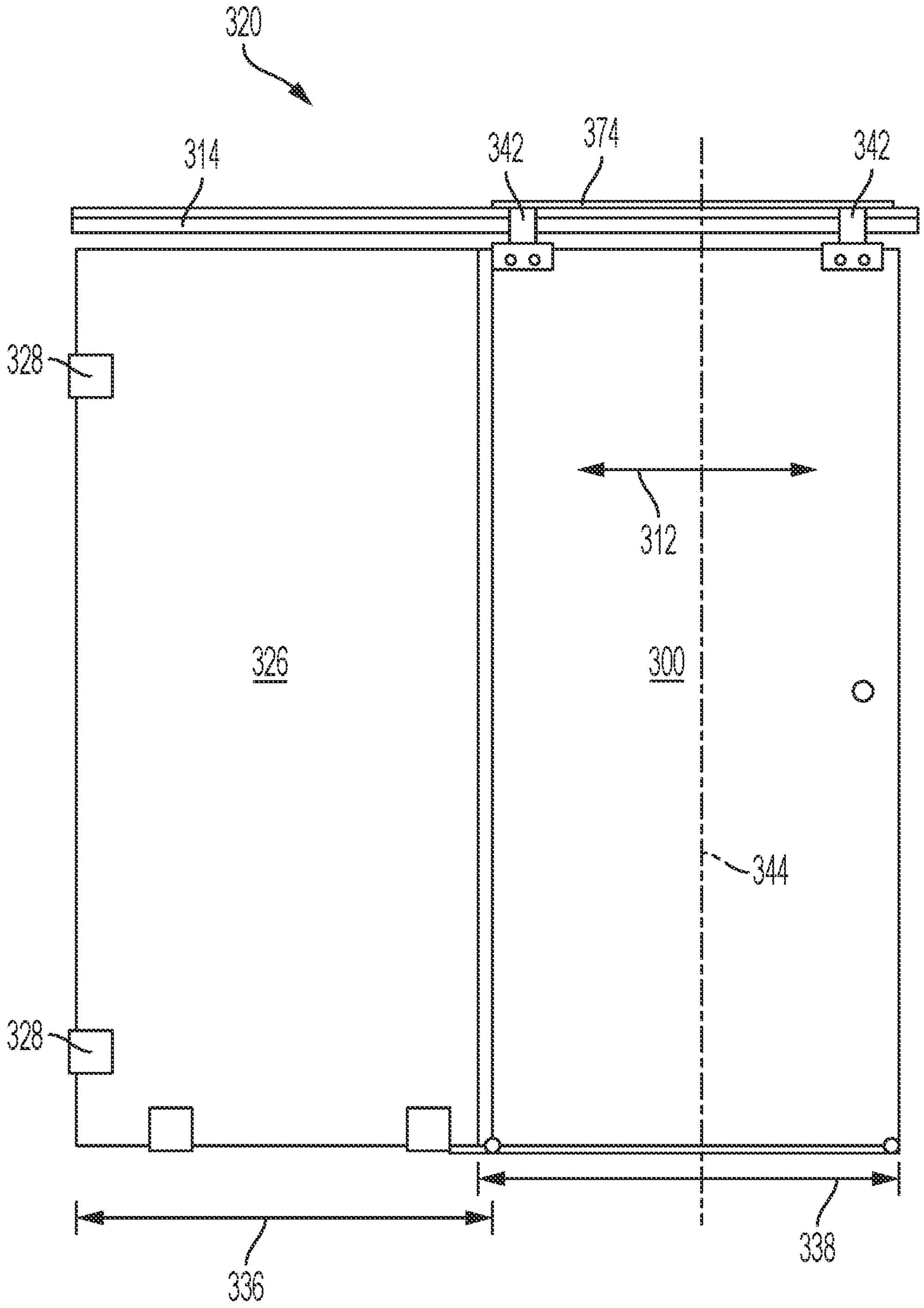
FIG. 10 is a front view of a fourth embodiment of the shower door.
Figure 11:
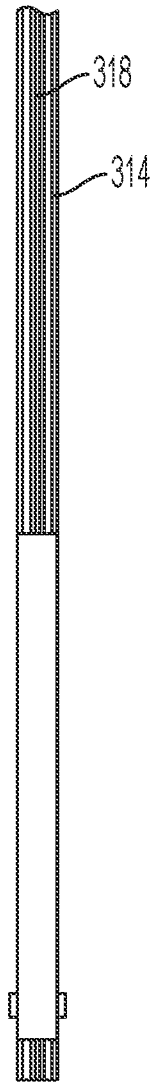
FIG. 11 is a top view of the shower door shown in FIG. 10.
Figure 12:
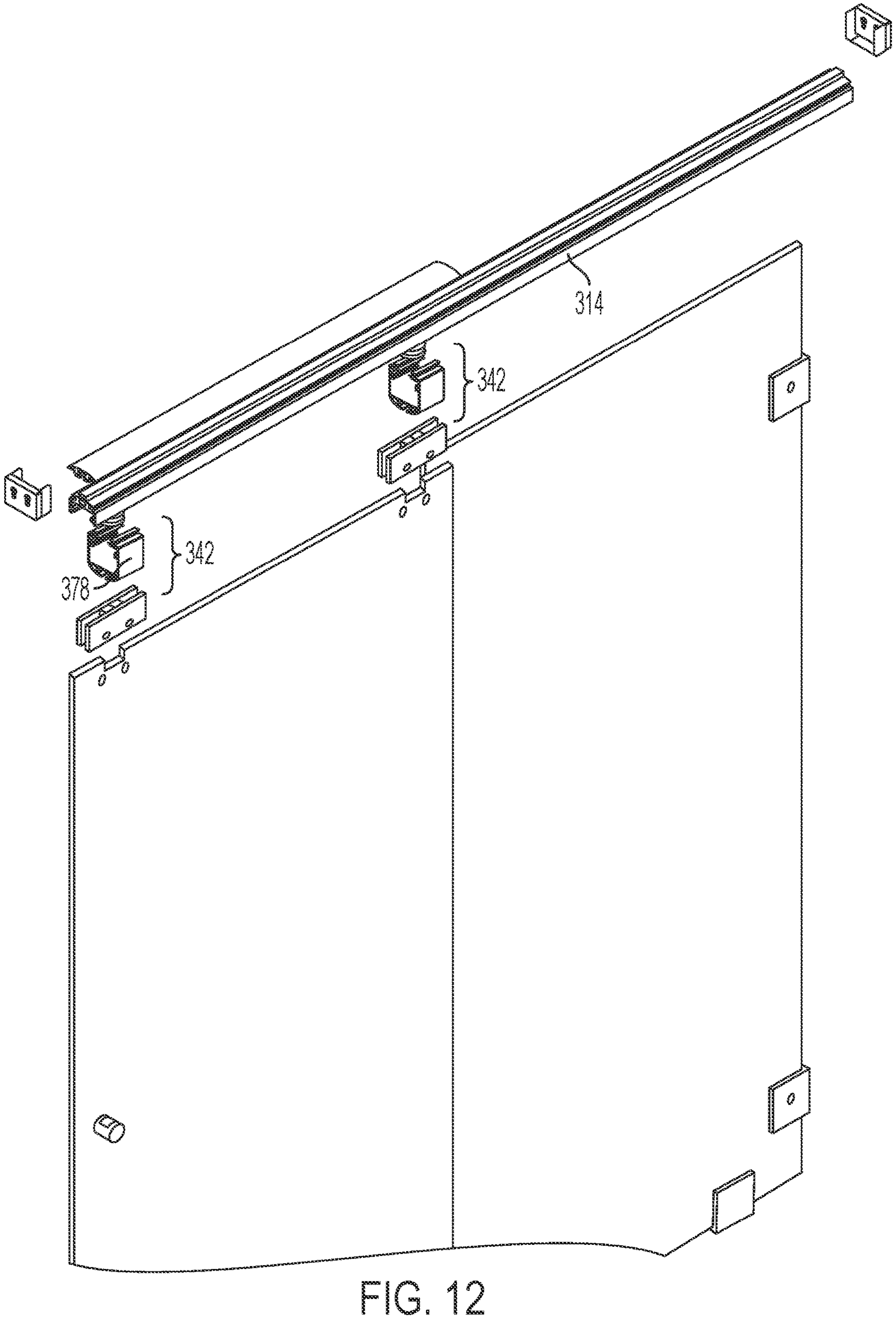
FIG. 12 is an exploded right perspective view of the shower door shown in FIG. 10.
Figure 13:
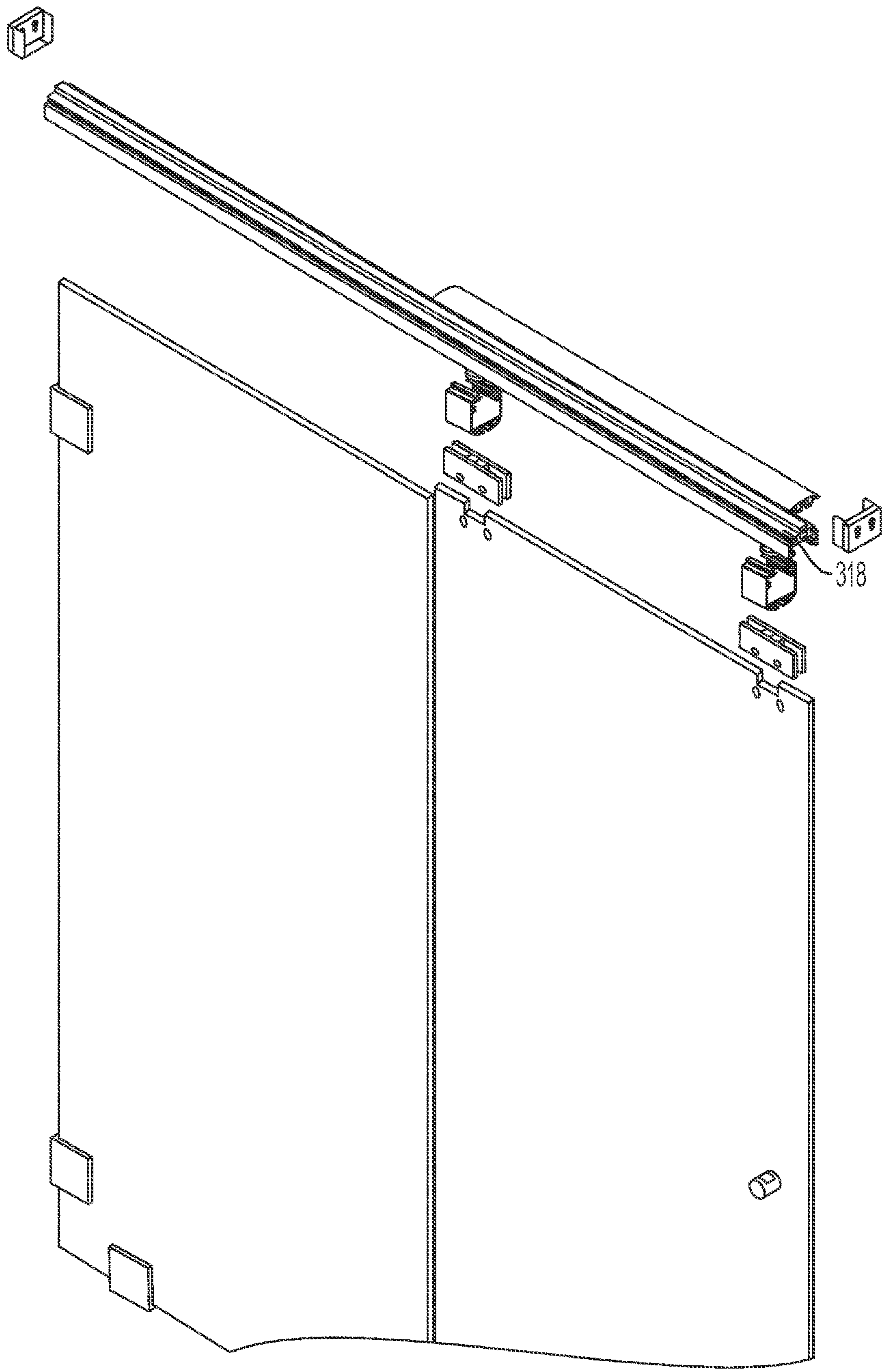
FIG. 13 is an exploded left perspective view of the shower door shown in FIG. 10.
Figure 14:
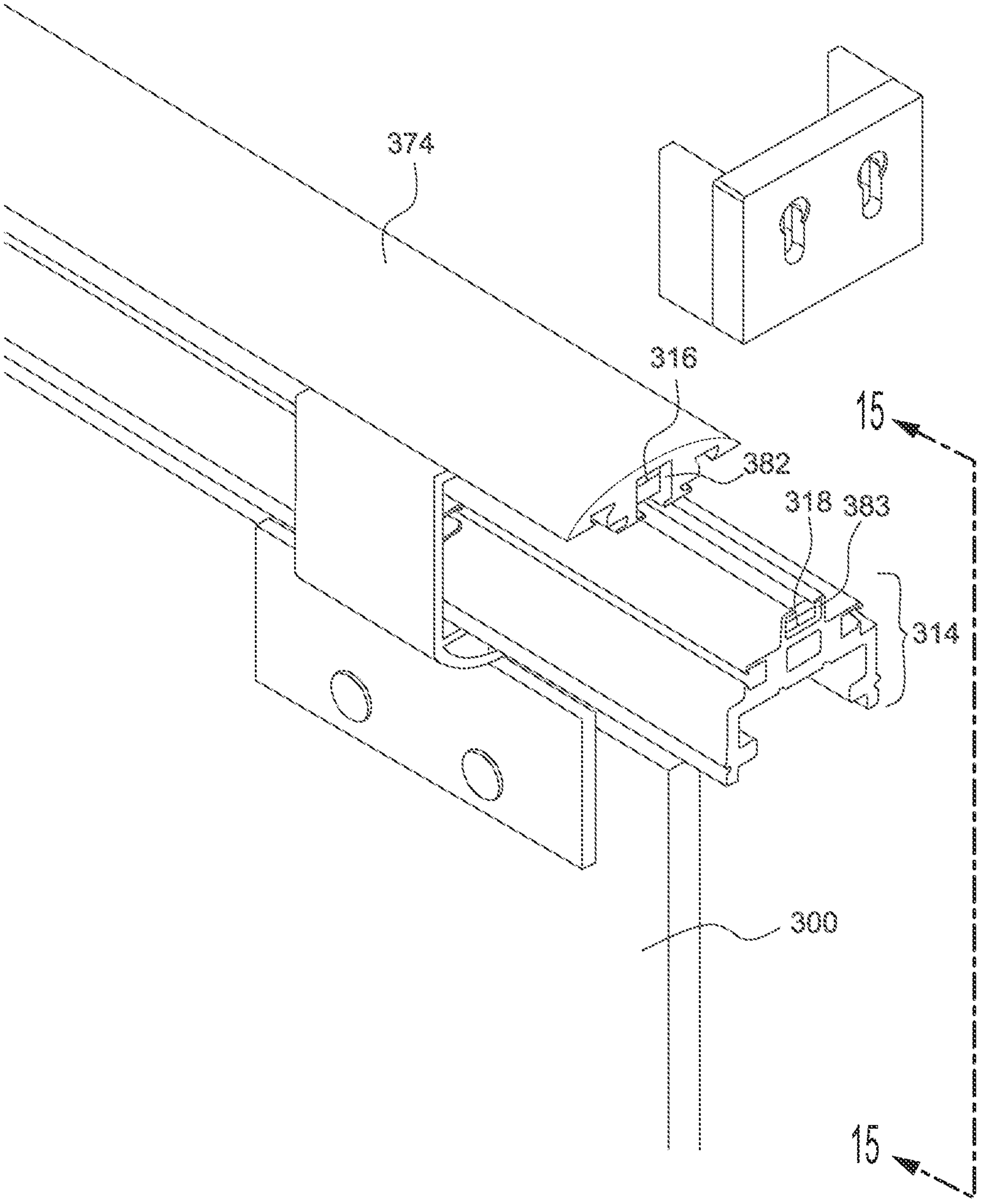
FIG. 14 is an enlarged assembled left perspective view of the shower door shown in FIG. 10.

Referring now to FIGS. 7-9, shower 220 is shown. The shower may have a stationary glass door 226 and a sliding glass door 200. The sliding glass door 200 slides left and right in the direction of arrow 212. The sliding door 200 may be supported by a magnet 216 embedded at a lower end portion of the door 200 and the magnet 218 embedded within a sill 230. The magnet 218 may extend across at least 80% to 90% of the length 240 of the sill 230. The magnet 216 may extend about 80% to 90% of the length 236 of the door 200 so that the magnet 218 and the magnet 216 may evenly lift the door 200 vertically upward. The door 200 may have an elongate slot 284 that fits or receives an elongate tongue 286 formed in the sill 230. The bottom end portion of the door 200 may fit within a U-channel 288. The tongue 286 is sufficiently long so that the repelling forces generated by the magnets 216, 218 do not dislodge the tongue 286 from the groove 284. The upper end portion 280 of the door 200 may be received into a U-channel 290. Rollers 262 may stabilize the upper end portion of the door.

The length 240 of the magnet 218 attached or embedded into the sill 230 may be about equal to twice the length 236 of the glass door 200 that slides back and forth. A length 238 of the magnet 216 disposed at the bottom portion of the glass door 200 may be about 80% to 100% of a length 236 of the glass door 200.

The bottom end of the door 200 may have rollers that roll on a bottom surface of the U-channel 288 so that if the repelling forces created by the magnets 216, 218 are not sufficient to lift the door fully upward, the rollers will support the door and allow the door to slide left to right. The rollers may be placed on both sides of the vertical midline 292 of the door 200 so that the rollers can evenly support the door 200 when it is being slid back and forth.

Additionally, the magnet 216 is shown and described as being a single elongate magnet that extends across more than 50% of a length 236 of the door 200. However, it is also contemplated that the magnet 216 may be a plurality of magnets that are distributed along the length 236 of the door 200 to evenly lift the door 200 upward. By way of example and not limitation, the magnet 216 may be two (2) separate magnets that are placed on both sides of the vertical midline 262 at the lower end portion of the door 200.

The repelling force may be adjusted by adjusting a length, width, height of the magnets 216, 218.

Referring now to the FIGS. 10-15, a shower 320 is shown. The shower head and the walls 22, 24 are not shown for the purposes of clarity. The shower 320 may have a stationary glass door 326 that may be secured to the first wall 22 (not shown) with brackets 328. The stationary glass door 326 may be laterally offset from the sliding glass door 300 so that the sliding glass door 300 may be laterally side to side with the stationary glass door 326 when a user wants to enter the shower or exit the shower 320. The sliding glass door 300 may also be transitioned to the closed position shown in FIG. 10 to prevent water from escaping out of the shower 320 when the shower 320 is in use. As the glass door 300 is slid from the opened position to the closed position, the weight of the glass door 300 may be fully or substantially supported by the repelling forces of the magnets 316, 318 shown in FIG. 14.

The track 314 may extend from the first wall to the second wall and may be secured with a bracket and a fastener. The track 314 may have an elongate magnet 318 that may extend substantially along the length of the track 328 or fully along the entire length of the track 328 so that the magnets 316 are always repelled by the magnet 318 when the door 300 is in the opened position, the closed position or transitioned therebetween. In the example shown in FIG. 10, a length 336 of the stationary door 326 may be about equal to a length 338 of the sliding door so that the door 300 may be fully slid away in the opened position. In this regard, the length of the magnet 318 may be about equal to twice or slightly less than twice the length 338 of the sliding door 300.

The sliding door 300 may be attached to at least two brackets 342 and a top member 374. The top member 374 is long enough to secure the brackets 342 to the top member 374. The brackets 342 may be attached to the sliding door 300 at the upper end portion of the sliding door 300. The top member 374 may be attached to the bracket 342 by way of a tongue and groove connection 376. In particular, the top member 374 may have a V-notch on the left and right sides thereof 374. The brackets 342 may have a housing 378 with matching V-configured tongues. The V-configured tongues may slide into the V-configured notch of the top member 374 and be held in place by an adhesive or a set screw. The housing 378 of the bracket 342 may be attached to a pair of plates that are secured to the glass door 300. The pair of plates 380 sandwich the door 300 and are secured to the housing 378 with a bolt 381.

The two brackets 342 may be attached to the door 300 on either side of the vertical midline 344 of the door 300. The brackets 342 may be spaced apart from the vertical midline 344 at an equal distance from the vertical midline 344 so that the repelling forces of the magnets 316, 318 may be evenly applied vertically up to hold the door 300 level and so the brackets 342 do not contact the track 314 or do so minimally. The magnet 316 may be embedded in the top member 374 within a cavity 382 that extends along the length of the top member 374. The magnet 316 may be a single elongate magnet that extends across at least 50% of the top member 374 up to the entire length of the top member 374. The magnet 316 may be positioned so that it is evenly distributed on the vertical midline 344 when assembled.

It is also contemplated that the magnet 316 may be a plurality of magnets 316. In this case, the plurality of magnets may be evenly distributed along the length of the top member 374 so that the repelling forces generated by the magnets 316, 318 apply even upward forces on brackets 342. This is to allow the magnets 316, 318 to hold the door 300 in a level position.

The track 314 may also have a cavity 383 that receives the magnet 318. Magnet 318 may extend across the entire length of the track 314 or a sufficient length of the track 314 so that the magnets 316 embedded in the top member 374 are always being repelled away by magnets 318. By way of example and not limitation, the magnet 318 may extend across 80% or 90% of the length of the track 314. The magnets 316, 318 may be embedded and held in place in cavities 382, 383 with an adhesive or other attachment mechanism such as a screw. The repelling forces generated by the magnets 316, 318 may be equal to the weight of the sliding door 300 including the bracket 342, top member 374 and the magnet 316 and other components that may be attached to the sliding door or move with the sliding door as the sliding door 300 traverses between the closed and opened position. The configuration of the magnets 316, 318 may be identical to the configuration of the magnets 16, 18 in relation to the embodiment shown in FIGS. 1-3 except that the magnet 316 may be distributed about a longer length because of the top member 374 as discussed above. The top member 374 is longer and the magnet 316 embedded in the top member 374 can be distributed along a longer length.

Figure 15:
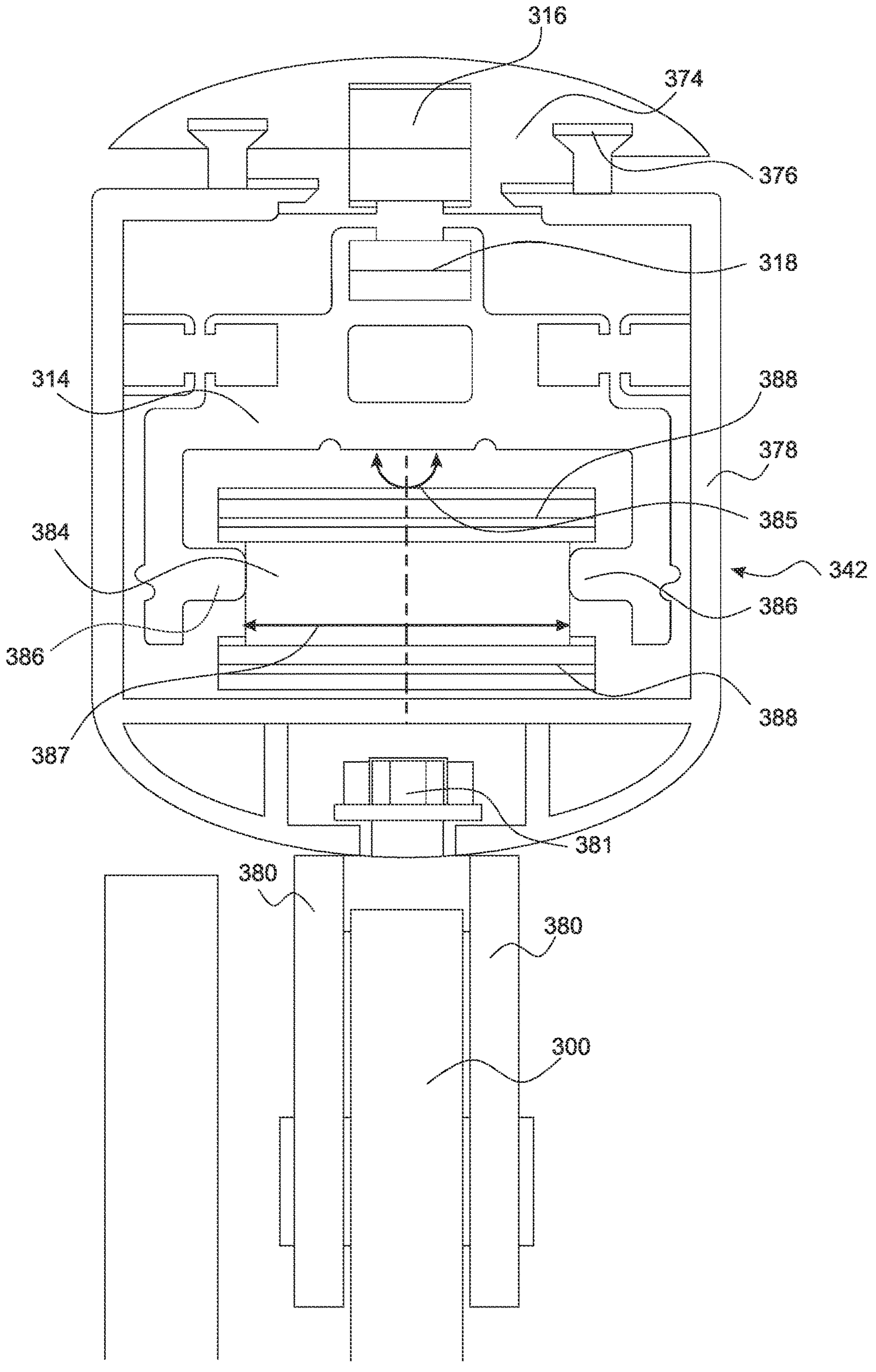
FIG. 15 is a cross-sectional view of the shower door shown in FIG. 10.
Figure 16:
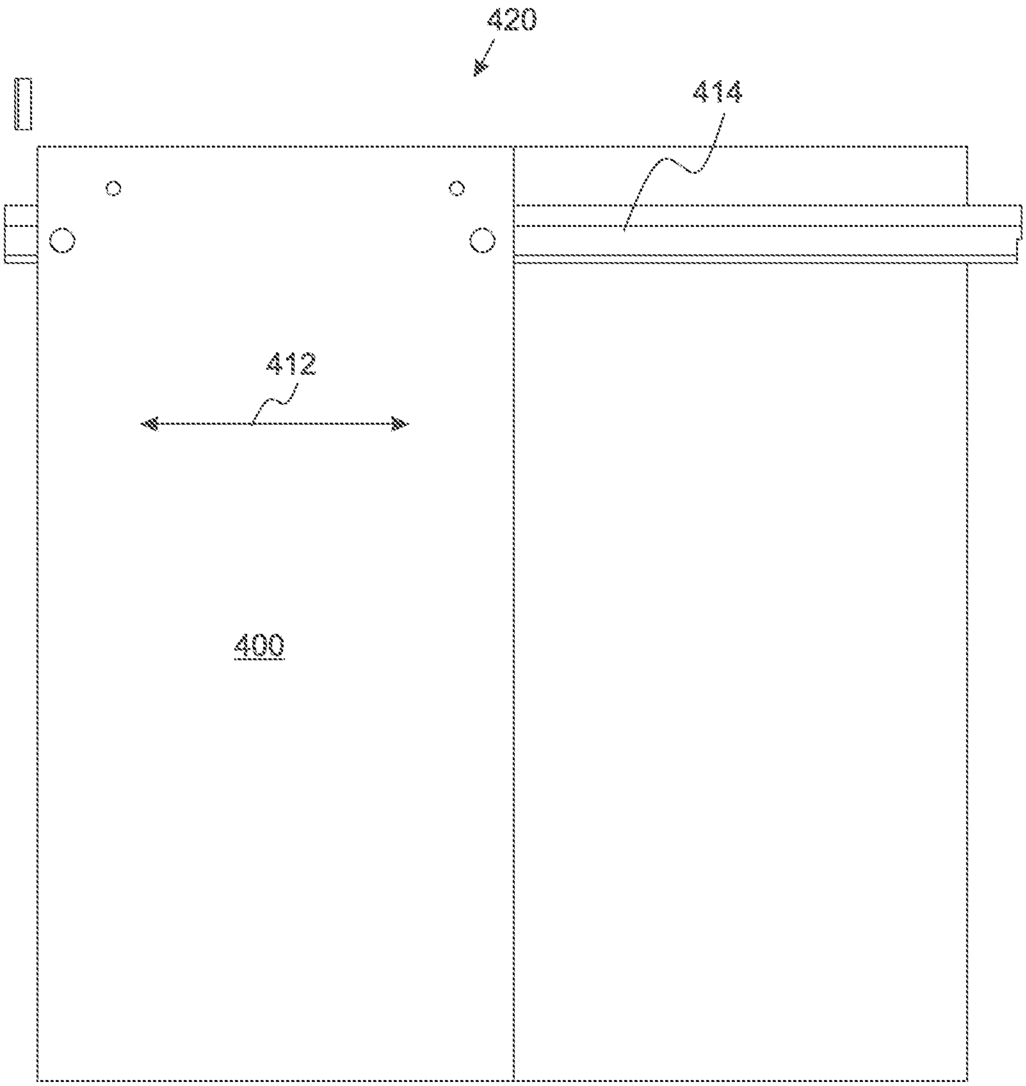
FIG. 16 is a front view of a fifth embodiment of the shower door.
Figure 17:
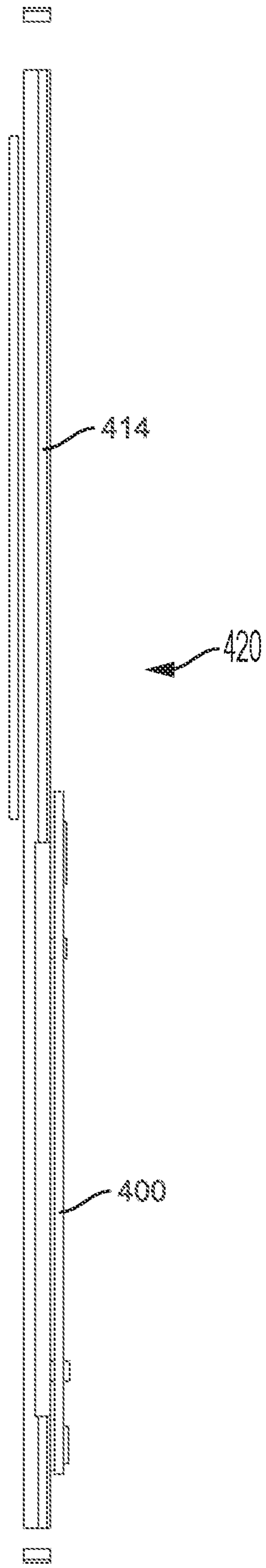
FIG. 17 is a top view of the shower door shown in FIG. 16.
Figure 18:
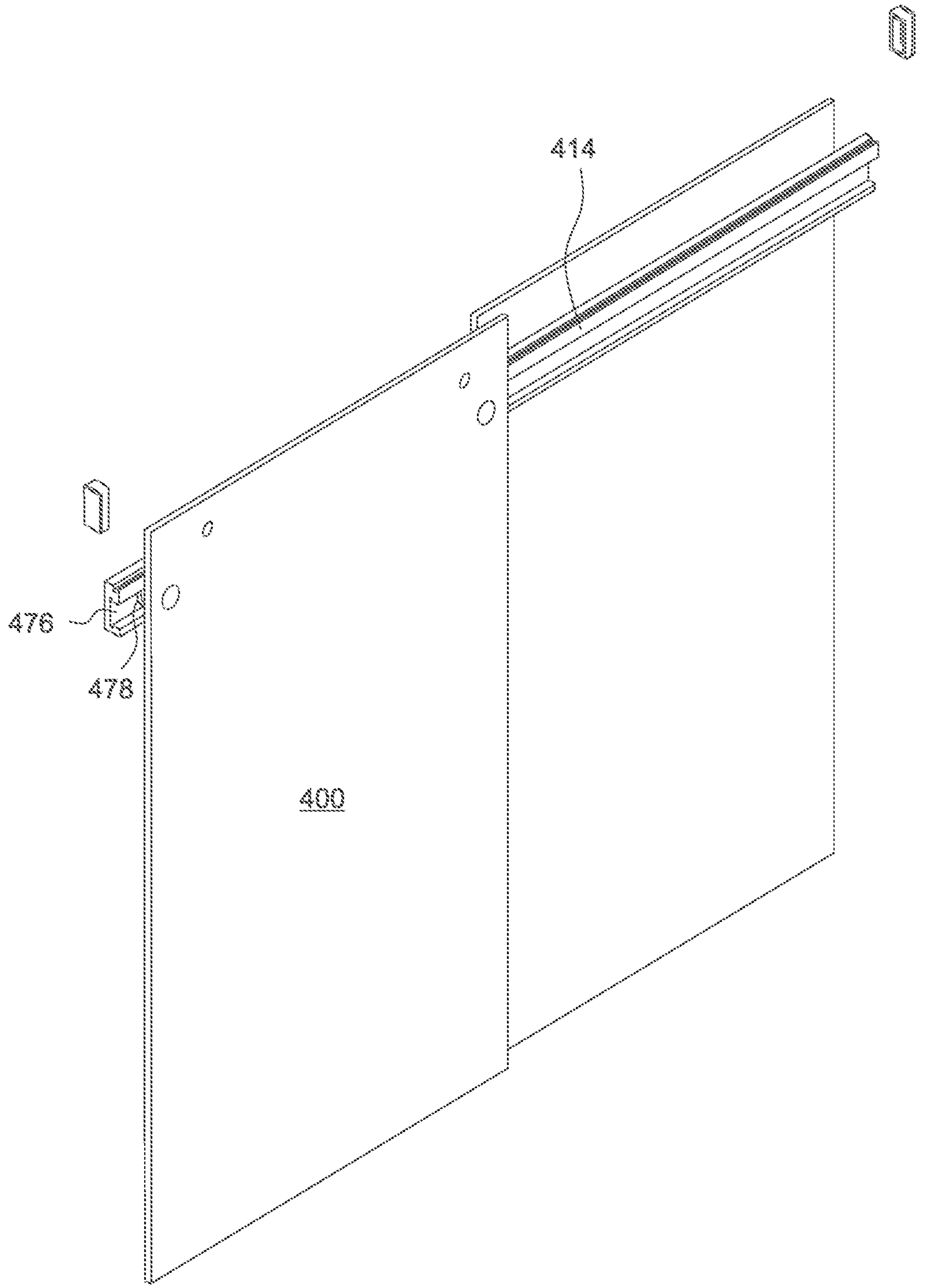
FIG. 18 is a right perspective view of the shower door shown in FIG. 16.
Figure 19:
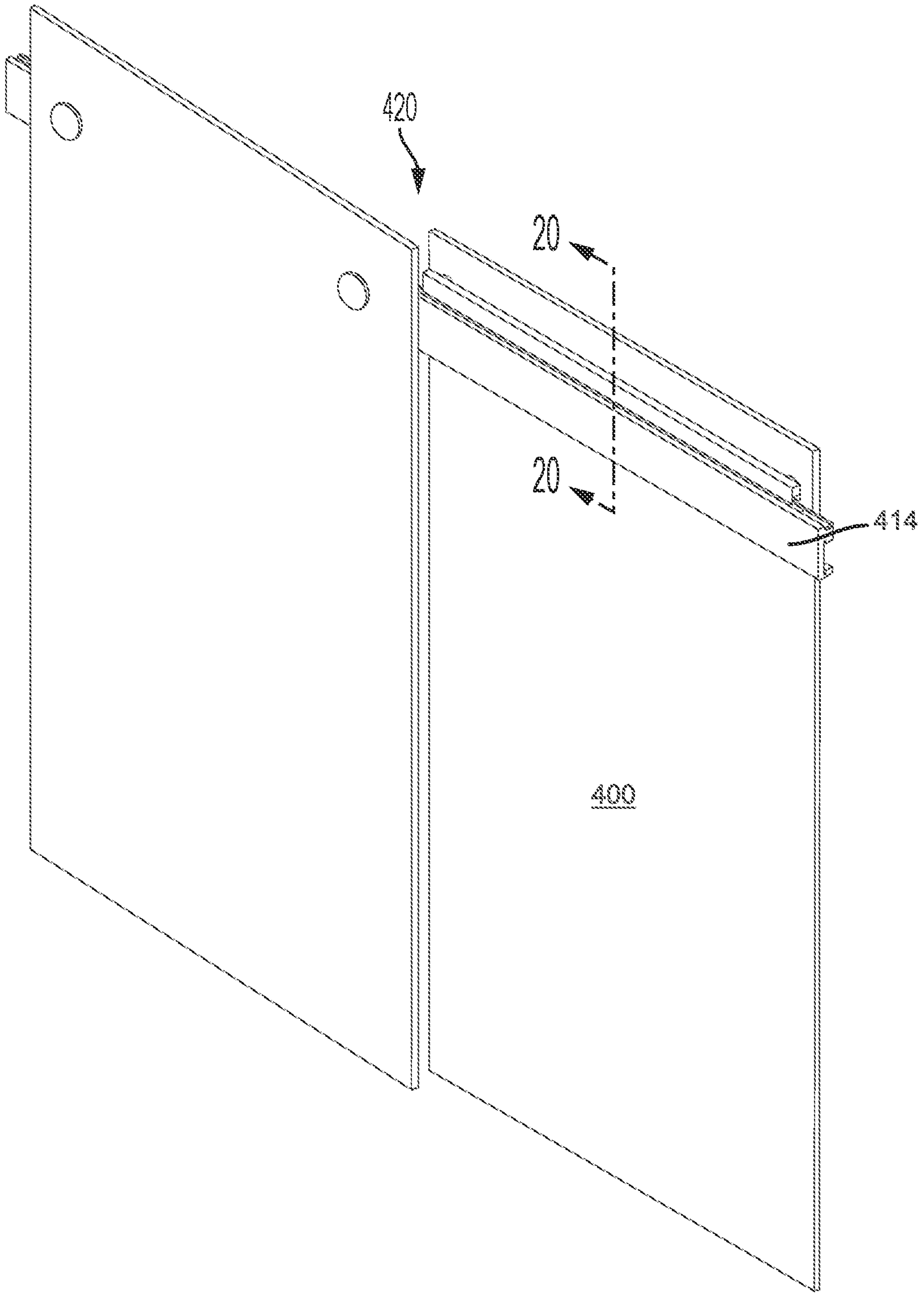
FIG. 19 is a left perspective view of the shower door shown in FIG. 16.
Figure 20:
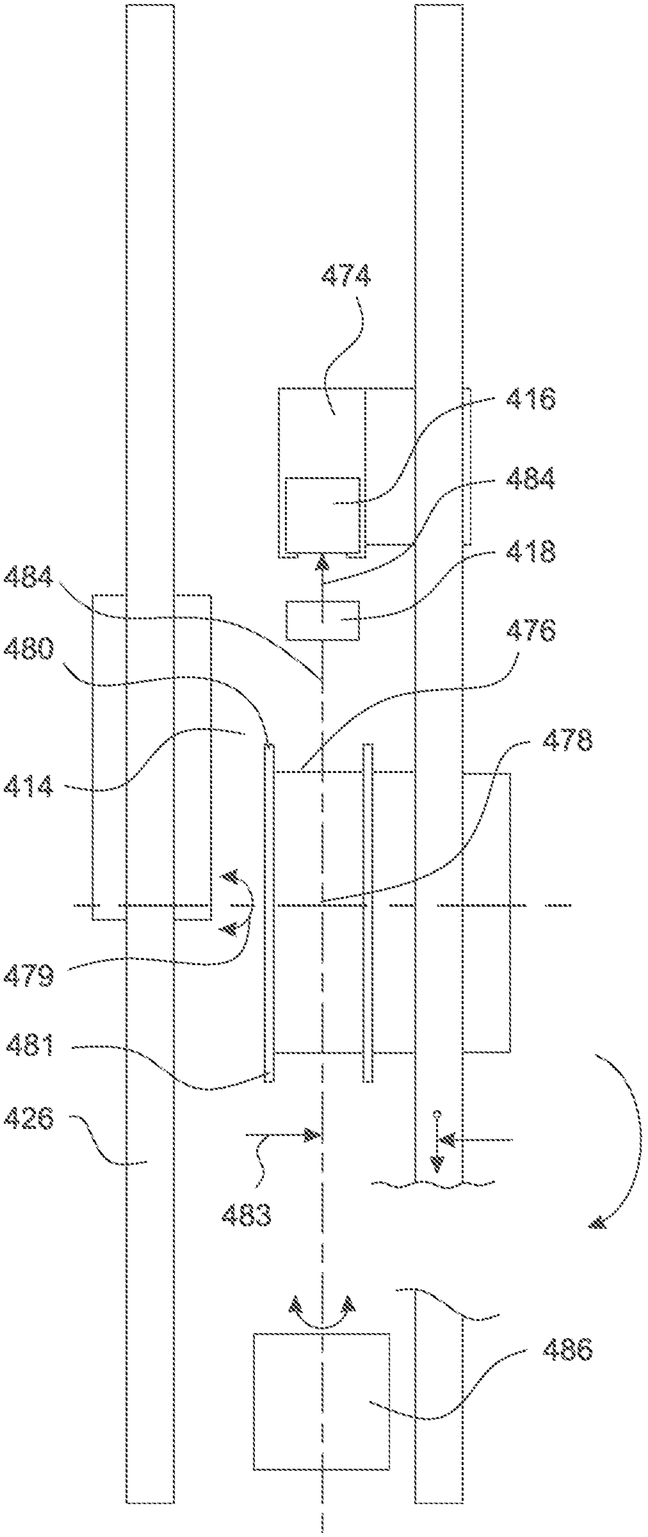
FIG. 20 is a cross-sectional view of the shower door shown in FIG. 16.
Figure 21:
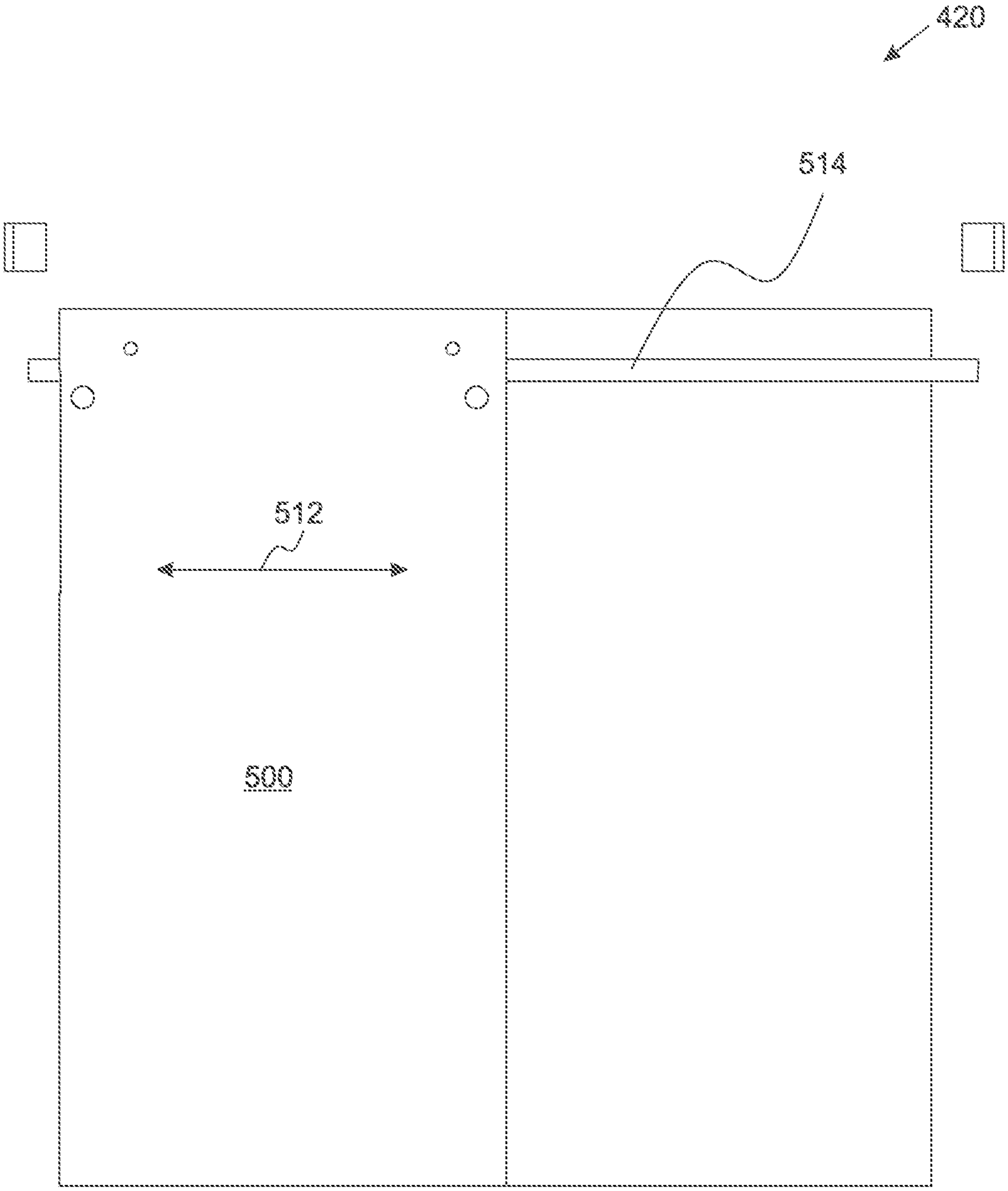
FIG. 21 is a front view of a sixth embodiment of the shower door.
Figure 22:
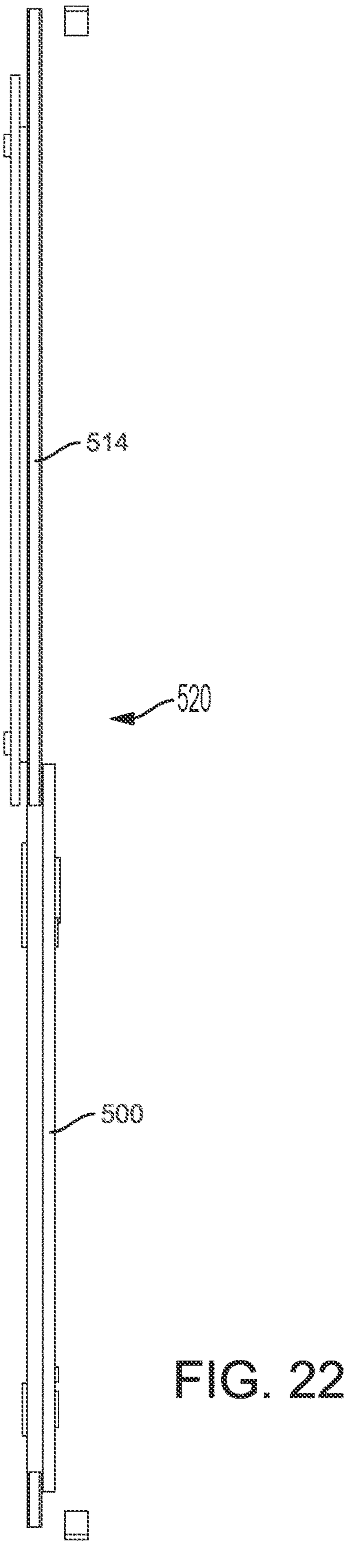
FIG. 22 is a top view of the shower door shown in FIG. 21.
Figure 23:
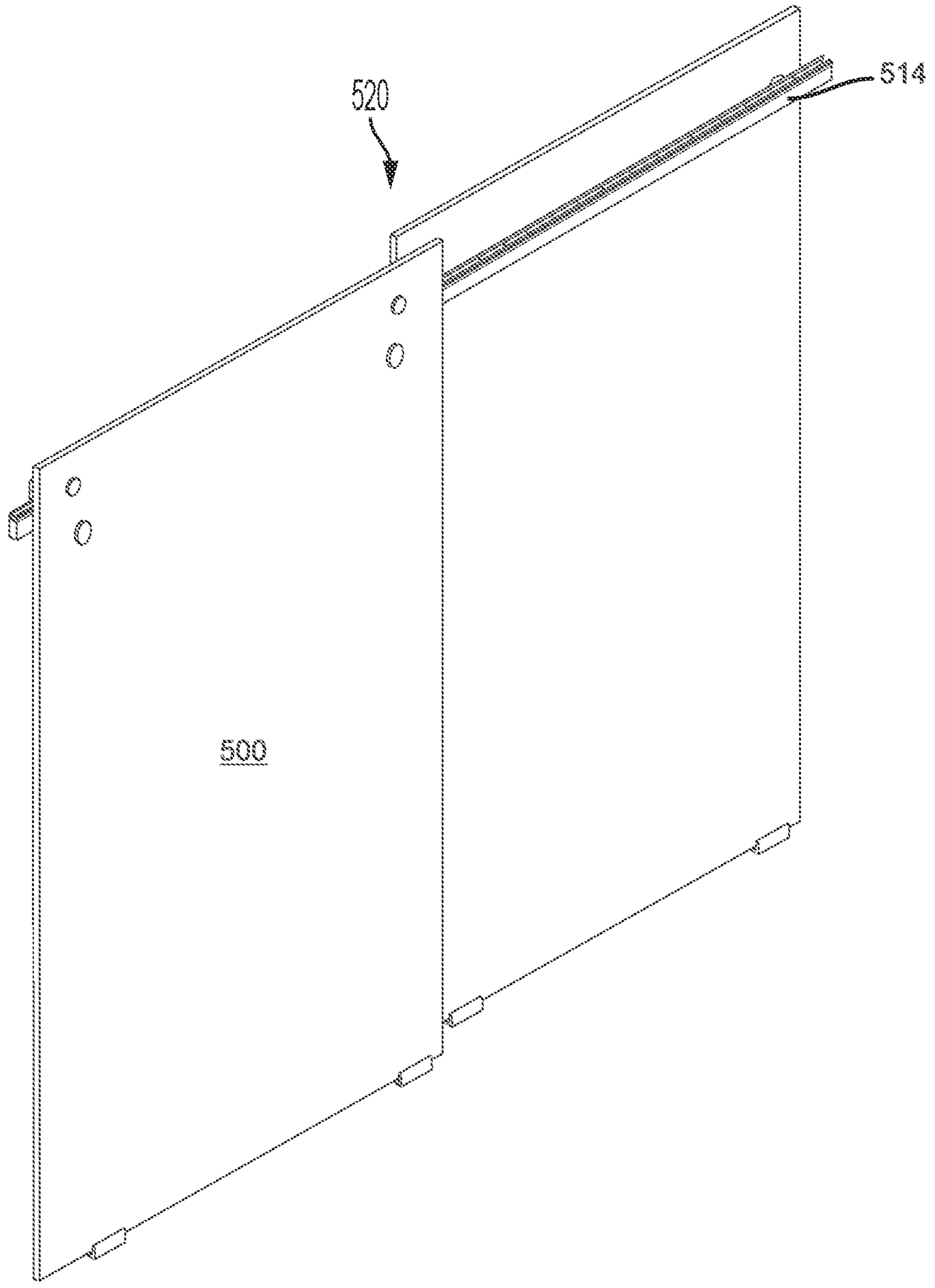
FIG. 23 is a right perspective view of the shower door shown in FIG. 21.
Figure 24:
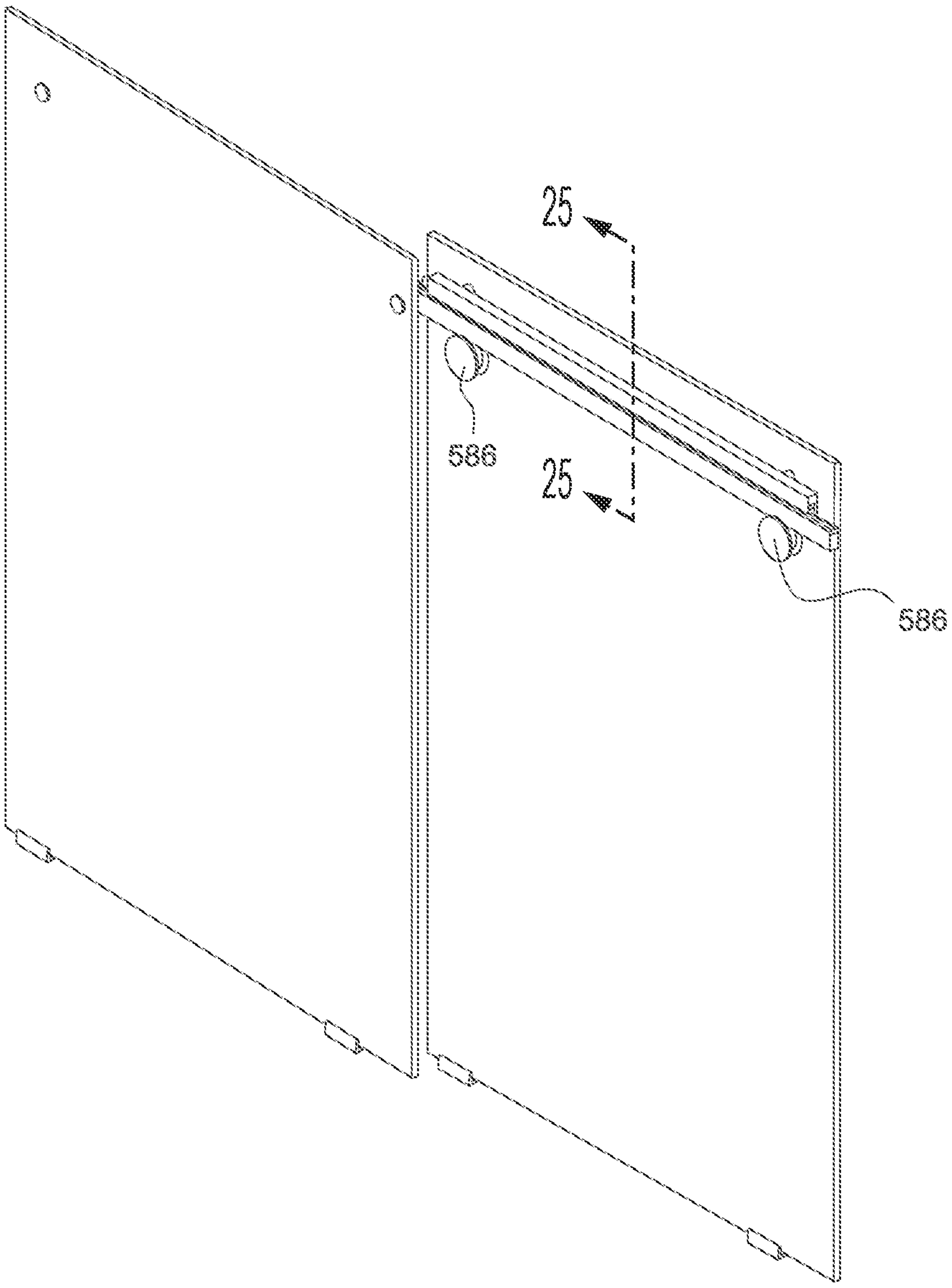
FIG. 24 is a left perspective view of the shower door shown in FIG. 21.
Figure 25:
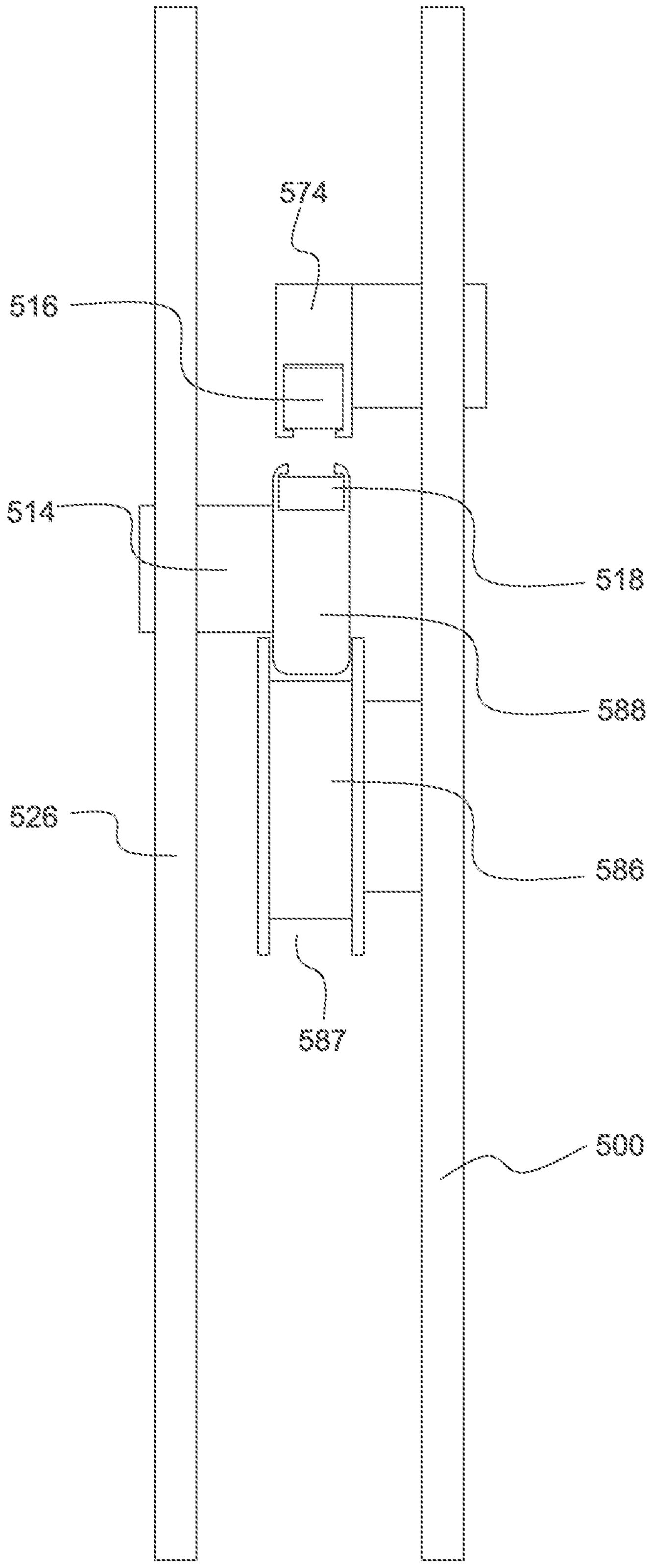
FIG. 25 is a cross-sectional view of the shower door shown in FIG. 21.
Figure 26:
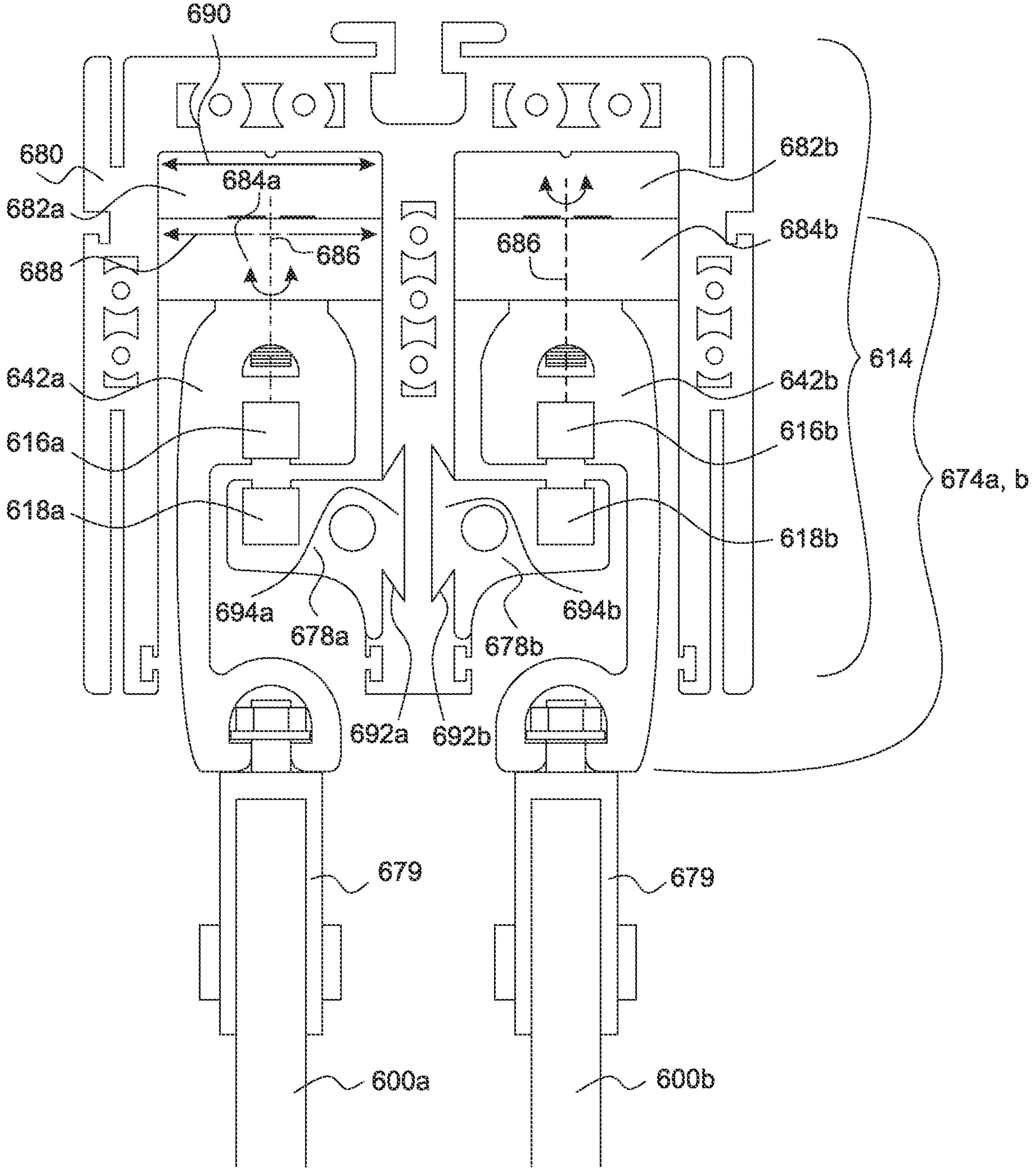
FIG. 26 is a cross-sectional view of a seventh embodiment of the shower door illustrating a door, track and bracket.
Figure 27:
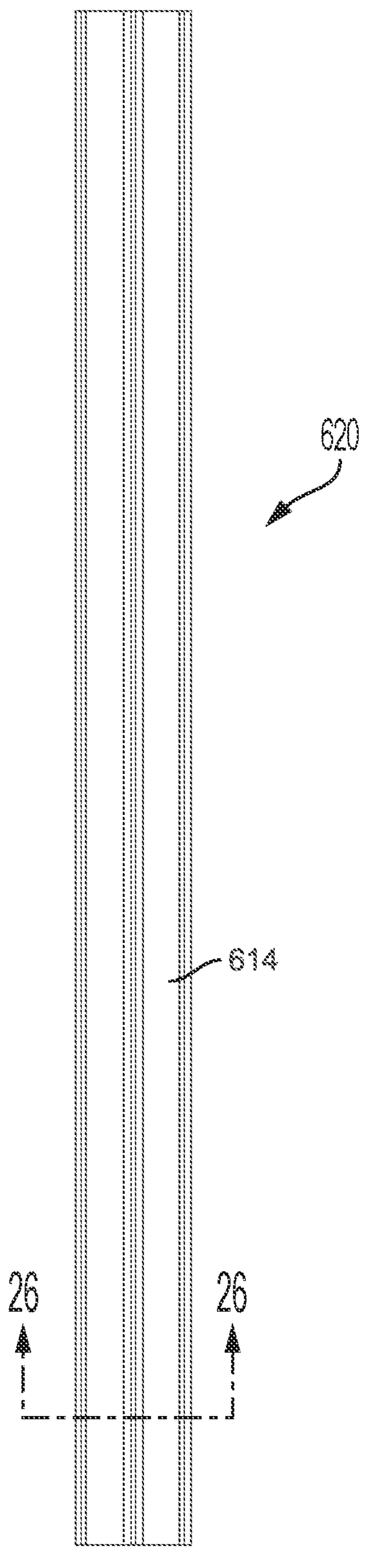
FIG. 27 is a top view of the shower door shown in FIG. 26.
Figure 28:
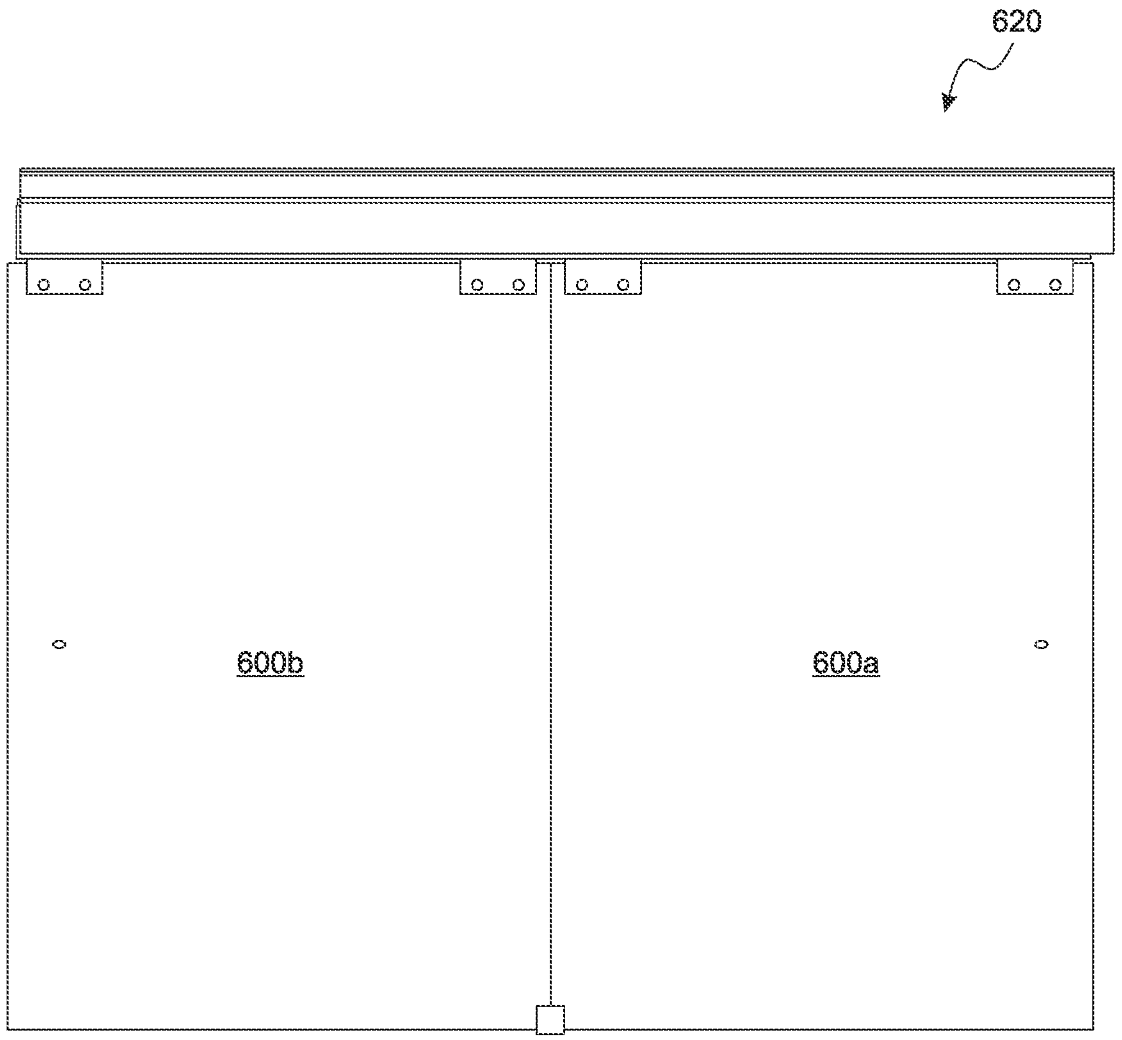
FIG. 28 is a front view of the shower door shown in FIG. 26.
Figure 29:
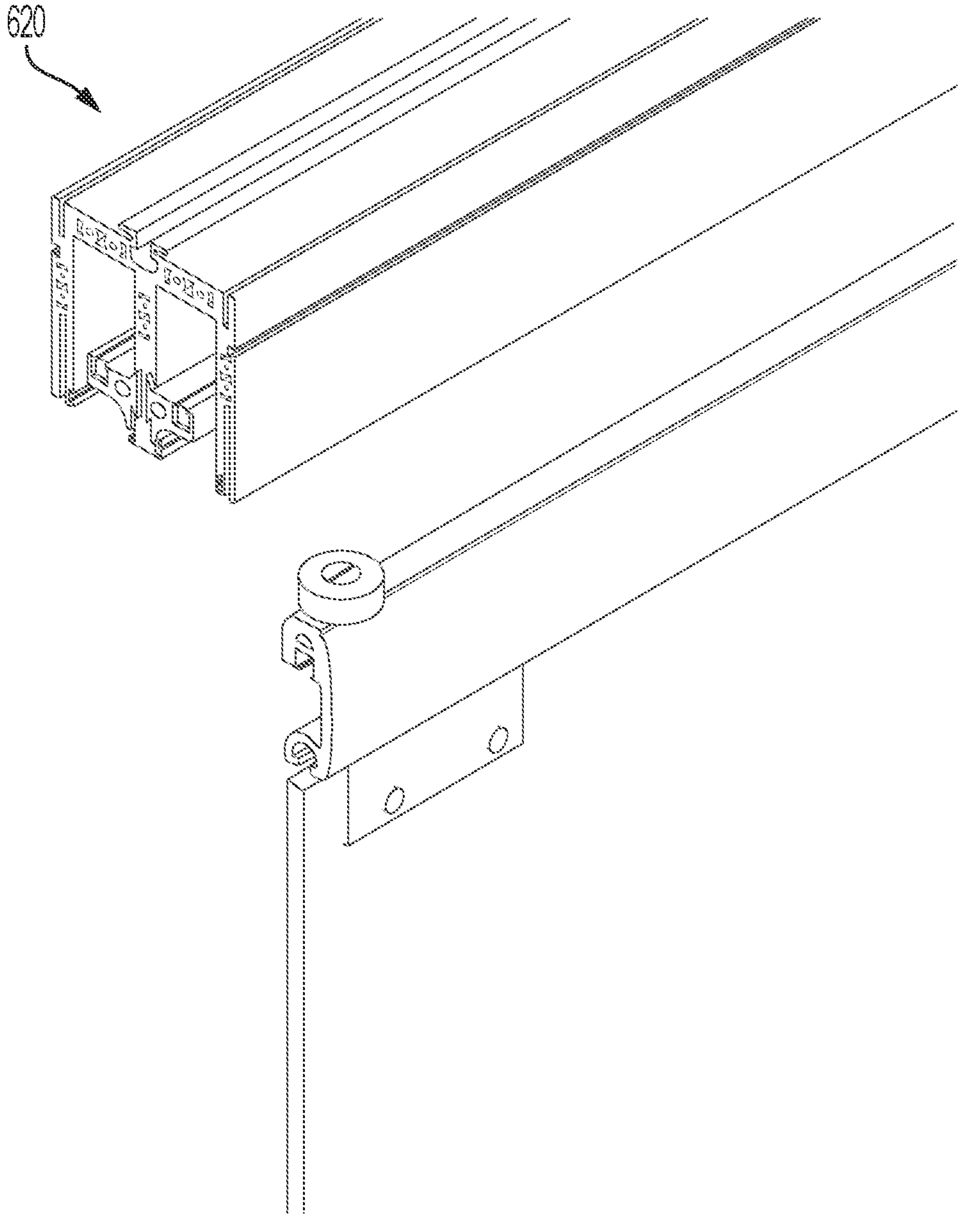
FIG. 29 is an exploded right perspective view of the shower door shown in FIG. 26.

Referring now to FIG. 15, the housing 378 may have a stabilizing roller 384. There may be two stabilizing rollers 384 for the door 300. The stabilizing roller 384 may be hidden within the housing 378 of each of the brackets 342. The stabilizing roller 384 may rotate as shown by arrow 385. The track 314 may have inwardly directed fingers 386. A distance between the fingers 386 may be equal to or slightly greater than a diameter 387 of the stabilizing roller 384. By way of example and not limitation, the distance between the fingers 386 may be about one thousandths of an inch to about a quarter of an inch greater than the diameter 387 of the stabilizing roller 384. The stabilizing roller 384 is rotatably attached to the housing 378. The stabilizing roller 384 may have upper and lower ridges 388 that hold the fingers 386 therebetween. In this regard, the door 300 may be traversed vertically by an amount equal to that which the fingers 386 may be traversed between the ridges 388. In this regard, the magnets 316, 318 repel each other and vertically displace the door 300 upward until the repelling forces generated by the magnets 316, 318 are equal to the weight of the door 300. This is also how the other embodiments disclosed herein operate in order to equalize the repelling forces of the magnets and the weight of the sliding door.

Referring now to FIGS. 16-20, a fifth embodiment of the shower 420 is shown. Similar to the shower 320, the walls and the showerhead are not shown. The shower 420 may have the track 414 extended between the walls and are attached to the walls 22, 24. The track 414 may have an extruded configuration as that shown in FIG. 20. The stationary door 426 may be attached to the track 414 with screws. The sliding door 400 may be held vertically up by repelling forces generated by magnets 416 and 418. The repelling magnet 416 is fixedly attached to the sliding door 400. By way of example and not limitation, the sliding door 400 may have a magnet receiving member 474 that is attached to the glass door 400 by way of a screw. The magnet receiving member 474 may have a receiving cavity that receives either one or more magnets 416. The magnet 416 may be a single elongate magnet 416 that extends along the entire length of the magnet receiving member 474. Alternatively, if there is a plurality of magnets 416, then the plurality of magnets may be evenly distributed along the length of the magnet receiving member 474.

The distribution of the magnets 416 may follow the same guidelines as that of the magnets 316 discussed in relation to the fourth embodiment of the shower door 320. Additionally, the magnet 418 may be embedded within the track 414 similar to the magnet 318 in relation to the track 314.

The track 414 may have a groove 476. The groove 476 may receive one or more wheels 478 that are attached to the sliding door 300. For example, as shown in the figures, the sliding door 300 may have two wheels 478 that are horizontally level with each other. The wheels 478 may ride within the groove 476 of the track 414.

The wheels 478 may be rotatable in direction of arrow 479 about a central axis. The wheels 478 may rotate as they 478 are traversed within the groove 476 of the track 414. Preferably, the wheel 478 does not touch the track 414 as the sliding door 400 is traversed between the opened and closed positions. Rather, the repelling force generated by the magnets 416, 418 should be counterbalanced by the weight of the door 400. More particularly, the repelling force of the magnets 416, 418 may be equal to a weight of the door. The wheels 478 preferably do not carry any weight of the door 400. However, the wheel or wheels 478 may have ridges 480 that are received into slots 481 formed in the groove 476. In this manner, the door 400 is not allowed to slide off of the track 414.

The weight of the door 482 is represented by arrow 482 and is offset 483 to the upward force 484 generated by the magnets 416, 418. The repelling force of the magnets 416, 418 is represented by arrow 484. This offset 483 will cause the door to rotate in the direction of arrow 485. In order to keep the door 400 in a vertical orientation, a roller 486 may be disposed on a medial side of the door 400 at the lower end portion of the door 400 and be positioned so as to maintain the door 400 in a vertical orientation. The roller 486 may rotate as the door pushes against the roller 486 and the door 400 is traversed between the opened and closed positions.

Referring now to FIGS. 21-25, a sixth embodiment of the shower 520 is shown. The sixth embodiment shown in FIGS. 21-25 operates identical to the fifth embodiment of the shower 420 except for the following. The track 514 is attached to the walls 22, 24. The stationary door 526 is attached to the track 514. The track 514 and the magnet receiving member 574 which is attached to the sliding door 500 has embedded magnets 516, 518 that produces a repelling force to lift the door 500 and prevent any contact therebetween. The sliding door 500 may have two rollers 586. Each roller 586 may have a groove 587. The track 514 may have an extended tongue 588 that is received into the groove 587 of the roller or wheels 586. This enables or prevents or mitigates the door 500 from sliding off laterally from the track 514.

Referring now to FIGS. 26-30, a seventh embodiment of the shower 620 is shown. The seventh embodiment shown in FIGS. 26-30 operates identical to the other embodiments discussed herein except as discussed below. The track 614 may be attached to the walls. One or both doors may be traversed left to right. The track 614 and a magnet receiving member 674*a, b* which may be attached to the door 600*a*, 600*b* may have magnets 616*a, b*, 618*a, b* embedded therein that produces a repelling force to lift the door 600*a, b* and prevent any contact therebetween.

The track 614 may be a single elongate extruded piece of aluminum or other suitable material. Alternatively, the track 614 may be fabricated from multiple elongate extruded pieces of aluminum that are assembled together. By way of example and not limitation, the track 614 may have extruded inserts 678*a, b*. In this regard, the track 614 may include a base 680 and the two inserts 678*a, b*. The base 680 may have a cavity 682 that receives the magnet receiving member 674*a, b*. In particular, the base 680 may have cavities 682*a, b* that each individually receives the magnet receiving members 674*a, b* and the inserts 678*a, b*. The inserts 678*a, b* may be received into cavities 692*a, b*. The inserts 678*a, b* may have a base 694*a, b*. The base 694*a, b* may have a matching configuration compared to the cavities 692*a, b*. By way of example and not limitation, the base 694*a, b* and the cavities 692*a, b* may have matching trapezoidal configurations. The base 694*a, b* may freely slide into the cavities 692*a, b*. The base 694*a, b* may be held into place with an adhesive (e.g. silicone). The base 680 and the inserts 678*a, b* may be sufficiently long so that the opposing ends are attached to the walls 22, 24. In contrast, the magnet receiving members 674*a, b* may be sufficiently long to extend across a substantial part or the entire width of the door 600*a, b*. More particularly, the magnet receiving member may comprise bracket 642 which extends across the substantial part or the entire width of the door 600*a, b*.

Figure 30:
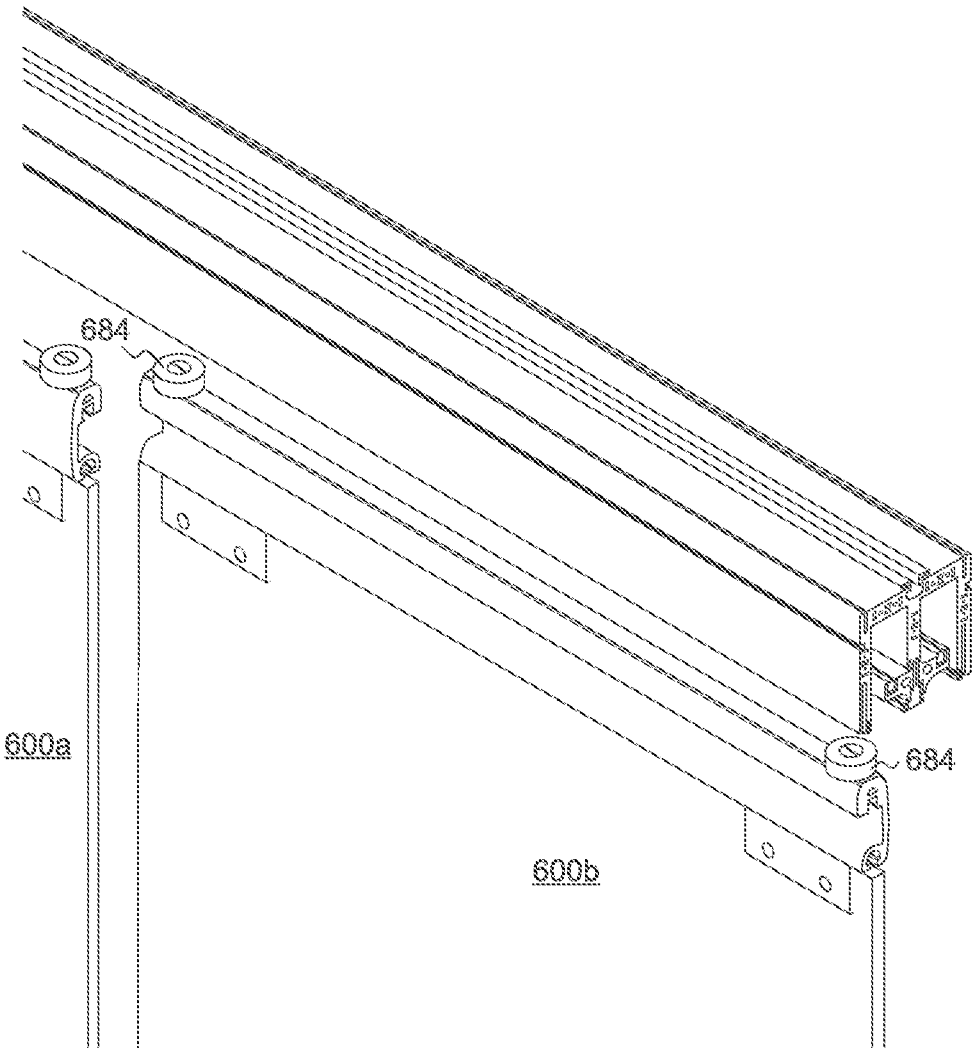
FIG. 30 is a left perspective of the shower door incorporating the shower door shown in FIGS. 26-29.

Also, the magnet receiving members 674*a, b* may have stabilizing rollers 684*a, b* on opposed ends of the doors 600*a, b*, as shown in FIG. 30. The stabilizing rollers 684 may be rotatable about a vertical axis 686. The stabilizing rollers 684 may have a diameter 688 which is slightly smaller than a distance 690 of the cavities 682*a, b*. When the door 600*a, b* slides left to right, the rollers 684 maintain vertical alignment of the magnets 616*a, b*, 618*a, b* and the door 600*a, b*.

The bottom side of the bracket 642*a, b* may have a bracket 679 which attaches the glass door 600*a, b* to the bracket 642*a, b* of the magnet receiving member 674*a, b*.

Figure 31:
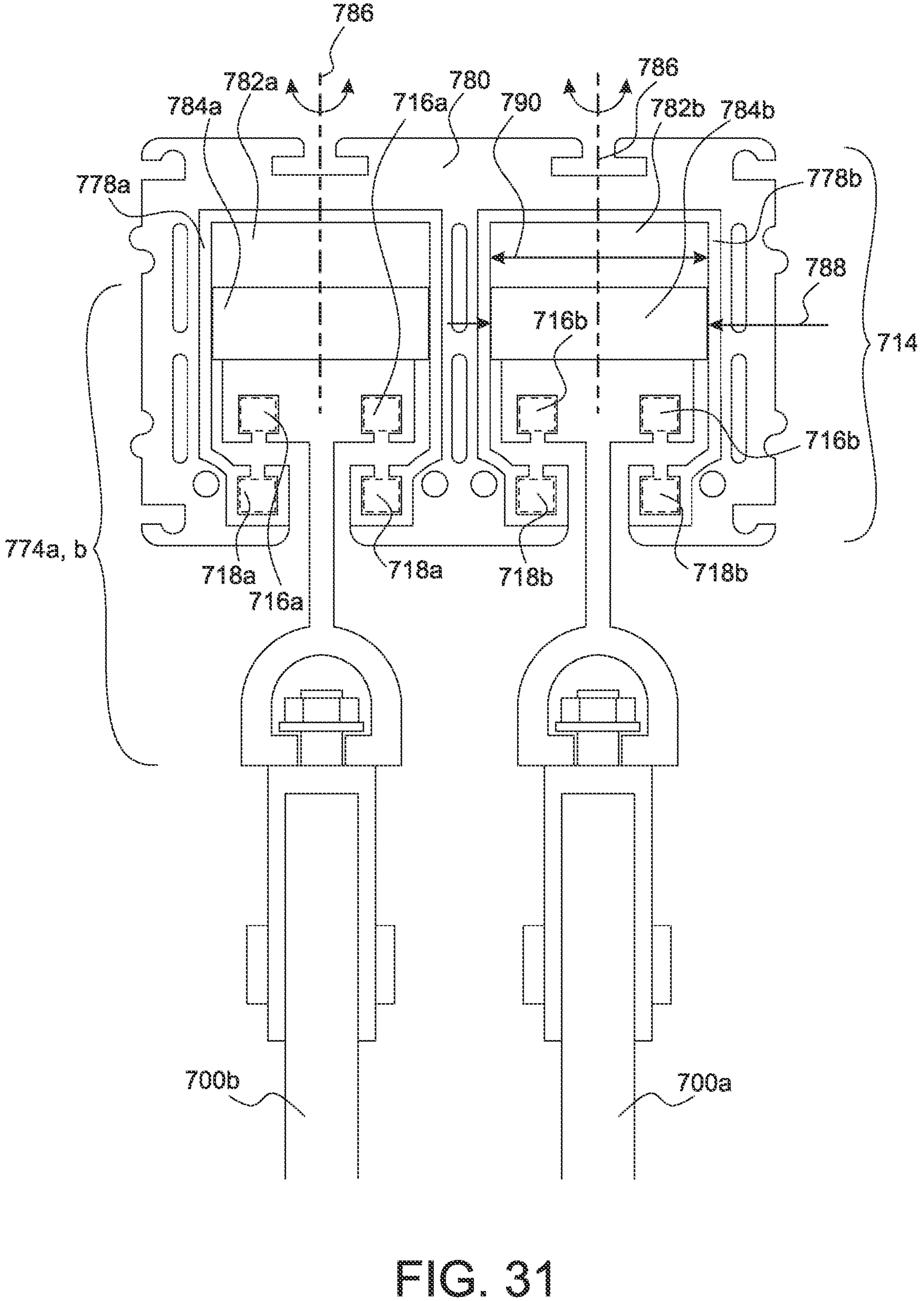
FIG. 31 is a cross-sectional view of an eighth embodiment of the shower door illustrating a door, track and bracket.
Figure 31A:
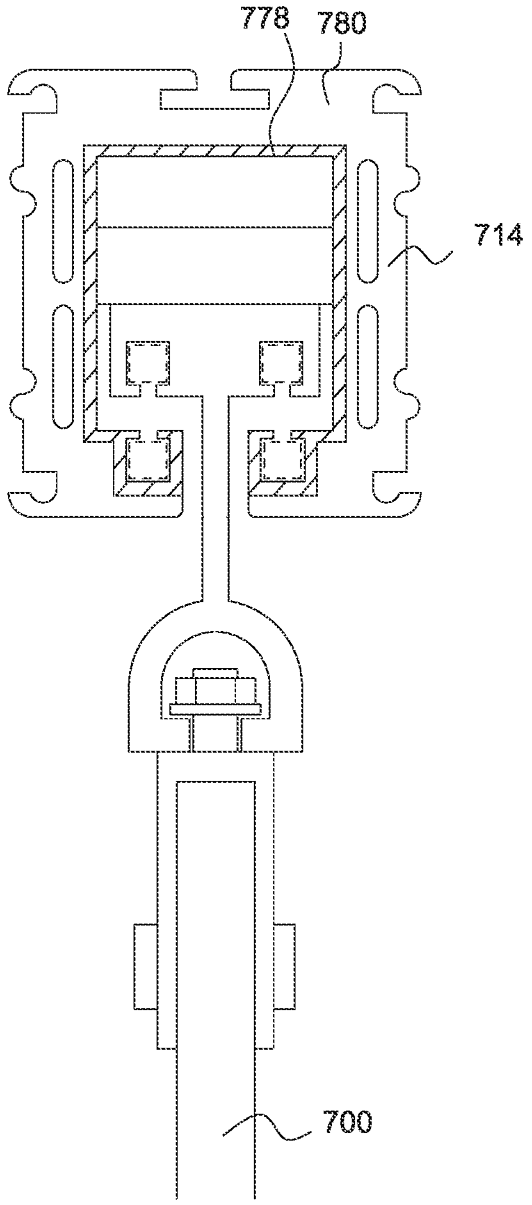
FIG. 31A is a variant of the cross-sectional view shown in FIG. 31.
Figure 32:
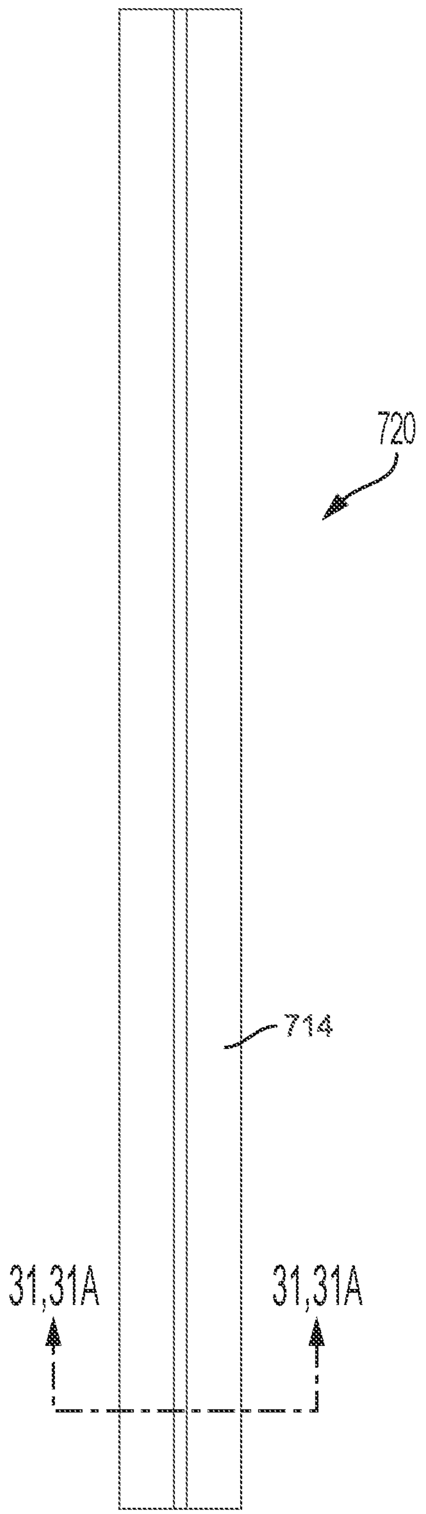
FIG. 32 is a top view of the shower door shown in FIG. 31.
Figure 33:
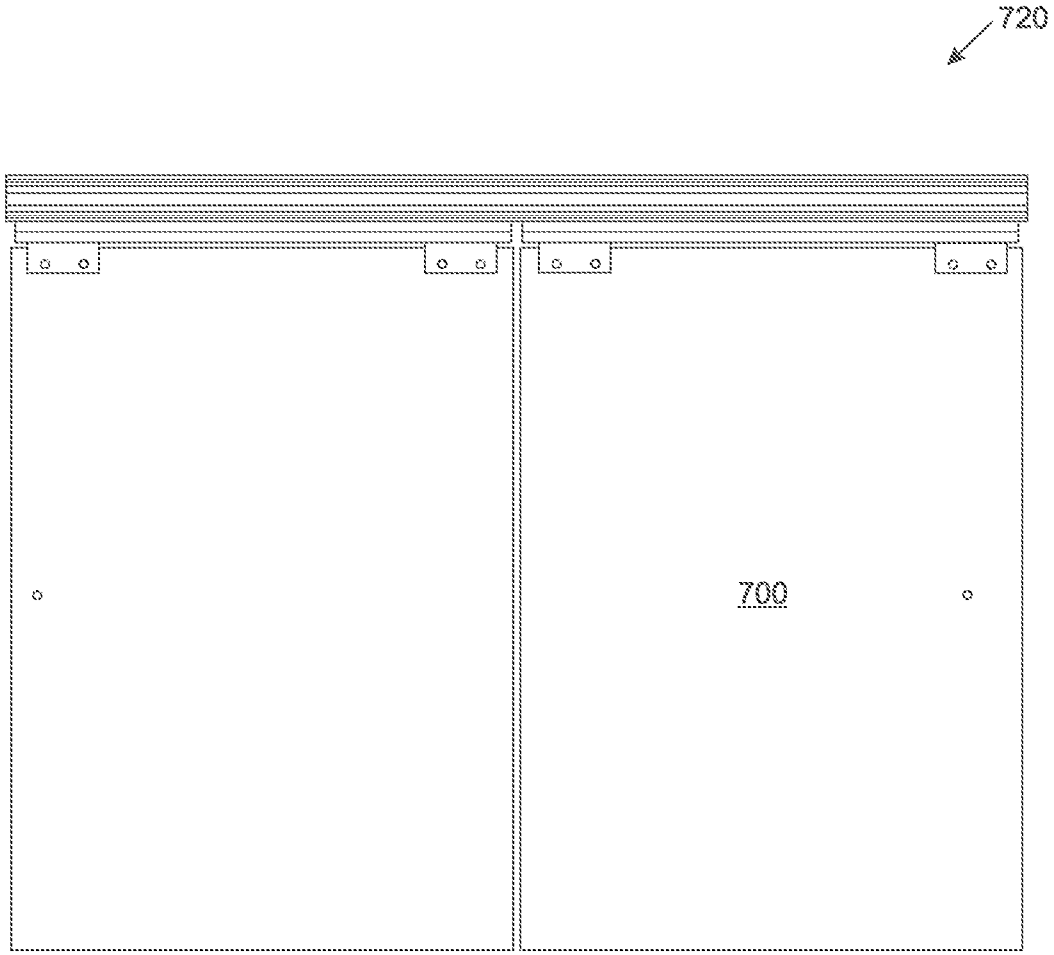
FIG. 33 is a front view of the shower door shown in FIG. 31.

Referring now to FIGS. 31-35, an eighth embodiment of the shower 720 is shown. The eighth embodiment shown in FIGS. 31-35 operates identical to the other embodiments discussed herein except as discussed below. FIG. 31 illustrates two doors 700*a, b* that slides left to right. In contrast, FIG. 31A illustrates a single door 700 that traverses the track 714 left to right. The other door which is not shown may be stationary. In FIG. 31A and the other embodiments discussed herein, the track may be attached above a door opening so that the door 700 can slide back and forth between an opened position to allow people and things to go through the opening and a closed position to block people and things from going through the opening.

The track 714 and a magnet receiving member 774*a, b* which may be attached to the door 700*a, b* may have magnets 716*a, b*, 718*a, b* embedded therein that produces a repelling force to lift the door 700*a, b* and prevent any or minimal contact therebetween.

Figure 34:
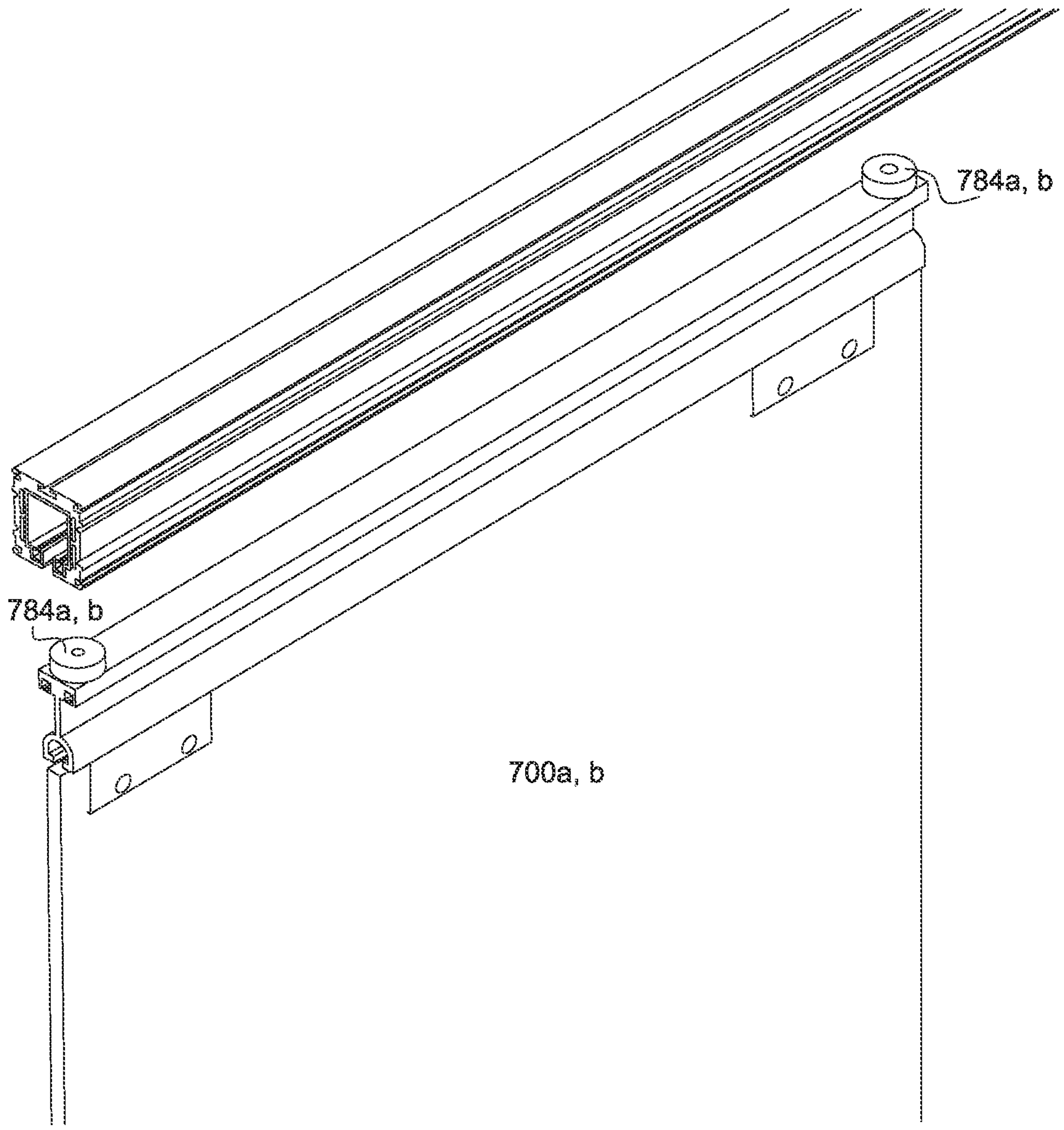
FIG. 34 is an exploded right perspective view of the shower door shown in FIG. 31.
Figure 35:
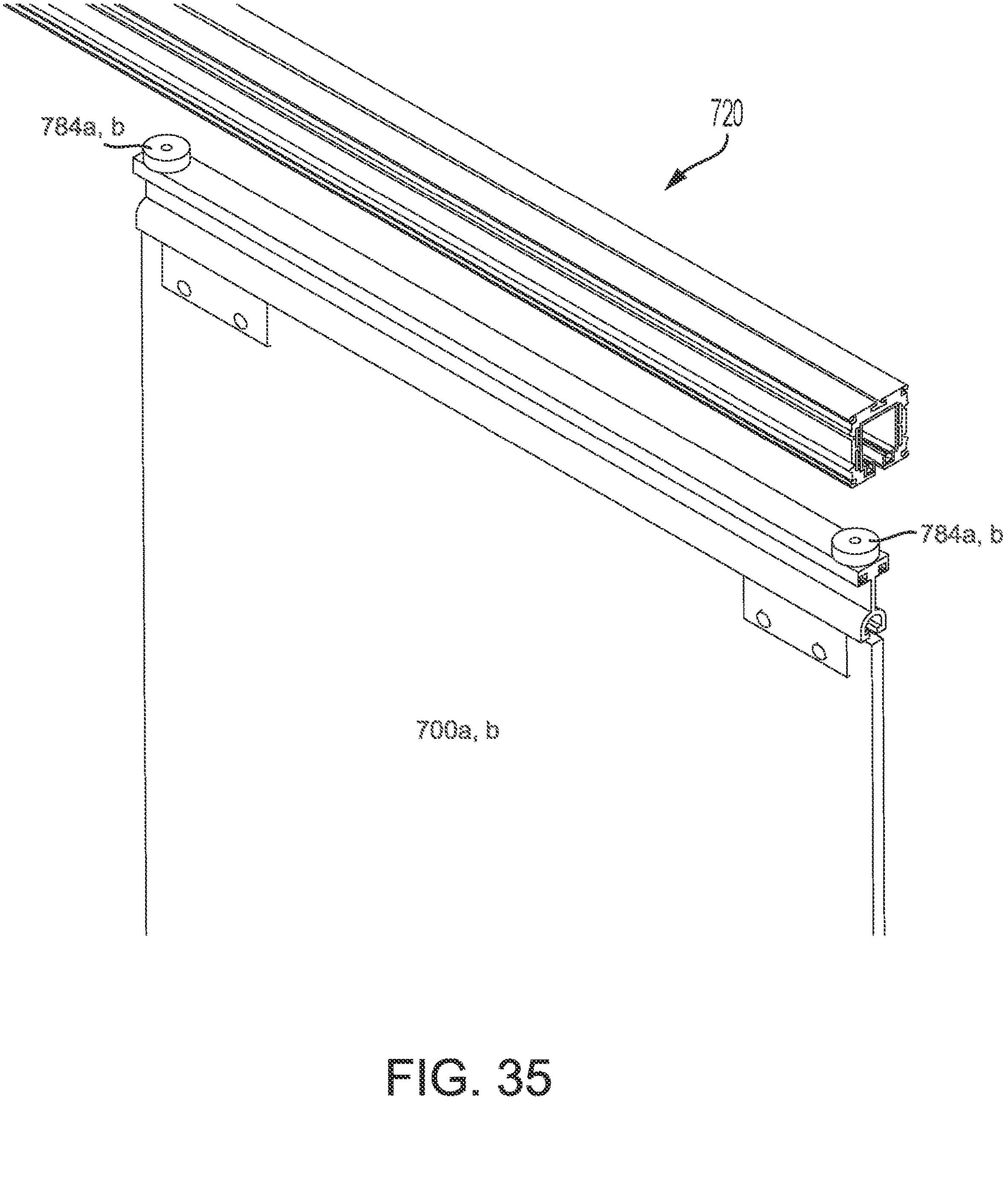
FIG. 35 is an exploded left perspective view of the shower door shown in FIG. 31.

The magnet receiving member 774*a, b* may have stabilizing rollers 784*a, b*. The stabilizing rollers 784*a, b* may be disposed on opposing ends of the doors 700*a, b* as shown in FIG. 34. The stabilizing rollers 784*a, b* may be rotatable about a vertical axis 786. The stabilizing rollers 784 may have a diameter 788 which is slightly smaller than a distance 790 of the cavities 782*a, b*. When the door 700*a, b* slides left to right, the rollers 784*a, b* maintain vertical alignment of the magnets 716*a, b*, 718*a, b* and the door 700*a, b* by pushing against the inside surface of the cavities 782*a, b*.

Moreover, the doors shown and described herein are described as being glass doors. However, it is also contemplated that the doors may be fabricated from other materials as well including but not limited to wood, plexiglass, and the like. In the various aspects and embodiments described above, the brackets were described as being equidistantly set apart from a vertical midline of the door. In this regard, the repelling forces generated by the magnets embedded in the brackets on opposed sides of the vertical midline are equal to each other. However, it is also contemplated that the repelling forces generated on opposed sides of the vertical midline may be located asymmetrically about the vertical midline and also generate asymmetrical repelling forces but yet evenly lift the door upward.

The track 14, 114, 314, 414, 514, 614, 714 may be directly or indirectly attached to the structure around the door opening so that the track 14, 114, 314, 414, 514, 614, 714 may be disposed above the door opening and the door that engages the track 14, 114, 314, 414, 514, 614, 714 may be traversed between an opened and closed position. In the closed position, the door is disposed in front of the door opening so that people and things cannot be passed through the door opening. In the opened position, the door is displaced away from the door opening so that people and things can pass through the door opening. It is also contemplated that the track 14, 114, 214, 314, 414, 514, 614 may be embedded within the structure around the door opening so that the track is less noticeable during use. The structure around the door opening may be the wall, header, threshold, floor. In this regard, the door may function as a barn door in front of a door opening.

In the seventh and eighth embodiment shown in FIGS. 26-35, the magnets 618*a, b* and 718*a, b* are inserted into an insert 678*a, b* and 778*a, b*. The inserts 678*a, b* and 778*a, b* are not inserted into the base 680, 780 until the magnets 618*a, b* and 718*a, b* are disposed in the inserts 678, 778. Once the magnets 618*a, b* and 718*a, b* are positioned in the inserts 678, 778, the inserts 678, 778 are inserted into the base 680, 780 of the tracks 614, 714. The inserts 678, 778 may be held in place with an adhesive (e.g., silicone).

Referring now to figures herein, by way of example and not limitation, a magnetically levitating sliding door 810, 1010 is shown. The door 810, 1010 may slide horizontally in the direction of arrow 812, 1012 on track 814, 1014. The door 810, 1010 may have a magnet 816, 1016. The track 814, 1014 may have a magnet 818, 1018. The magnet 816, 1016 may be repelled by the magnet 818, 1018 to vertically lift the door 810, 1010 when the door 810, 1010 is assembled and hung on the track 814, 1014. In this way, as the door 810, 1010 moves horizontally in the direction of arrow 812, 1012, the weight of the door 810, 1010 is transferred to the track 814, 1014 through magnets 816, 1016 and 818, 1018. A minimal amount of contact or no contact occurs between the track 814, 1014 and the door 810, 1010 in terms of the vertical direction. When the door 810, 1010 is slid left and right in the direction of arrow 812, 1012 the horizontal movement of the door 810, 1010 is quiet and smooth because the bracket 842, 1042 and the track 814, 1014 preferably do not rub against each other.

Figure 36:
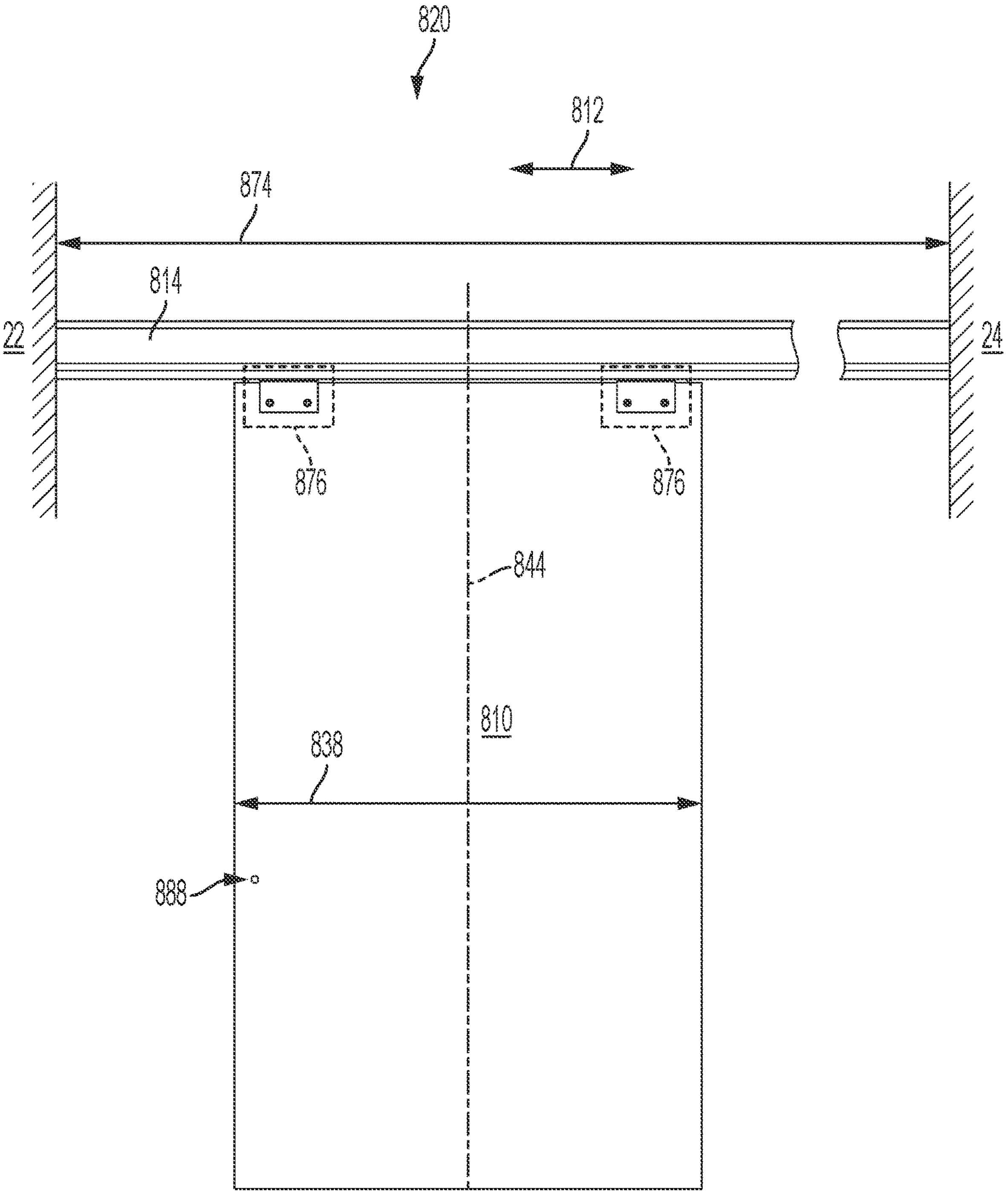
FIG. 36 is a front view of a ninth embodiment of the door.
Figure 37:
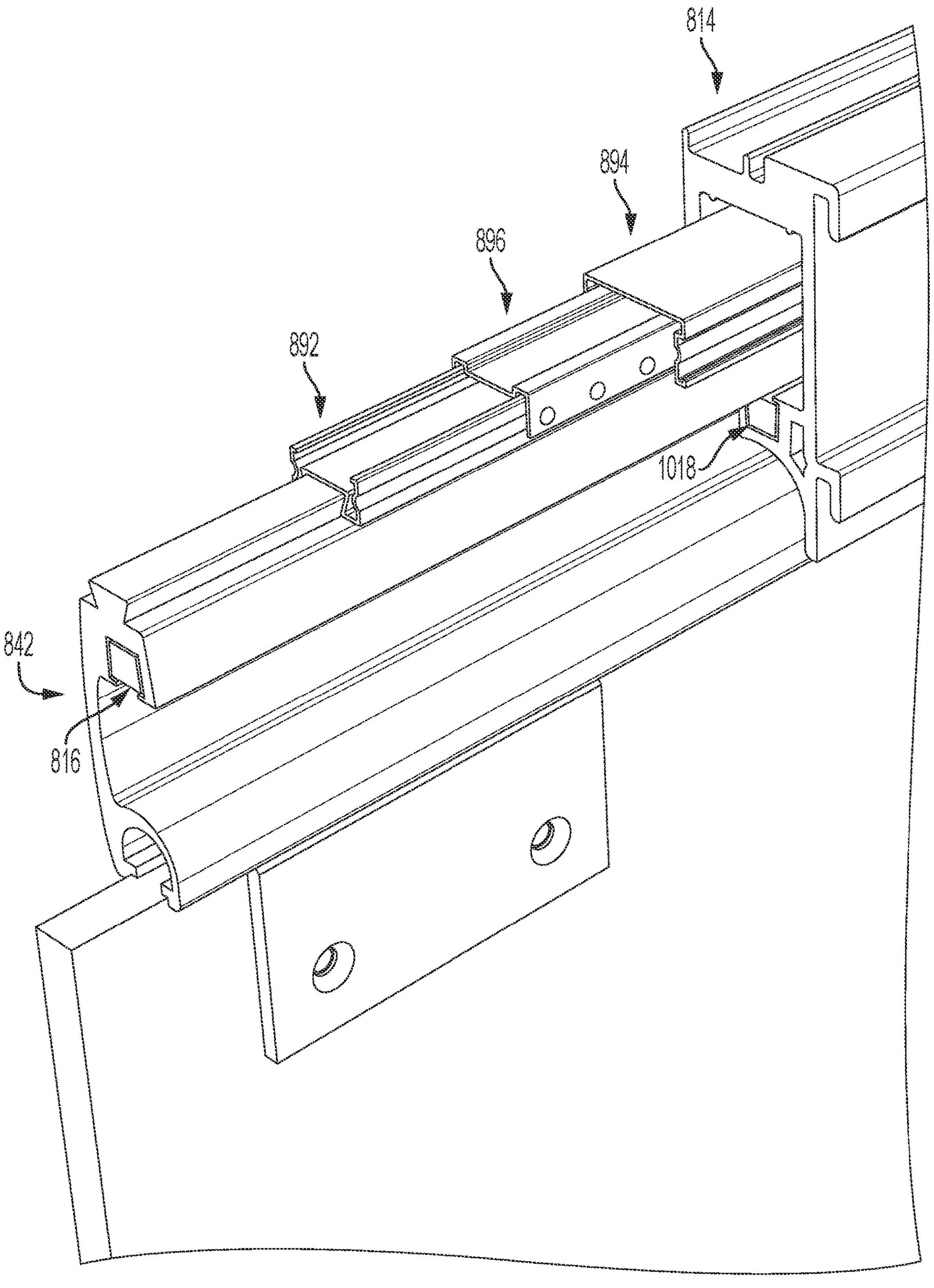
FIG. 37 is a right cross-sectional view of the door shown in FIG. 36.

Referring now to FIGS. 36-41, a ninth embodiment of a shower 820 is shown. In FIG. 36, a portion of the shower 820 is shown. The shower 820 may have first and second walls 22, 24. The shower 820 may also have a stationary door that may be secured to the first and/or second walls 22, 24 with a bracket. The stationary door is not shown in FIG. 36 for the purposes of clarity. The stationary door may be offset from the sliding door 810 to allow the sliding door 810 to move to the left and right so that the sliding door 810 may be moved beside the stationary door. When the sliding door 810 is in the open position, the sliding door 810 and the stationary door may be stacked beside each other. As the sliding door 810 is moved to the left and right, the door 810 is being magnetically lifted up. The movement of the door 810 is quiet and smooth since the bracket 842 (see FIG. 37) and track 814 preferably do not rub against each other.

As shown in FIG. 36, the track 814 may extend between the first and second walls 22, 24. More particularly, a length 874 of the track 814 may be sufficiently long so that the door 810 can slide left to right in the direction of arrow 812 as needed. By way of example and not limitation, the track 814 may have a length 874 that is about equal to or slightly less than two times a length 838 of the door 810.

Figure 38:
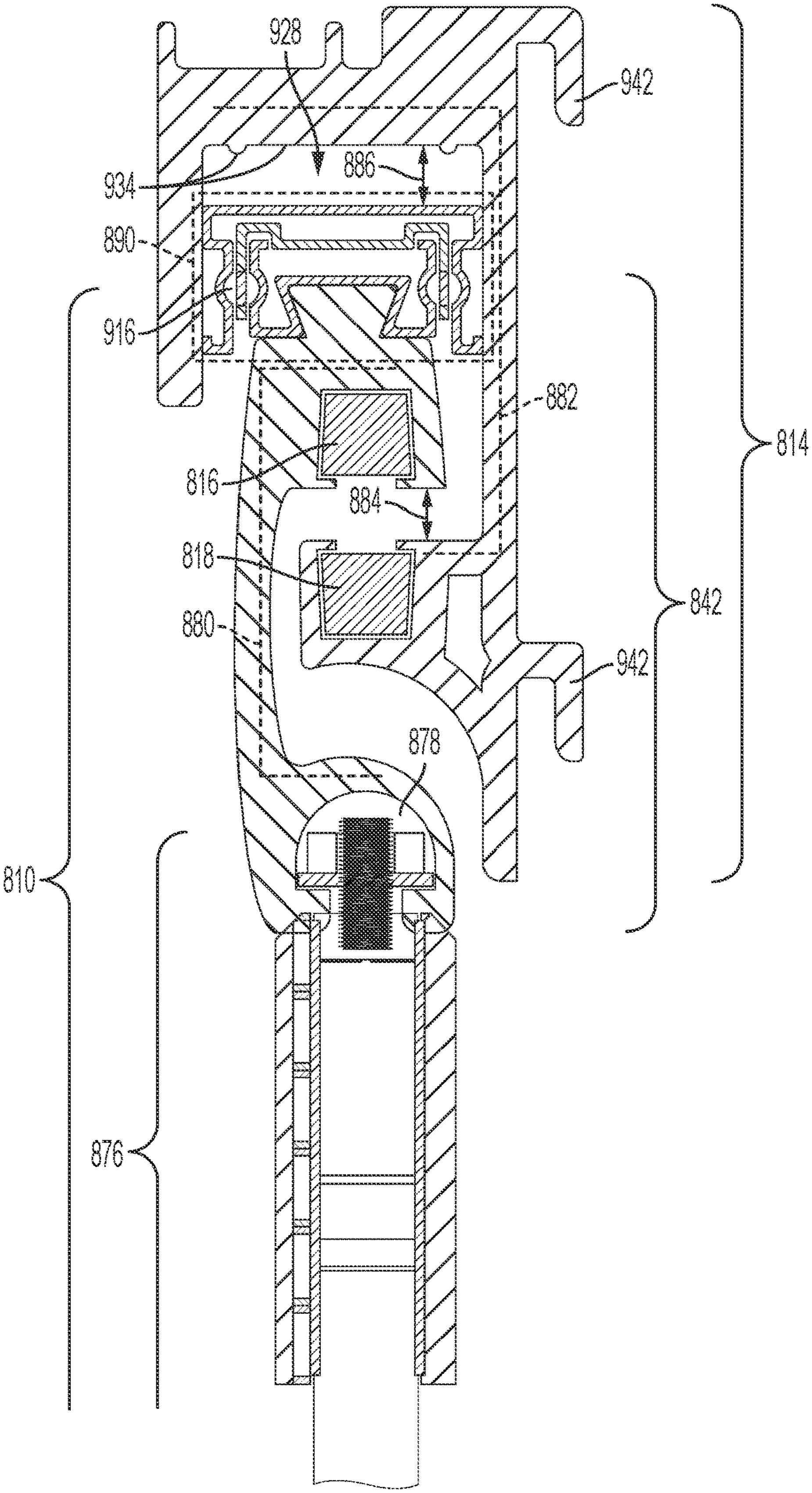
FIG. 38 is a cross-sectional traverse view of the door shown in FIG. 36.

Referring now to FIG. 38, the track 814 may have a magnet 818 that may extend along the length 874 (see FIG. 36) of the track 814. More particularly, the magnet 818 may extend along the track 814 to the extent that the sliding door 810 needs to slide so that a person can pass through a door opening when the sliding door 810 is moved out of the way. By way of example and not limitation, referring now to FIG. 36, a length 838 of the sliding door 810 is shown. The sliding door 810 may move to the left or right to provide an opening through which a person can enter about equal to the length 838 of the door 810. As such, length 840 (see FIG. 40) of the magnet 818 may be equal to about twice or slightly less than twice (e.g. 180%) the length 838 of the sliding door 810.

The sliding door 810 may be attached to bracket 842. The bracket 842 may position the magnet 816 above the magnet 818 attached to the track 814 to lift the door 810 upward due to the repelling force of the magnets 816, 818. The magnet 816 attached to the door 810 may be a single magnet or a plurality of magnets. Regardless of the number of magnets 816 that is provided in the bracket 842, the one or more magnets 816 may be evenly distributed about a midline 844 of the door that intersects a center of gravity of the door 810. The magnet 816 may be evenly distributed in that the magnet 816 provides an equal upward force on the left of the midline 844 compared to the right of the midline 844 so that the door 810 is raised evenly upward. The door 810 may appear horizontal or level to the ground. If the magnet 816 is provided as two separate or individual magnets, then magnet 818 may be provided as a singular elongate and contiguous magnet along a length 874 of the track 814 as needed to provide the repelling force as the door 810 slides left to right.

The converse may also be true. In particular, the magnet 818 may be provided as two or more magnets evenly distributed about a length of the track 814. If so, then the opposing magnet 816 may be provided as a single elongate and contiguous magnet that may have a length 48. The length 848 of the magnet 816 may be sufficiently long so that a repelling force is generated by two or more magnet immediately adjacent segments of magnet 818 so that the sliding motion of the door is not a stop and go motion as the magnet 816 transitions from one magnet segment 818 to a segment of another adjacent magnet 818. The length 48 of the magnet 816 may be equal to the length of the bracket 842 or shorter so long as it opposes magnet 818. The magnet 816 may be disposed about the midline 844 of the door 810 so as to provide an equal repelling force on the left side of the midline 844 compared to the right side of the midline 844. The door 810 itself may be attached to the bracket 842 by way of clamps 876. The clamps 876 may be clamped onto a body of the door 810. The clamp 876 may have a protrusion that fits within a slotted hole 878 of the bracket. To level the door 810, a nut may be adjusted so that the door 810 appears level to the ground.

The repelling force of the magnets 816, 818 may be adjusted by increasing or decreasing the strength of the magnets 816, 818. Preferably, the repelling force created by the magnets 816, 818 is equal to the weight of the door 810 and lifts the door 810 evenly upward and gaps 884, 886 still is positive so that the door 810 can be pushed upward or downward.

Referring now to FIG. 38, the bracket 842 may have a C-shaped configuration as identified by broken line 880. Additionally, the track 814 may have an inverted C-shape configuration as shown by broken line 882. The nested C-shape configurations of the bracket 842 and the track 814 allows the magnets 816, 818 to be repelled by each other and lift the door 810 upward. Preferably, the repelling force generated by the magnets 816, 818 is equal to the weight of the door 810. In this manner, a gap 884 exists between the bracket 842 and the track 814 when the door 810 is stationary. The door 810 can be pushed down if needed because of the gap 884. Moreover, a gap 886 may also exist between the bracket 842 and the track 814 when the door 810 is stationary. The door 810 can be pushed upward if needed. When the user grips a handle 888 (FIG. 36) and moves the door 810 left and right in the direction of arrow 812, the inertia of the door 810 may cause the left and right sides of the door 810 to shift up and down.

Moreover, the repelling force generated by the magnets 816, 818 cannot be laterally balanced through magnetic forces when the sliding door 810 is in motion or stationary. By way of example and not limitation, referring to FIG. 38, when two magnets 816, 818 are vertically disposed above each other, they would laterally fall off of one another unless restrained. Laterally means to the left or right which is traverse to arrow 812. (see FIG. 36)

In order to account for the vertical motion of the door 810, when sliding the door 810, and also to restrain the magnets 816, 818 so that they are vertically aligned and do not laterally fall off of one another, the bracket 842 may be attached to a slide 890. The slide 890 may have an inner member 892, an outer member 894 and a ball bearing race 896. The inner member 892 may have a trapezoidal notch 898 which receives a trapezoidal protrusion 900 of the bracket 842. The trapezoidal protrusion 900 may be inserted into the notch 898 and retained there in to attach the inner member 892, and thus the slide 890 to the bracket 842. The inner member 892 may have side walls 912 that define an indentation or bearing race 914 in which the bearings 916 are disposed in.

Preferably, the inner and outer members 892, 894 are fabricated in a heavy-duty fashion by using stiff and strong material so as to hold a portion of the weight of the door 810 if not the full weight of the door 810. Because the door 810 is preferably fully supported by the repelling force generated by the magnet 818, the slide 890 does not need to accommodate or be able to withstand vertical forces equal to the full weight of the door 810 but only a fraction thereof. By way of example and not limitation, slide 890 may withstand vertical forces between one to 20 pounds whereas the door 810 may weigh up to 100 to 200 pounds. However, it is also contemplated that the slide 890 may withstand or be rated to withstand vertical forces up to the weight of the door 810.

The ball bearing race 896 may include a plurality of holes 918 that can receive the ball bearings 916. The holes 918 may be sufficiently large so that the ball bearings 916 may freely rotate when disposed within the holes 916, as shown in FIG. 38. The holes 918 maintain a distance between the ball bearings 916 when the slide 890 is sliding back and forth.

The outer member 894 may also have side walls 920 and bearing races 922. The ball bearings 916 slide within the races 914 and 922 of the inner and outer members 892, 894. The slide 890 may be sized lengthwise in order to allow the door 810 to slide its full length as designed or needed. The outer member 894, and more particularly the side walls 920 of the outer member 894 may define interface surfaces 924 (see FIG. 39). The inner face surfaces 924 (see FIG. 39) may contact and slide against the interior surfaces 926 of an interior cavity 928 of the track 814. The interface surfaces 924 and the interior surfaces 926 may preferably be coated with an anti-stick layer including, but not limited to, silicone. This is to help vertical movement of the slide 890 when the door 810 is slid left to right.

Figure 39:
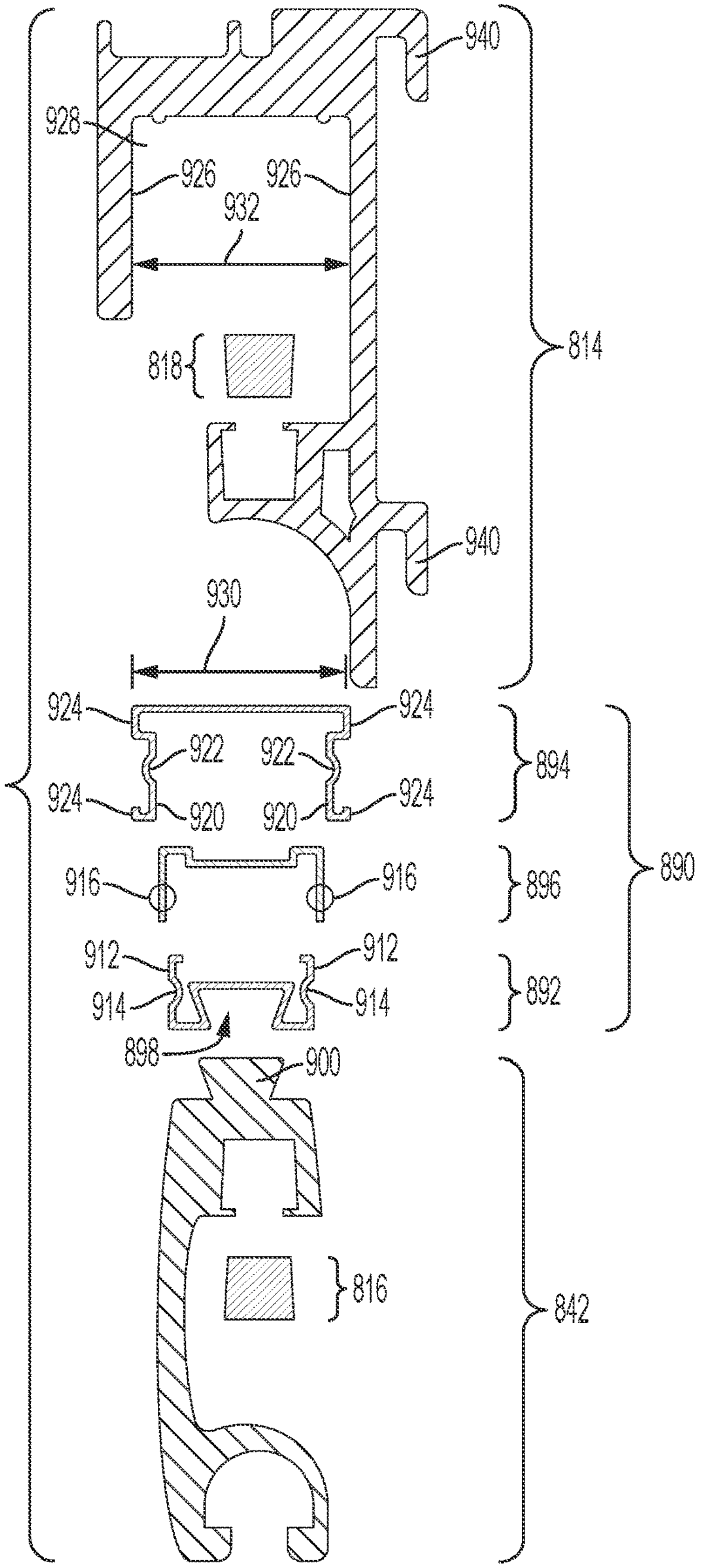
FIG. 39 is an exploded cross-sectional transverse view of the door shown in FIG. 36.
Figure 40:
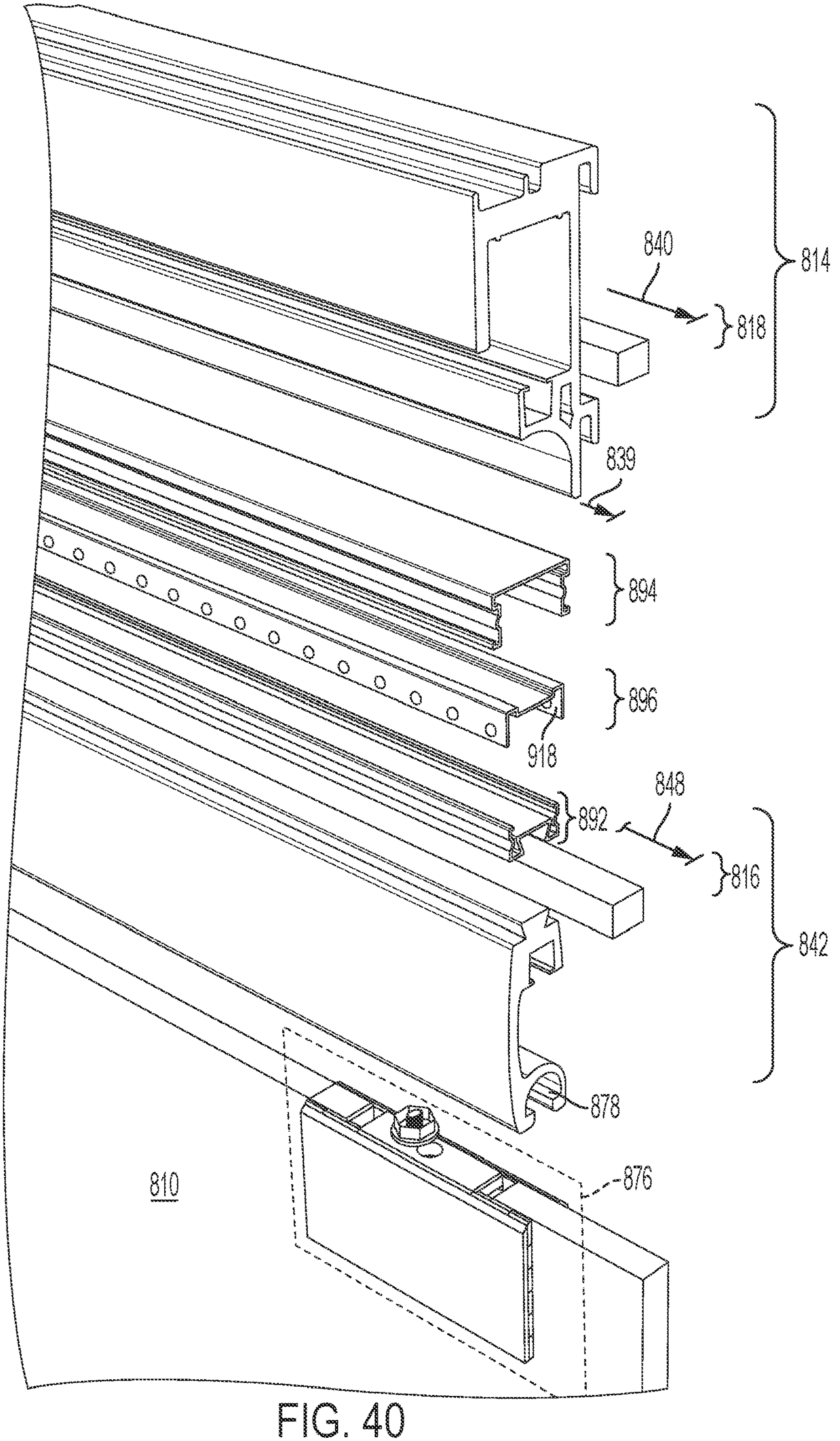
FIG. 40 is a left exploded cross-sectional view of the door shown in FIG. 36.
Figure 41:
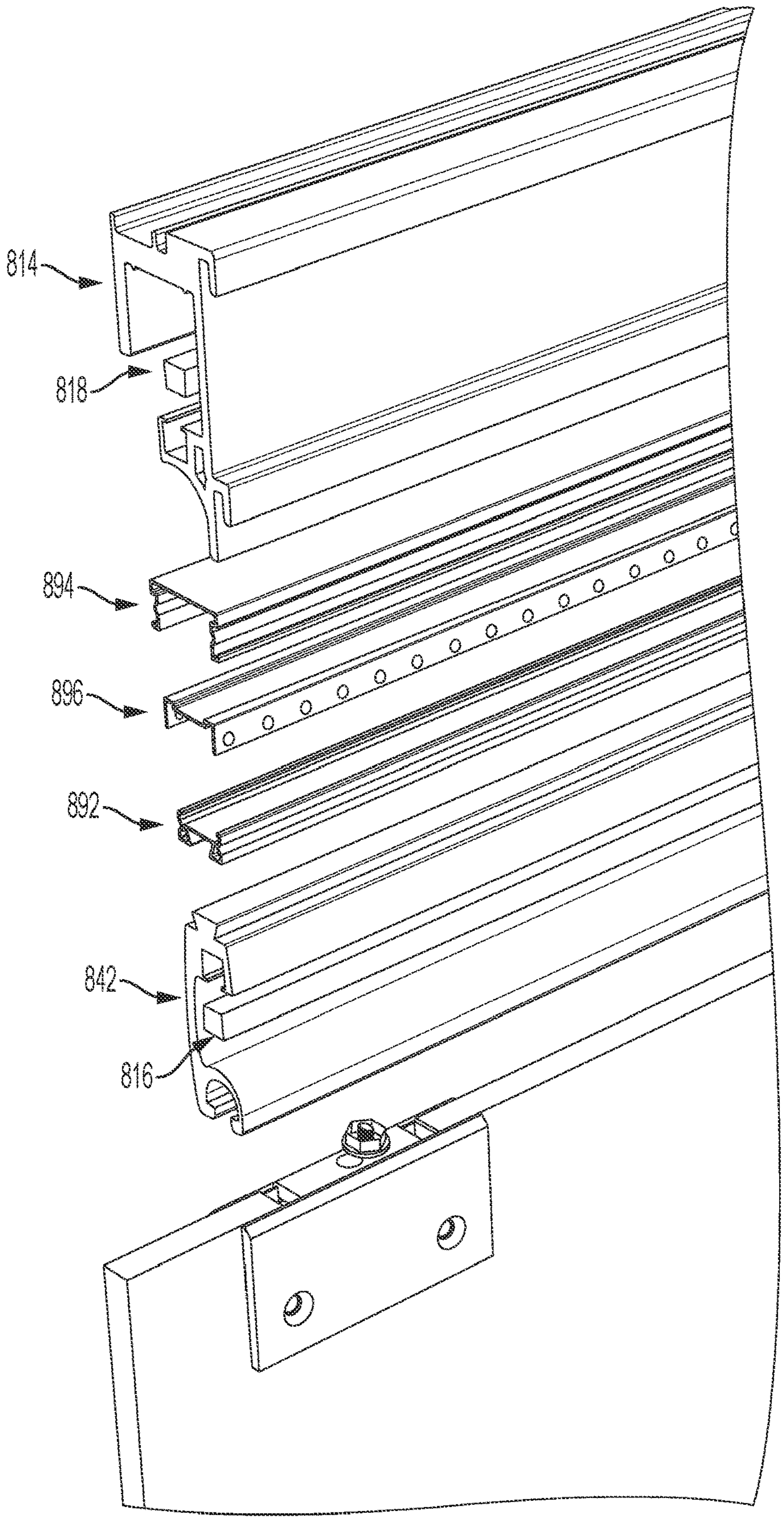
FIG. 41 is a right exploded cross-sectional view of the door shown in FIG. 36.
Figure 42:
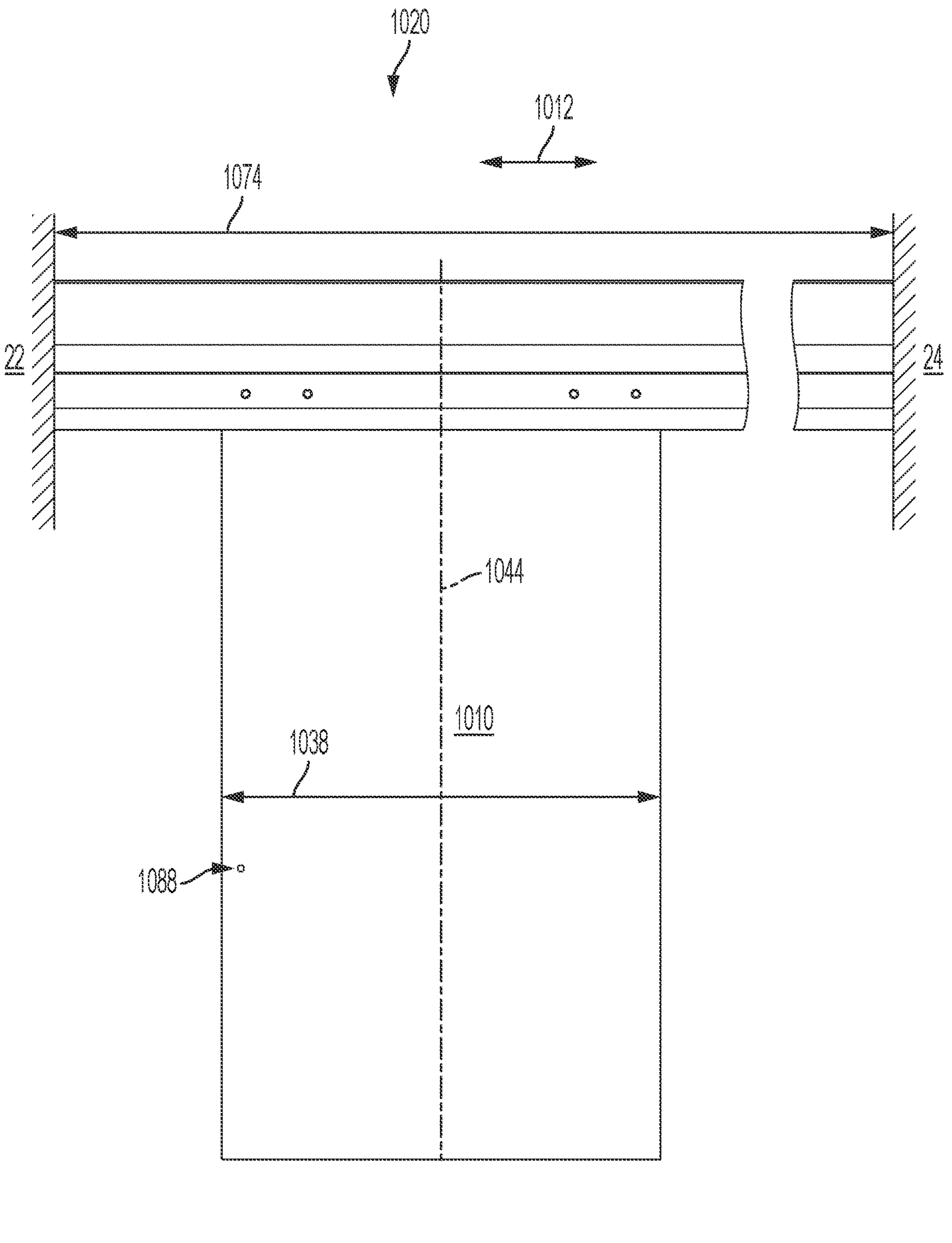
FIG. 42 is a front view of a tenth embodiment of the door.

Additionally, a width 930 of the outer member 894 defined by the interface surfaces 924 may be less than an inner width 932 defined by the interior surfaces 926. Preferably, the interface surfaces 924 are parallel to each other on the left and right sides as shown in FIG. 39. Moreover, the interior surfaces 926 are preferably parallel to each other, also as shown in FIG. 39. The width 930 may be slightly less than the width 932. By way of example and not limitation, the width 930 may be between 0.001 inch to 0.25 inches smaller than or less than the width 932. This is provided so that the slide 890 does not get stuck or bind when the slide 890 is vertically displaced when the door 810 is moved left to right.

During operation, when the door 810 is stationary, the magnets 816, 818 are not bottomed out in that gap 884 is still present or exists. Moreover, the repelling force is generated by the magnets 816, 818 are not sufficiently great so that the top of the outer member 894 does not touch a top 134 of the interior cavity 928. Preferably, gap 886 still exists. When the door 810 is traversed left to right in direction of arrow 812, the inner member 892 slides within outer member 894. The ball bearings 916 are held in place with ball bearing race 896. Preferably, the outer member 894 is longer than the inner member 892. The outer member 894 has a length 839 preferably equal to about or 80% a length of 818 of the track 814. The inner member 892 and the bearing race member 896 may be attached to each so that they do not slide against each other. The ball bearings 916 are held within the races 914, 922 of the inner and outer members 892, 894 and are held spaced apart from each other by bearing race 896. The lower member 892 and the bearing race 896 slide within the outer member 894 on the ball bearings 916.

Figure 43:
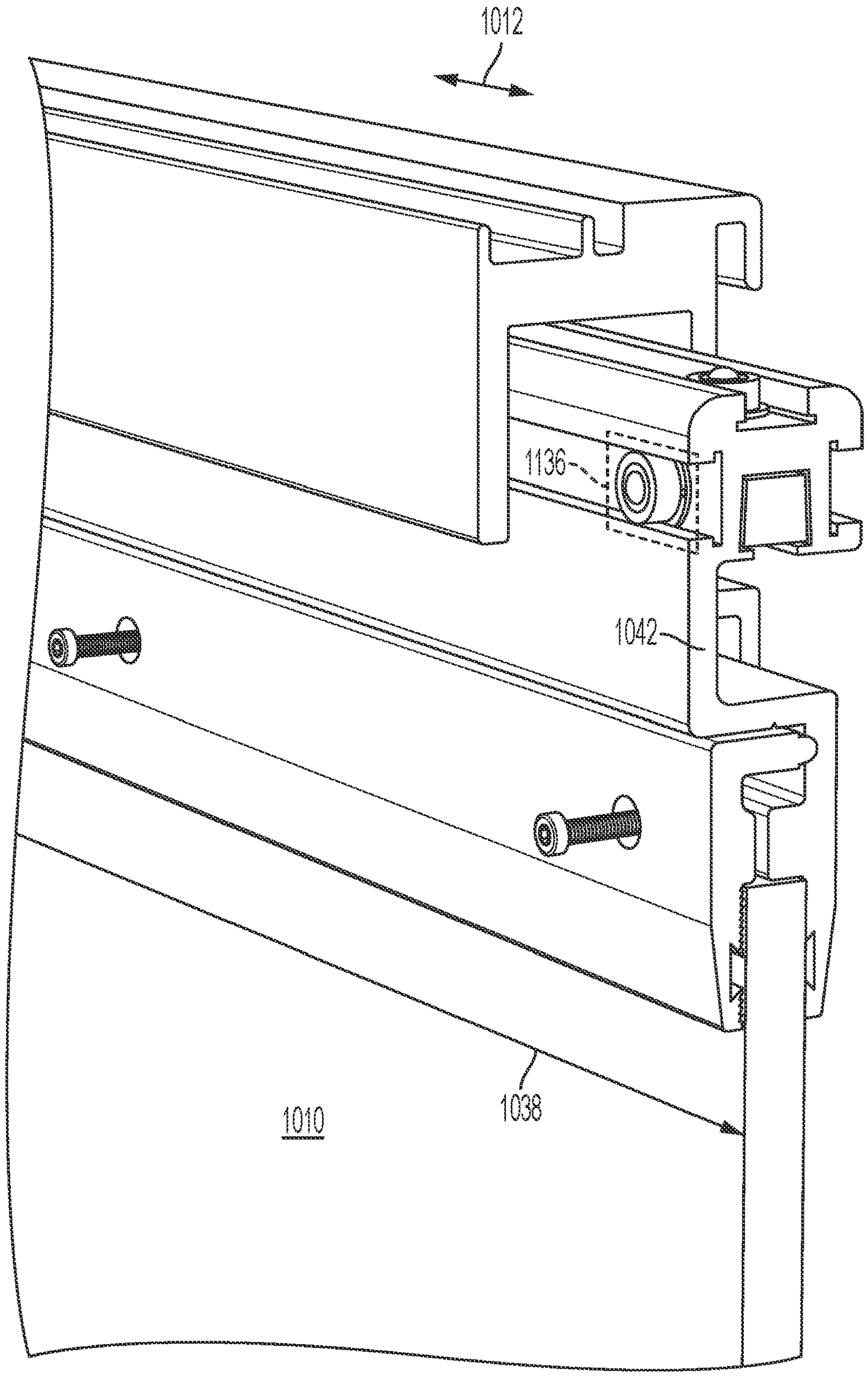
FIG. 43 is a left cross-sectional view of the door shown in FIG. 42.
Figure 44:
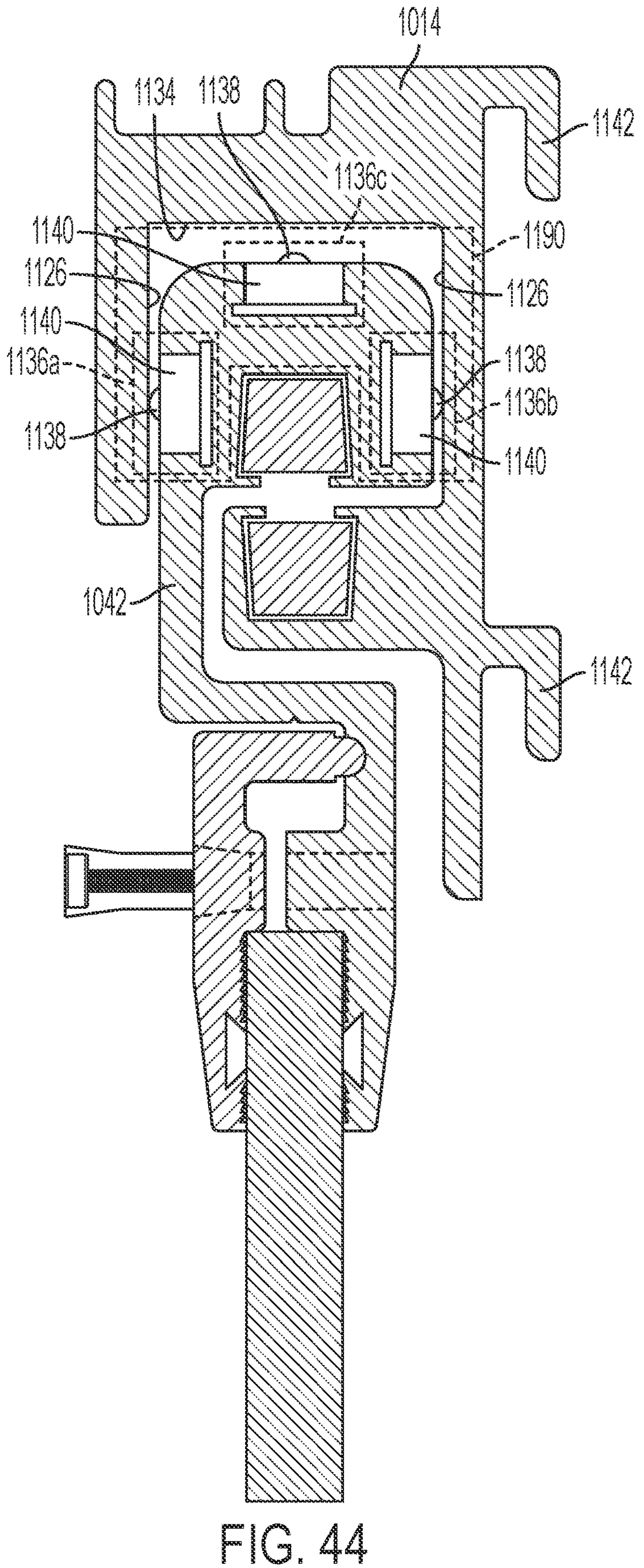
FIG. 44 is a cross sectional view of the door shown in FIG. 42.
Figure 45:
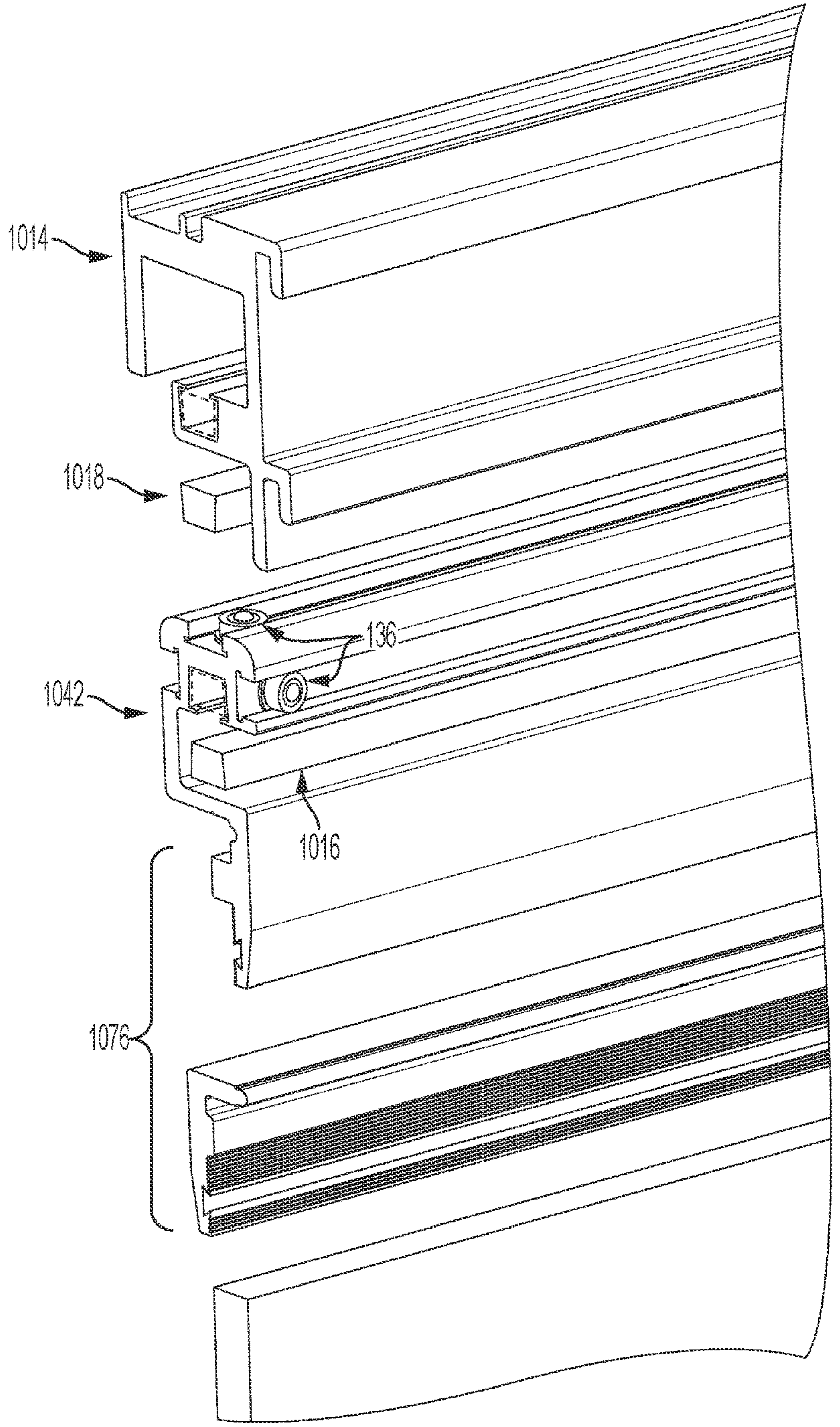
FIG. 45 is a right exploded cross sectional view of the door shown in FIG. 42

Referring now to FIGS. 42-45, a tenth embodiment of the shower door 1010 is shown. In lieu of a drawer slide mechanism 890 as shown and described in relation to the ninth embodiment, the upper portion of the bracket 1042 may have a plurality of bearings 1136 as shown in FIGS. 43-45. One or more bearings 1136 may be disposed on each of the left and right sides of the bracket 1042 as shown by bearings 1136*a, b* in FIG. 44. Preferably, two bearings 1136*a, b* are placed on each of the left and right sides of the bracket 1042. Additionally, one or more bearings 1136*c* may be located on the upper side of the bracket as shown in FIG. 44. Preferably, two or more bearings 1136*c* may be located on the upper side of the bracket 1042. A sufficient number of bearings 1136*a, b, c* may be placed along a longitudinal length of the bracket 1042 on the left, right and upper sides of the brackets 1042 so that the door 1010 is held in a generally stationery position laterally and up until the upper bearing 1136*c* touches the top surface 1136 of the bracket 1042 yet the door is allowed to move along direction of arrow 1012.

The bracket 1042 is shown as being elongate and substantially equal to a width 38 of door 1010. The bracket 1042 may be elongate and be positioned centrally with respect to the midline 1044. A set of bearings 1136*a, b, c* may be positioned on one side of the midline 1044 and another set of bearings 1136*a, b, c* may be positioned on the other side of the midline 1044 of the door 1010. The two sets of bearings 1136*a, b, c* may be placed equidistantly from the vertical midline 1044 or at different distances so long as the door 1010 is stabilized. It is also contemplated that two or more sets of bearings 1136*a, b, c* may be positioned on one side of the midline 1044 and two or more sets of bearings 1136*a, b, c* may be positioned on the other side of the midline 1044 of the door. If so, then the two or more sets of bearings 1136*a, b, c* may be positioned on both sides of the midline 1044 in a configuration to stabilize the door 1010.

It is also contemplated that one bracket may be positioned on the left side of the midline 1044 of the door 1010 while another bracket 1042 may be positioned on the right side of the midline 1044. The brackets 1042 may be spread apart equidistant from the midline 1044 equally stabilize the upper portion of the door 1010 laterally on the left and right sides. At least one set of bearings 1136*a, b, c* may be attached to each of the brackets 1042 on the left and the right of the midline 1044.

The bearings 1136*a, b, c* may have a ball bearing 1138. The ball bearing 1138 may be pushed outward with a spring disposed behind the ball bearing 1138 and in the housing 1140. The ball bearing 1138 may be spring loaded. The ball bearing 1138 can be depressed into a housing 1140 to prohibit binding of the ball bearing 1138 as it rolls on the interior surfaces 1126 and the top surface 1134. The ball bearing mechanism 1190 may replace the drawer slide 890 shown in FIGS. 36-41.

The track 814, 1014 may be attached to the opposed walls 22,24. However, it is also contemplated that the track 814, 1014 may be hung on a side wall near an upper portion of a door opening. The track 814, 1014 may have French cleats 942, 1142 (see FIGS. 38, 44). The track 814, 1014 may be hung on upwardly directed cleats that are attached to a side wall surface adjacent the upper portion of the door opening. The downwardly facing cleats 942, 1142 may be hung on the upwardly facing cleats attached to the surface of the wall surface adjust the upper portion of the door opening. Additionally, or alternatively, the track may be attached to the side wall surface with an adhesive, nut and bolt connection or screws to further enhance the strength or attachment strength of the track 814 to the wall.

Figure 52:
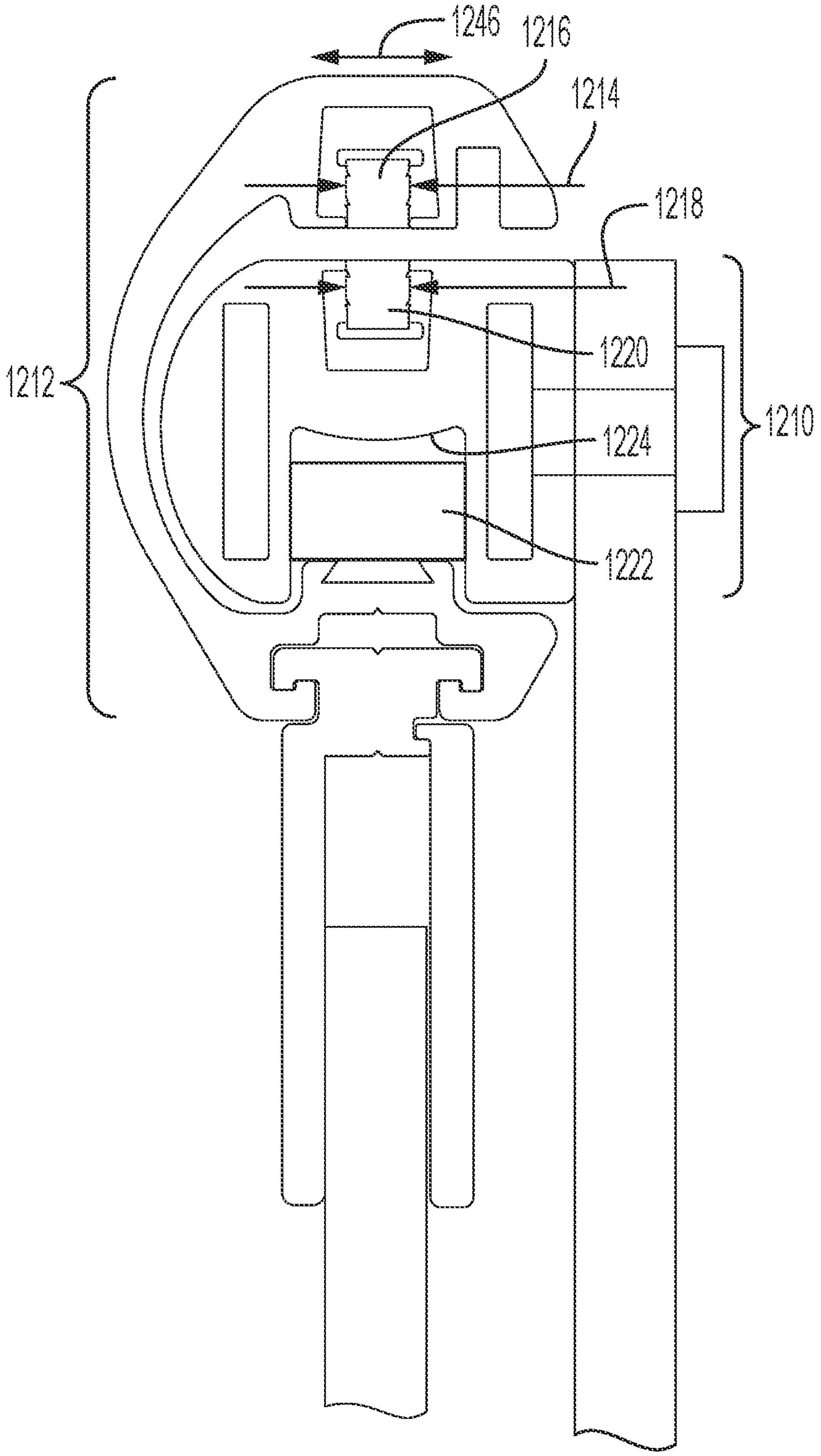
FIG. 52 is a variant of the door shown in FIG. 46.

Referring now to FIGS. 46-55, various embodiments of a track 1210 and bracket 1212 are disclosed. For example, a first embodiment shown in FIG. 52 illustrates a width 1214 of a first magnet 1216 which equals a width 1218 of the second magnet 1220. In the second embodiment shown in FIG. 53, the width 1214 of the first magnet 1216 is greater than the width 1218 of the second magnet 1220. In the third embodiment shown in FIG. 54, the width 1214 of the first magnet 1216 is less than the width 1218 of the second magnet 1220. In each of the first, second, and third embodiments shown in FIGS. 52-54, a stabilizing prong 1222 may be attached to both the bracket 1212 and the track 1210. In the embodiments shown in FIGS. 52-54, the stabilizing prong 1222 is fixedly attached to the bracket 1212 and slidingly disposed within a recess 1224 of the track 1210. The stabilizing prong 1222 maintains vertical alignment between the first and second magnets 1216, 1220, and as a result vertical alignment also between the track 1210 and the bracket 1212.

Other configurations of how the stabilizing prong is attached to the track 1210 and bracket 1212 are also contemplated. By way of example and not limitation, the stabilizing prong may be formed as a part of the track 1210, and the bracket 1212 may have a recess in which the stabilizing prong is disposed in. Another configuration contemplates the stabilizing prong as a dual prong that is split like a fork so that the forked dual prongs receives the track 1210. In other words, the track 1210 may be received between the forked dual prongs which is a part of the bracket 1212. The reverse configuration is also contemplated. In particular, the forked dual prongs may be a part of the track 1210 and the bracket 1212 is received between the forked dual prongs of the track 1210.

Figure 58:
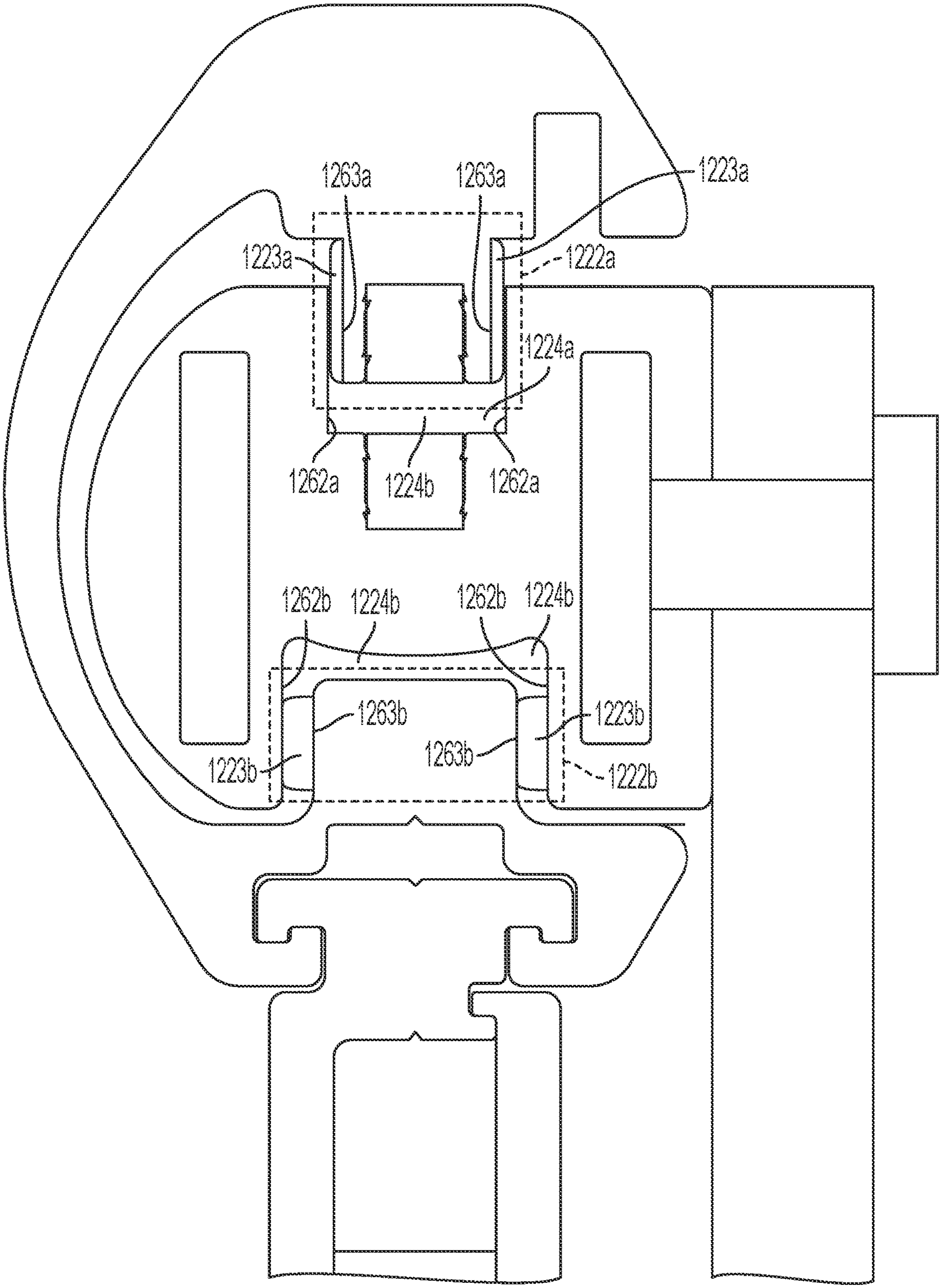
FIG. 58 is a thirteenth embodiment of the door.

Another further alternative embodiment contemplates two prongs. In FIG. 58, upper and lower stabilizing prongs 1222*a, b* may be attached to the bracket and may be diametrically opposed to each other. Alternatively, the upper and lower prongs may be respectively attached to the bracket and track with the recesses that receive the prongs respectively formed in the track and bracket. Conversely, the upper and lower prongs may be respectively attached to the track and bracket with the recesses that receive the prongs respectively formed in the bracket and track.

Referring still to FIG. 58, the stabilizing prongs 1222*a, b* may be respectively received within recesses 1224*a, b*, as shown in FIG. 58. The stabilizing prongs may also have pads 1223*a, b*. The pads 1223*a, b* may be attached to the sidewalls 1262*a, b* of the recesses 1224*a, b* and/or the pads 1223*a, b* may be attached to the sidewalls 1263*a, b* of the stabilizing prongs 1222*a, b*. By way of example and not limitation, the pads 1223*a* are shown as attached to the stabilizing prong 1222*a*. In contrast, the left pad 1223*b* is shown as being attached to the stabilizing prong 1222*b*, whereas the right pad 1223*b* is shown as being attached to the stabilizing prong 1222*b*. However, any combination is contemplated. The left and right pads 1223*a* may both be attached to the sidewalls 1262*a* or 1263*a*. Or, any one of the left and right pads 1223*a* may be attached to the sidewalls 1262*a* or 1263*a*. Likewise, the left and right pads 1223*b* may both be attached to the sidewalls 1262*b* or 1263*b*. Or, any one of the left and right pads 1223*b* may be attached to the sidewalls 1262*b* or 1263*b*.

The embodiment shown in FIG. 58 also illustrates that it is contemplated that the magnet and the recesses may be formed as part of the stabilizing prong. In FIG. 58, the magnet is formed in the stabilizing prong which is attached to the bracket. However, it is also contemplated that the magnet may be formed in a stabilizing prong which is attached to the track.

Figure 57:
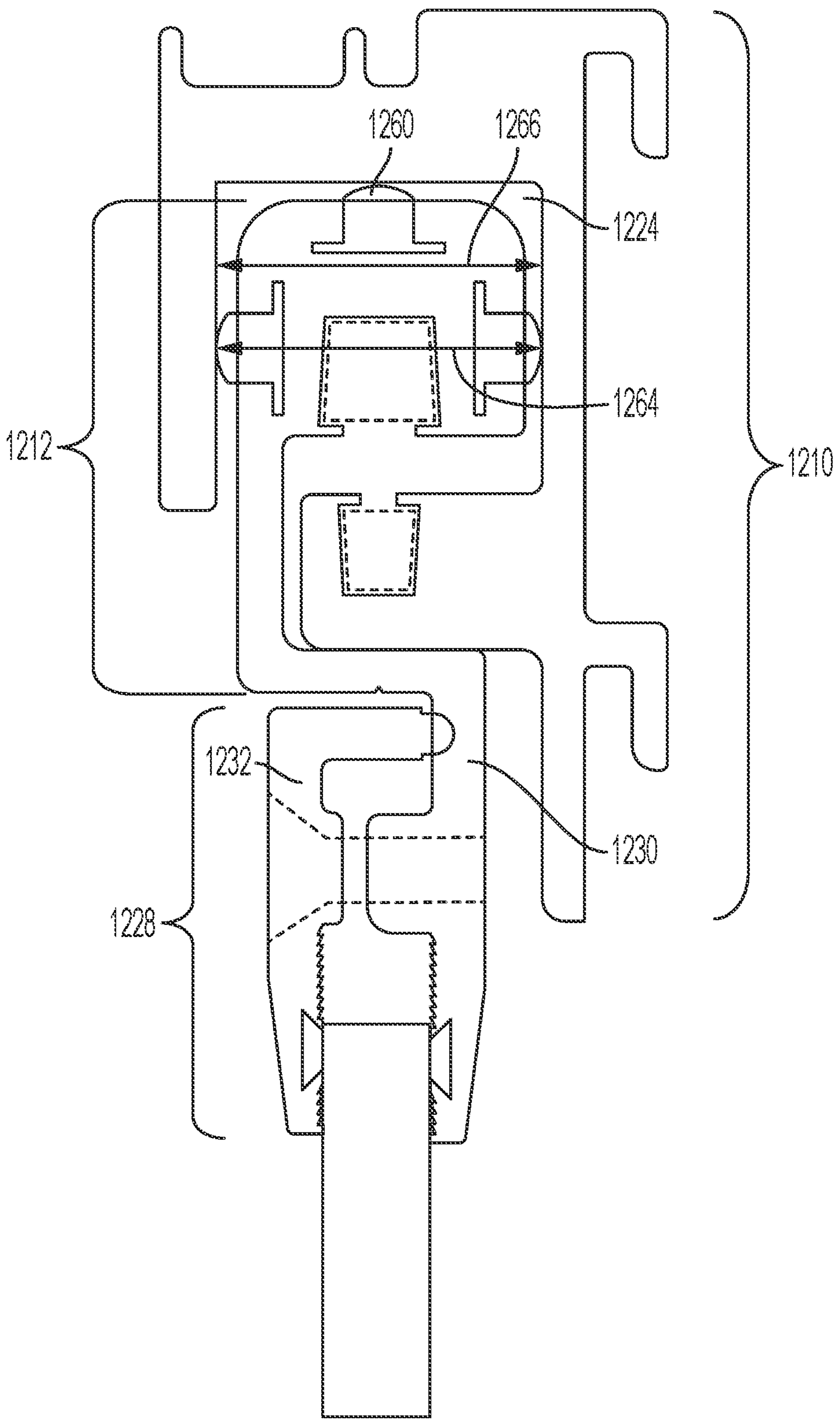
FIG. 57 is a cross sectional view of the door shown in FIG. 55.

Alternate positions of the magnets 16, 20 in relation to the stabilizing prong 22 and the recess 1224 are contemplated. By way of example and not limitation, in FIG. 46, the magnets 16, 20 are vertically aligned to each other and disposed above the stabilizing prong 22 and the recess 24. However, the opposition configuration is contemplated. By way of example and not limitation, the magnets 16, 20 are vertically aligned to each other and disposed below the stabilizing prong 22 and the recess 24, as shown in FIG. 57.

Figure 46:
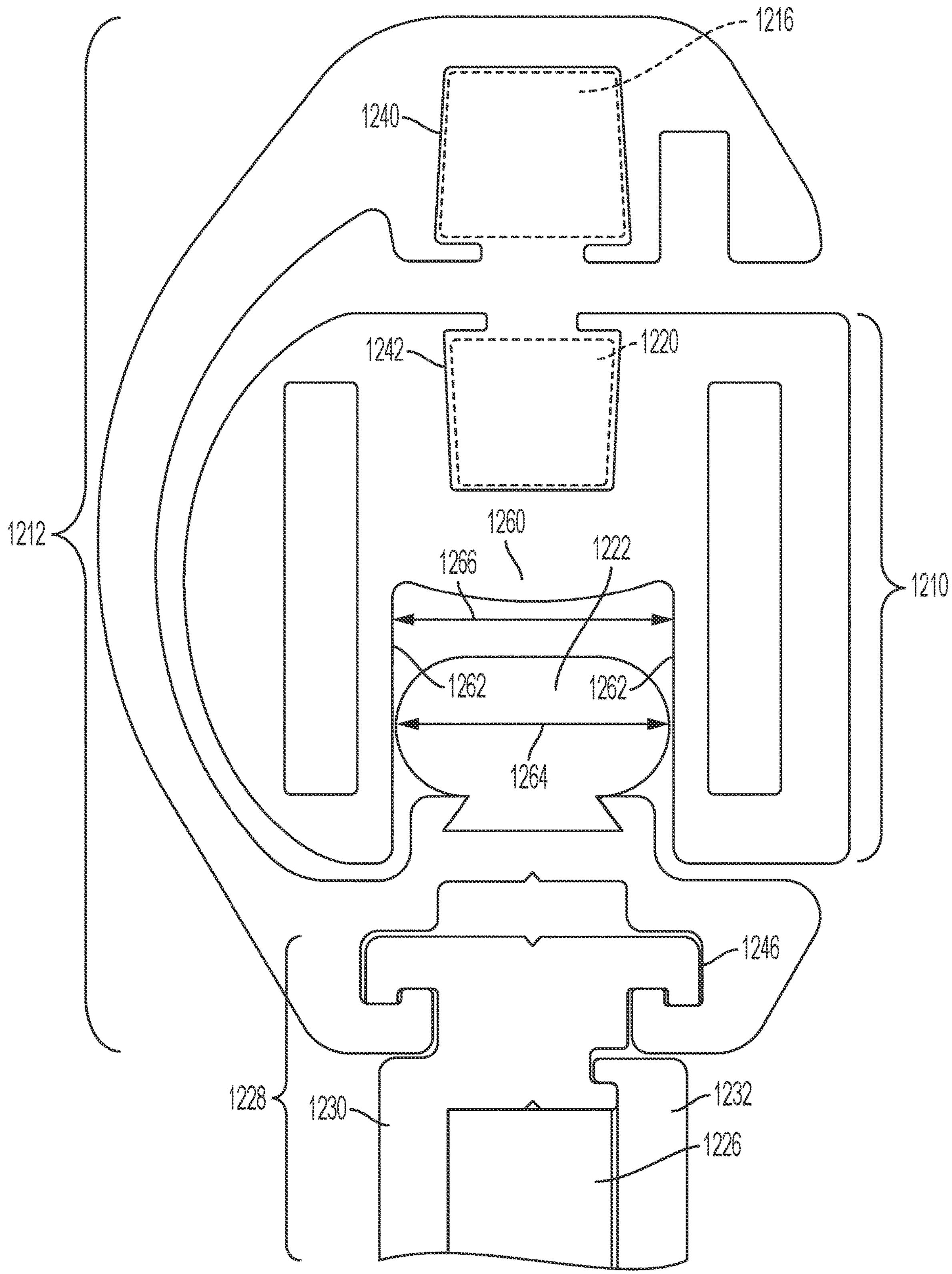
FIG. 46 is a cross section view of an eleventh embodiment of the door.
Figure 47:
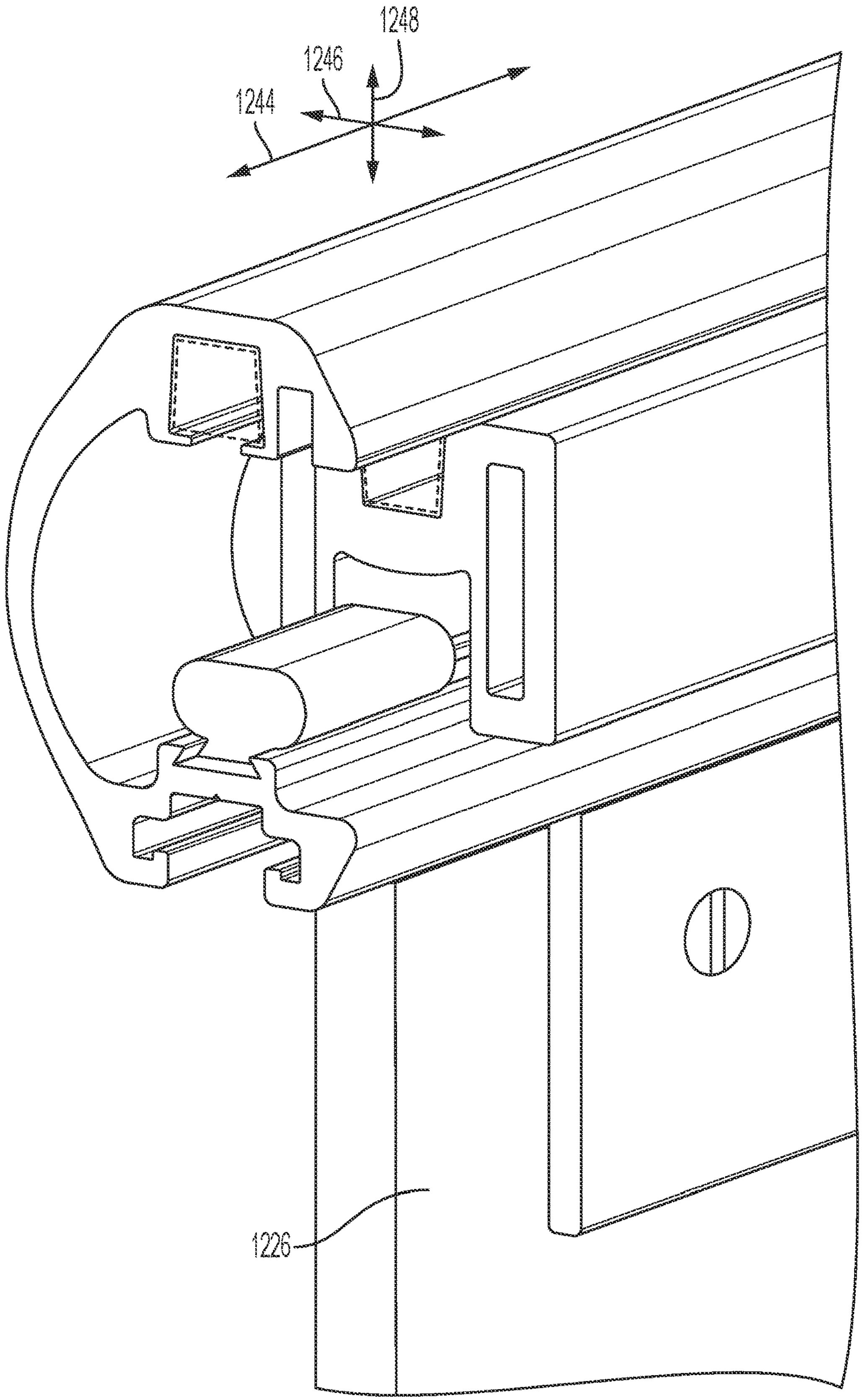
FIG. 47 is a right perspective view of the door shown in FIG. 46.
Figure 48:
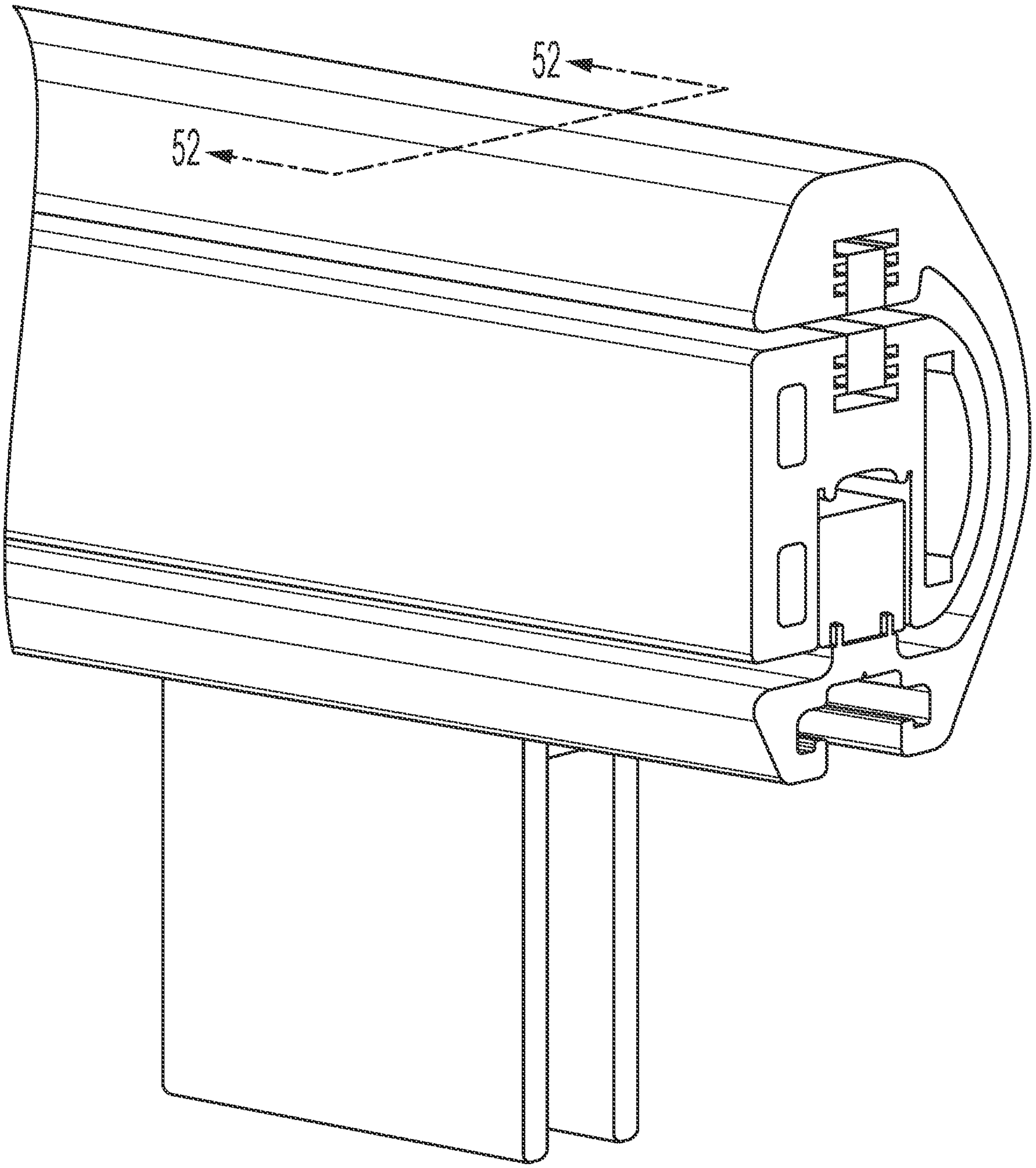
FIG. 48 is a left perspective view of a variant of the door shown in FIG. 46.

The glass door 1226 may be attached to the bracket 1212 with a clamp 1228. Two different embodiments of the clamp 1228 are shown in FIGS. 46 and 57. In particular, as shown in FIG. 46, the clamp 1228 may comprise two parts 1230, 32. The two parts 1230, 1232 may apply pressure to the door 1226 to hold the door up. The first and second parts 1230, 1232 can be clamped onto the door so that the first and second parts 1230, 1232 squeezes the door. The clamping or squeezing pressure may be accomplished by way of a threaded connection or bolt 1234 as shown in FIGS. 57 and 47. The first part 1230 may be slid into a recess of the bracket 1212 and fixed to the bracket 1212. The clamp 1228 shown in FIG. 46 is a separate part from the bracket 1212. However, it is also contemplated that the clamp 1228 may be integrated with the bracket 1212 as shown in FIG. 57. In this regard, the second part 1232 is movable with respect to the first part 1230. The first part 1230 may be integrated with the bracket 1212. By integrated, this is meant to mean that the second part 1230 of the clamp 1228 is fabricated from the unitary material with the bracket 1212.

Figure 53:
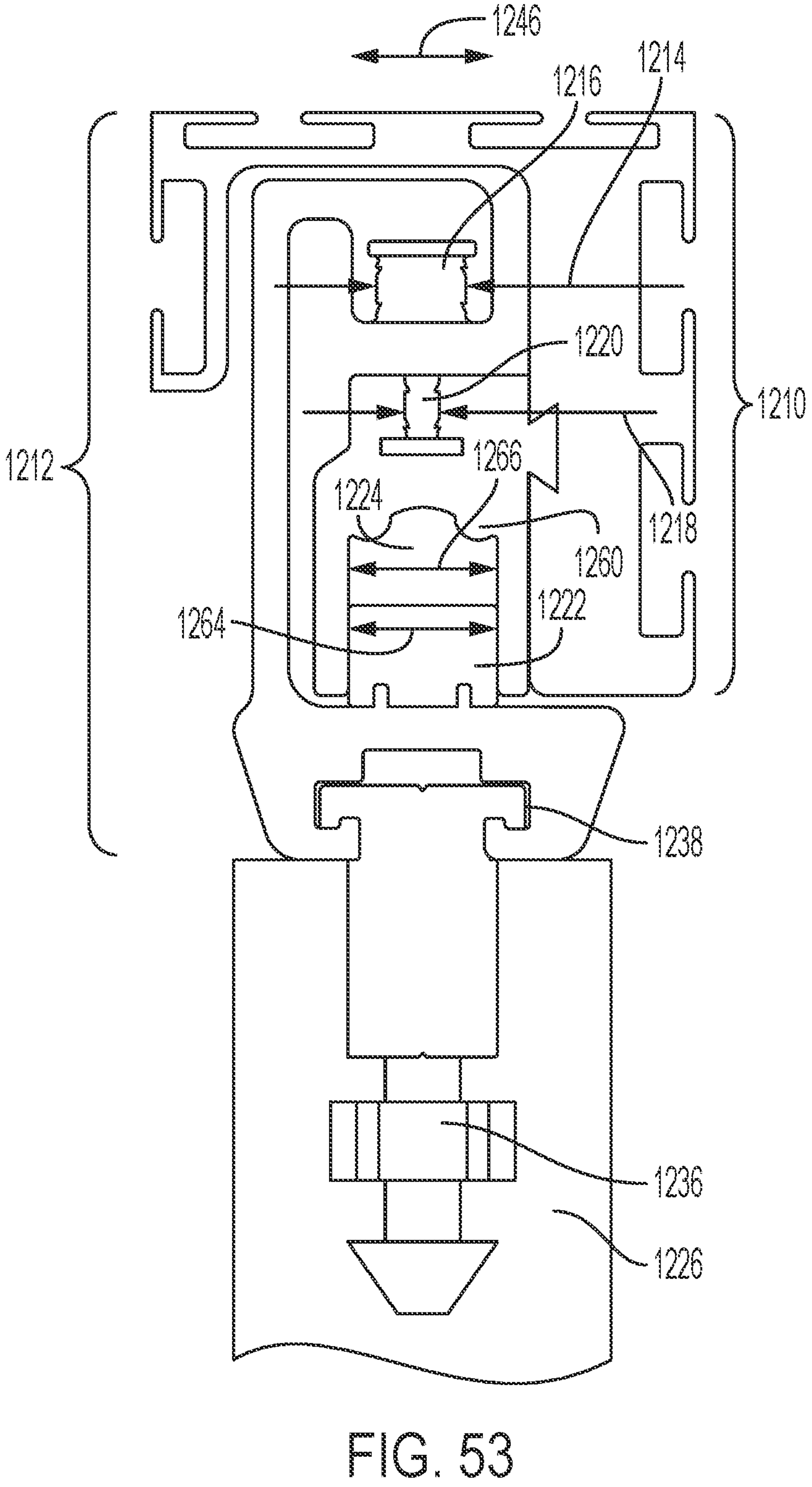
FIG. 53 is a variant of the door shown in FIG. 52.
Figure 54A:
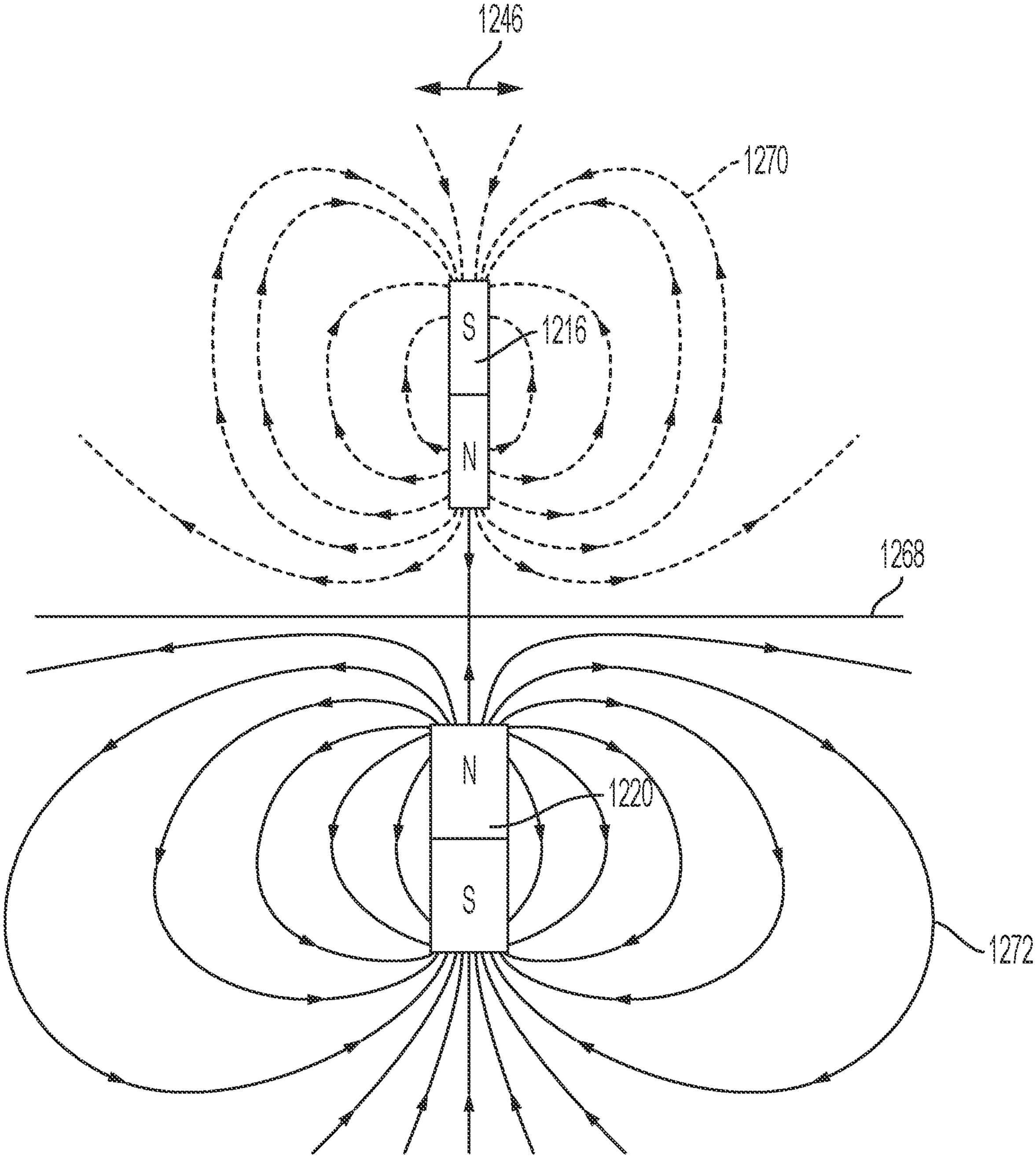
FIG. 54A illustrates magnetic fields of the magnets employed in the door shown in FIG. 54.
Figure 54:
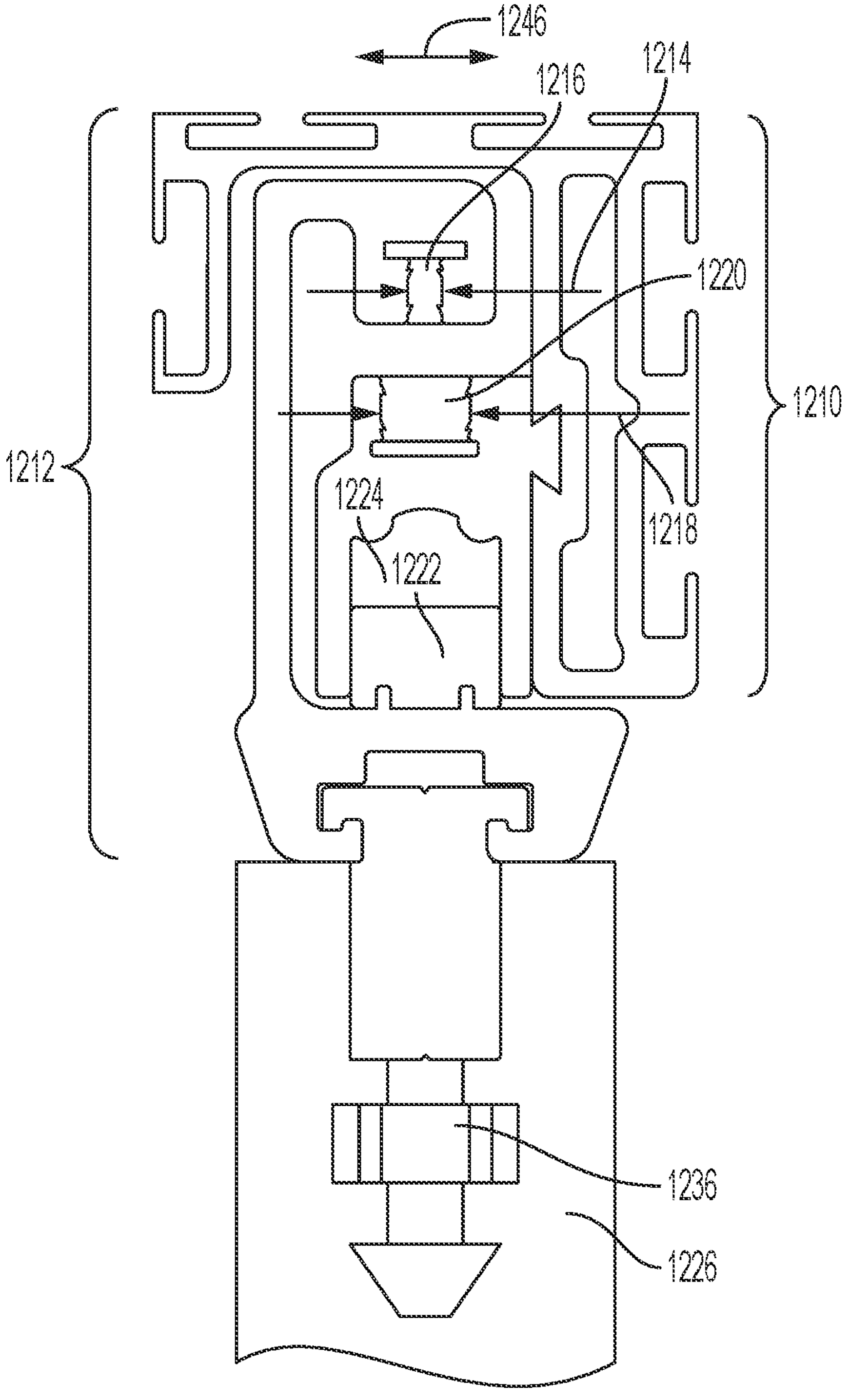
FIG. 54 is another variant of the door shown in FIG. 52.

Other ways of attaching the bracket 1212 to the door 1226 are also contemplated as shown in FIGS. 53 and 54. In this regard, the door may be attached to the bracket 1212 with a hook 1236. The hook 1236 may be embedded within the upper portion of the door 1226. The hook 1236 may slide within a slot 1238 (see FIG. 53) similar to the slot 1238 shown in FIG. 46.

Referring back to FIG. 46, the first and second magnets 1216, 1220 may be disposed within recesses 1240, 1242. The first magnet 16 may be disposed within recess 1240 of the bracket 1212. The second magnet 1220 may be disposed within recess 1242 of the track 1210. Although the magnets' outline as shown in the drawings may be shown as being smaller than the recesses 40, 42, the magnets 1216, 1220 may fit snugly within the recesses 1240, 1242 or be locked in place so that as the door 1226 slides along the track 1210, the magnets 1216, 1220 do not lose the longitudinal position within their respective track 1210 and bracket 1212.

Referring now to FIG. 47, the door 1226 may slide longitudinally in the direction of arrow 1244. A horizontal transverse direction is represented by arrow 1246. A vertical transverse access is shown by arrow 1248. The directional arrows 1244, 1246, 1248 are being shown with respect to the embodiment shown in FIG. 47 but these directional arrows 1244, 1246, 1248 are also used in relation to the other embodiments discussed herein including but not limited to the embodiments shown in FIGS. 52-57.

Referring now to FIGS. 52-54 and 52A-54A, the first and second magnets 1216, 1220 are repelled by each other due to their magnetic forces. The first and second magnets 1216, 1220 are oriented so like poles are facing each other. As shown in FIGS. 52A-54A, the north pole of the first magnet 1216 may face the north pole of the second magnet 1220. Alternatively, although not shown, the south pole of the first magnet 1216 may face the south pole of the second magnet 1220. In this regard, the first and second magnets 1216, 1220 repel each other. The weight of the door 1226 push the first and second magnets 1216, 1220 to each other. The repelling force of the first and second magnets 1216, 1220 is preferably equal to the weight of the door 1226 and other parts such as the bracket 1212, etc. Preferably, the bracket 1212 and the track 1210 do not vertically contact each other when the door 1226 is assembled because the repelling force is equal to the weight of the door 1226.

Figure 49:
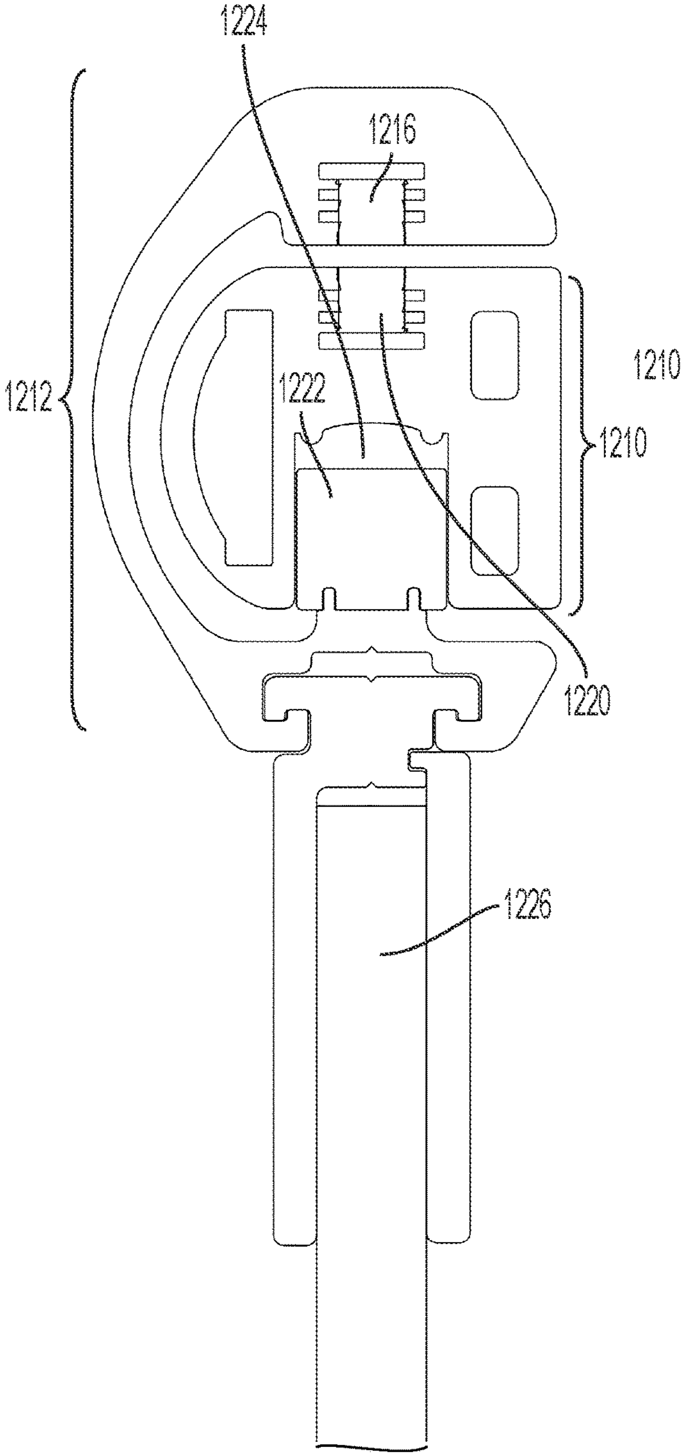
FIG. 49 is a cross sectional view of the door shown in FIG. 48 with a door attached and hanging on a bracket of the door.
Figure 50:
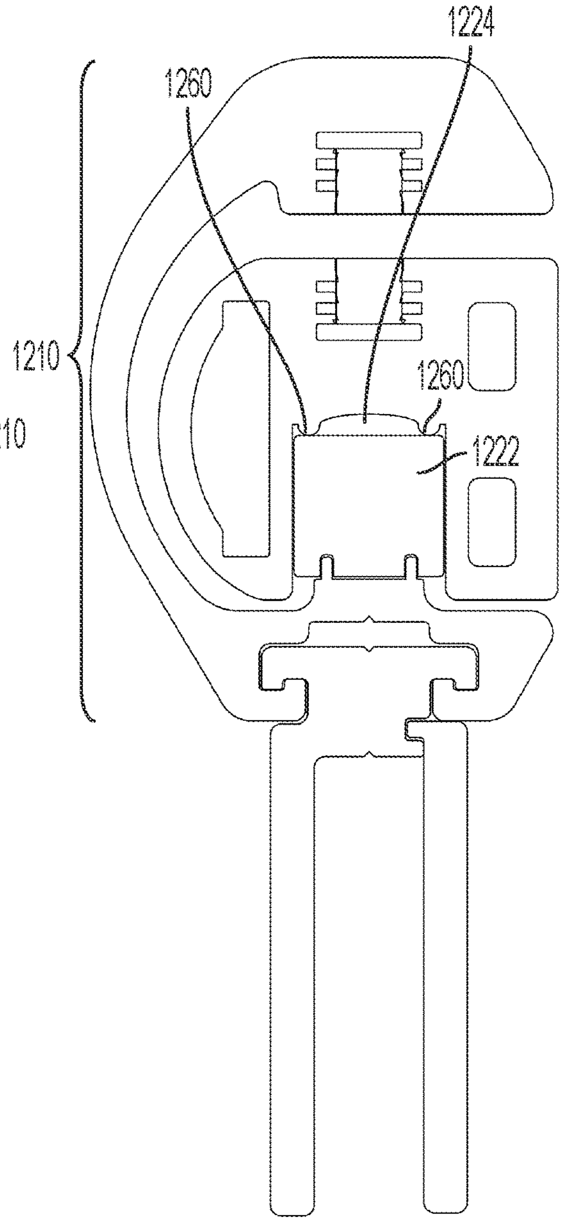
FIG. 50 is a cross sectional view of the door shown in FIG. 48 with no door attached to the bracket of the door.
Figure 51:
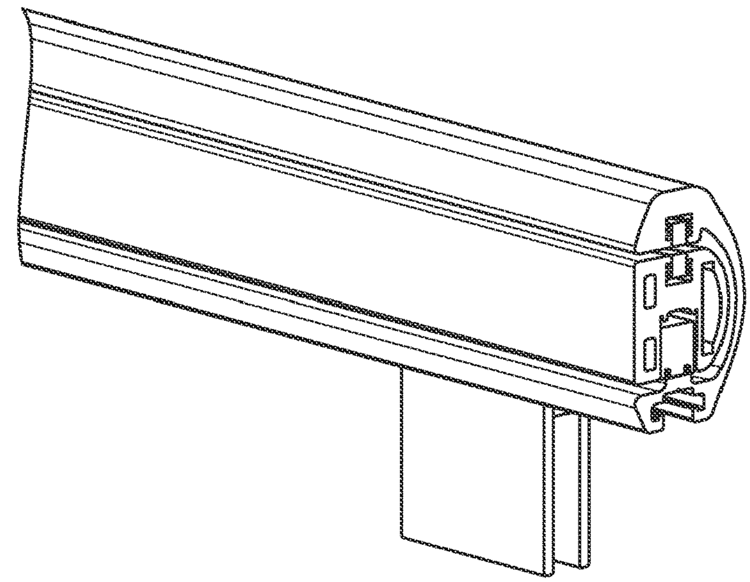
FIG. 51 is a left perspective view of a variant of the door shown in FIG. 46.
Figure 51A:
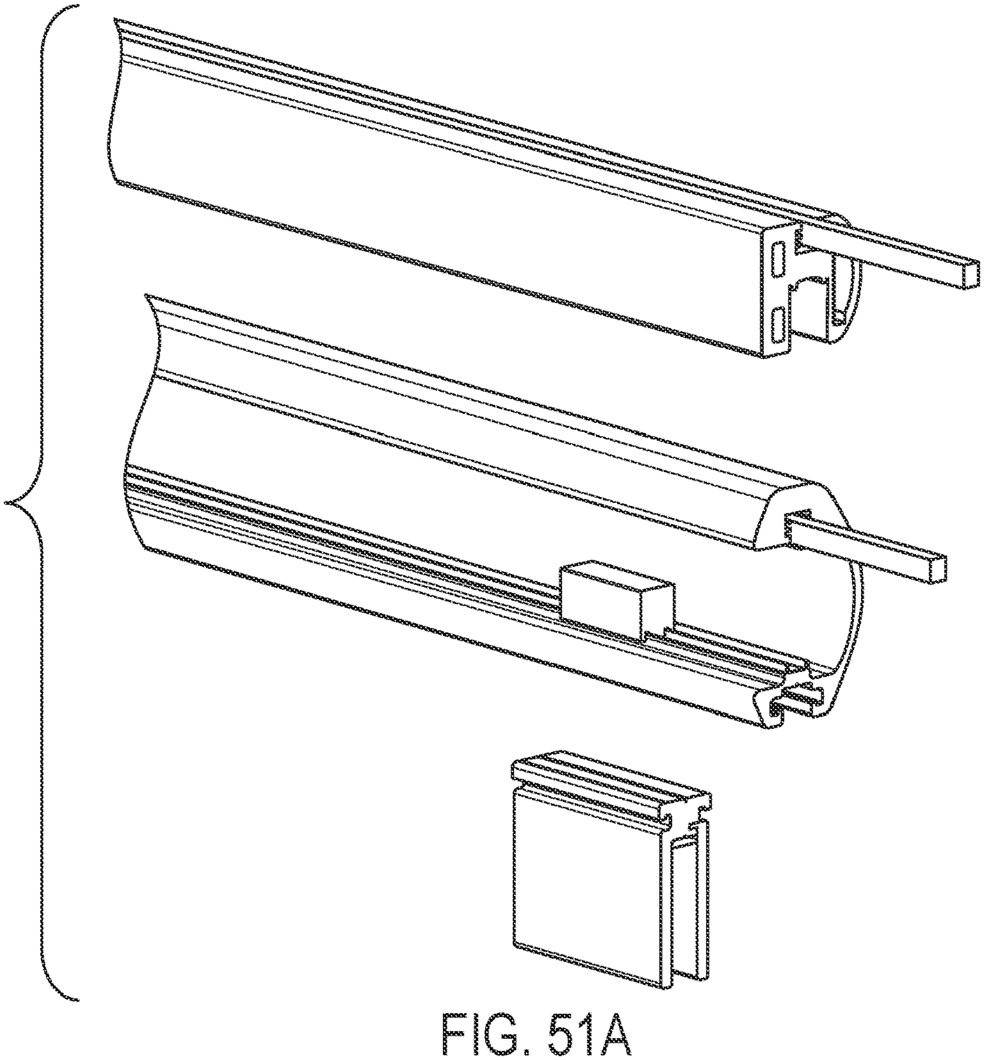
FIG. 51A is an exploded perspective view of the door shown in FIG. 51.
Figure 55:
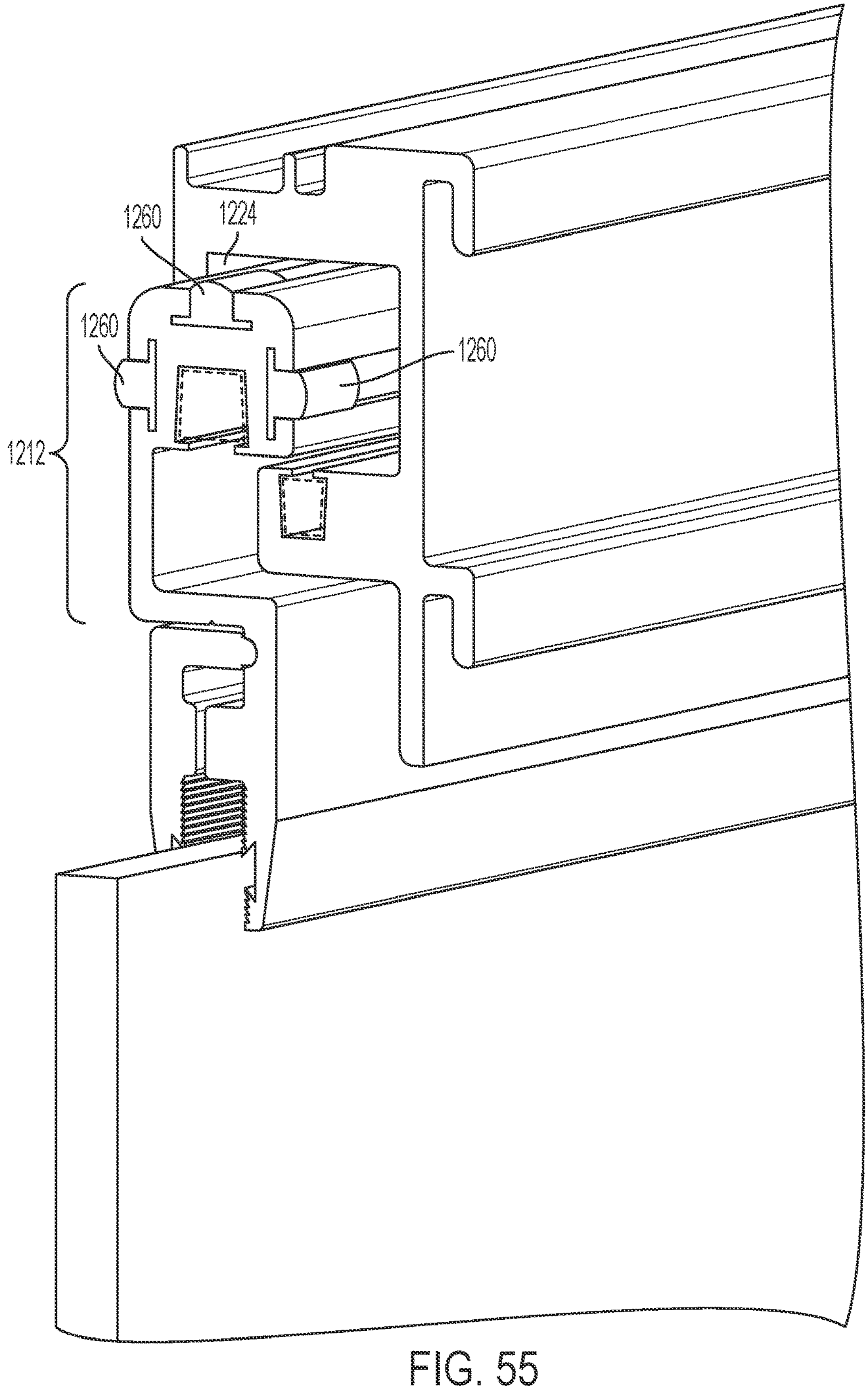
FIG. 55 is a twelfth embodiment of the door.
Figure 56:
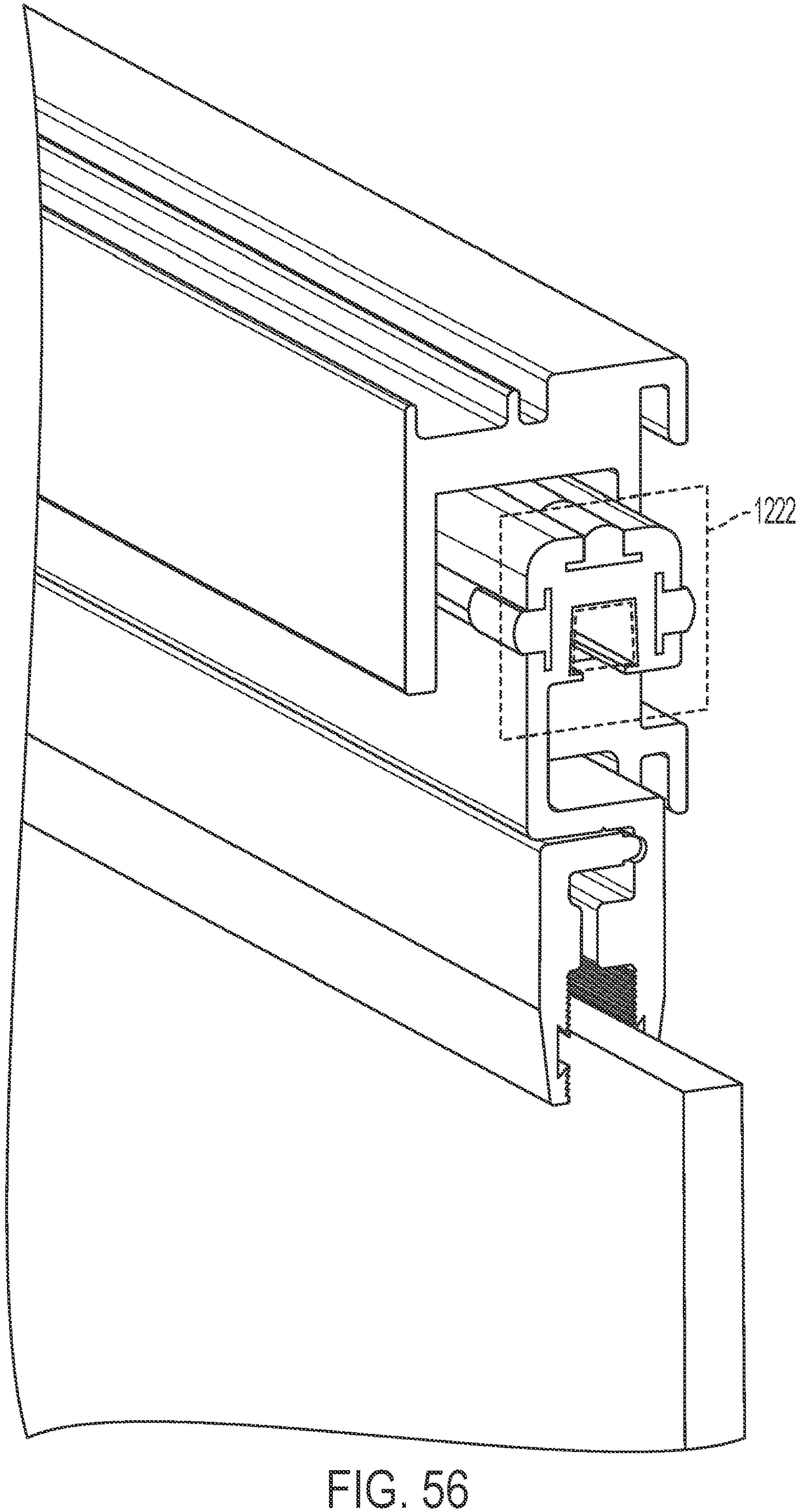
FIG. 56 is a perspective view of the door shown in FIG. 55.

When the door 1226 is slid between the open and closed positions, the door 1226 may tilt. In this case, the track 1210 and the door 1226 may bump up against each other. Preferably, the bracket 1212 does not bottom out on the track 1210. The reason is that the magnetic repelling force is sufficient to prevent this situation. Referring now to FIG. 49, this figure illustrates the situation where the door 1226 is pulling down on the bracket 1212. The first and second magnets 1216, 1220 are repelled by each other to lift up the door 1226. The bracket 1212 does not bottom out on the track 1210. FIG. 50 illustrates a situation where the door 1226 is not hanging on the bracket 1212. Because of this, the first and second magnets 1216, 1220 push the bracket 1212 and the track 1210 as far away as possible from each other. The stabilizing prong 1222 which is fixedly attached to the bracket 1212 pushed up against the bottom of the recess 1224. The bottom of the recess 1224 may have elongate nubs 1260 that contact the stabilizing prong 1222. Only a portion of the top surface of the stabilizing prong 1222 may contact the nubs 1260 to minimize friction between the surfaces. Other configurations of the nub 1260 are contemplated. FIG. 46 illustrates a variant of the nub 1260 which is formed as a convex surface of the upper surface of the recess 1224. FIGS. 53 and 54 shows a different shape of the nubs 1260. FIG. 55 shows the nub 1260 as an insert formed into the bracket 1212.

To prevent the track 1210 and bracket 1212 from shifting laterally, the door assembly may utilize the stabilizing prong 1222. As shown in FIG. 46, the stabilizing prong 1222 may contact or be in close proximity to the sides 1262 of the recess 1222. By way of example and not limitation, a width 1264 of the stabilizing prong 1222 may be less than a width 1266 of the recess 1224. Preferably, the width 1264 of the stabilizing prong 1222 may be ¼ inch to 0.010 inches less than the width 1266 of the recess 1224.

Other configurations of the nubs 1260 are also contemplated. By way of example and not limitation, the nubs 1260 may be formed in the track 1210 instead of the bracket 1212 as previously discussed. The stabilizing prong 1222 helps to prevent side to side motion between the track 1210 and the bracket 1212.

Figure 53A:
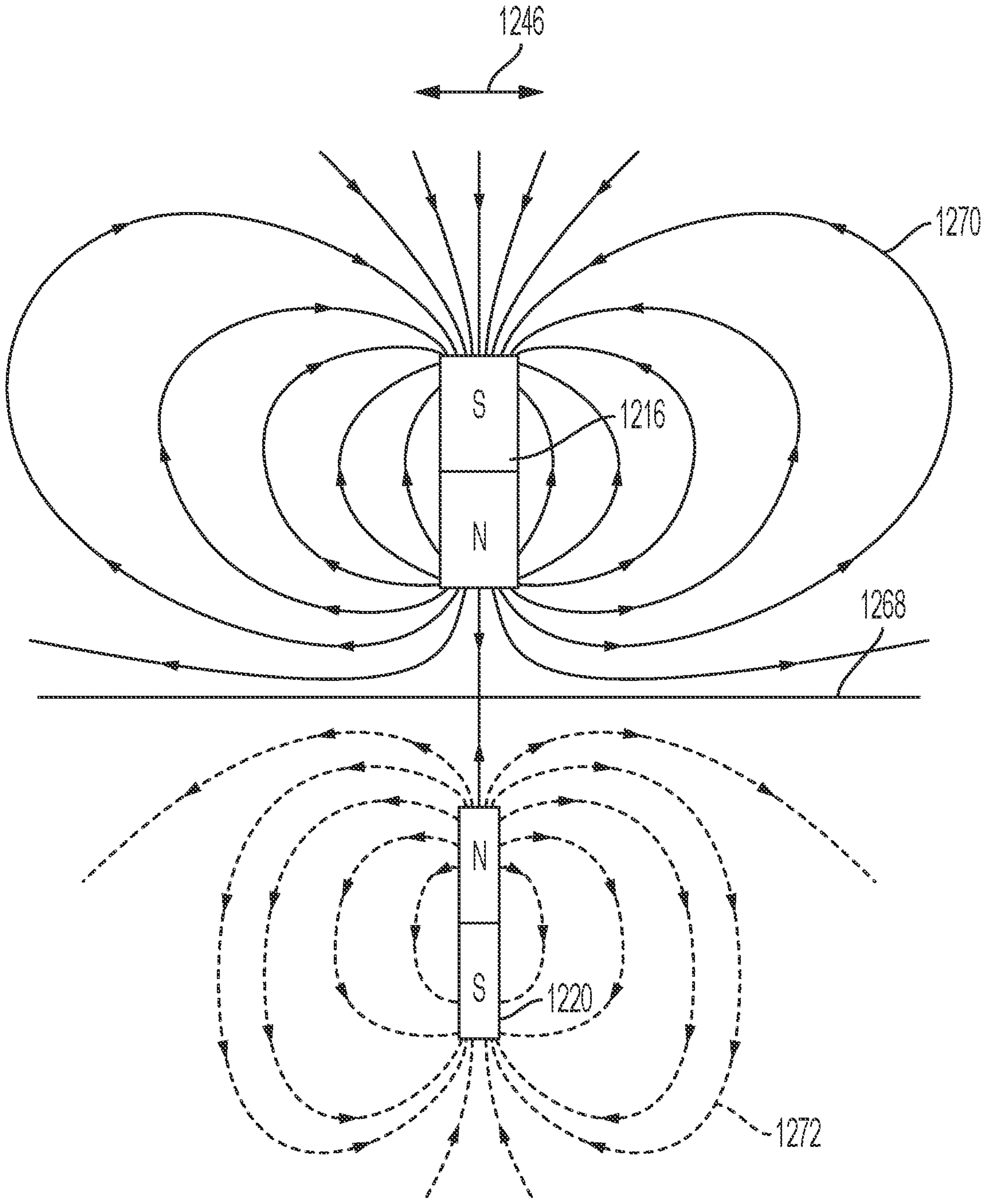
FIG. 53A illustrates magnetic fields of the magnets employed in the door shown in FIG. 53.

When side to side shifting occurs, the repulsive forces of the magnets 1216, 1220 may still be sufficient to lift the door 1226 up. However, when the side to side shifting is too great, then the bracket 1212 may bottom out on the track 1210. To prevent the bracket 1212 from slipping off and bottoming out on the track 1210, the side to side movement of the bracket 1212 is limited with a stabilizing prong 1222, as explained in the continued discussion of FIGS. 52-54 below. Moreover, even if the bracket 1212 does not laterally shift to the extent that the bracket 1212 would slip off and bottom out on the track 1210, the stabilizing prong 1222 may need to be pushed back with a lot of force to keep the bracket 1212 and the track 1210 vertically aligned. This occurs at the extreme ranges just before the bracket would slip off and bottom out on the track. To prevent a situation where a great force is required to keep the bracket 1212 vertically aligned to the track 1210, the magnets 1216, 1220 and magnetic fields 1270, 1272 of the upper and lower magnets 1216, 1220 may be different, as shown in FIGS. 53A and 54A. In this situation, when the magnet 1216 of the bracket 1212 slides laterally away from the centerline of the track's magnet 1220 to a small degree, the force required to keep the bracket 1212 vertically aligned to the track 1210 is minimal (e.g., less than 10 lbs., and preferably less than 5 lbs. or 1 lb.). The reason is that the magnetic fields 1270, 1272 of the magnets 1216, 1220 are different widths. The wider width magnetic field provides a wide support for the smaller magnetic field to be supported upon. The stabilizing prong may be sized to limit lateral shifting to a point where the lateral force to keep the bracket vertically aligned over the track is minimal.

Figure 52A:
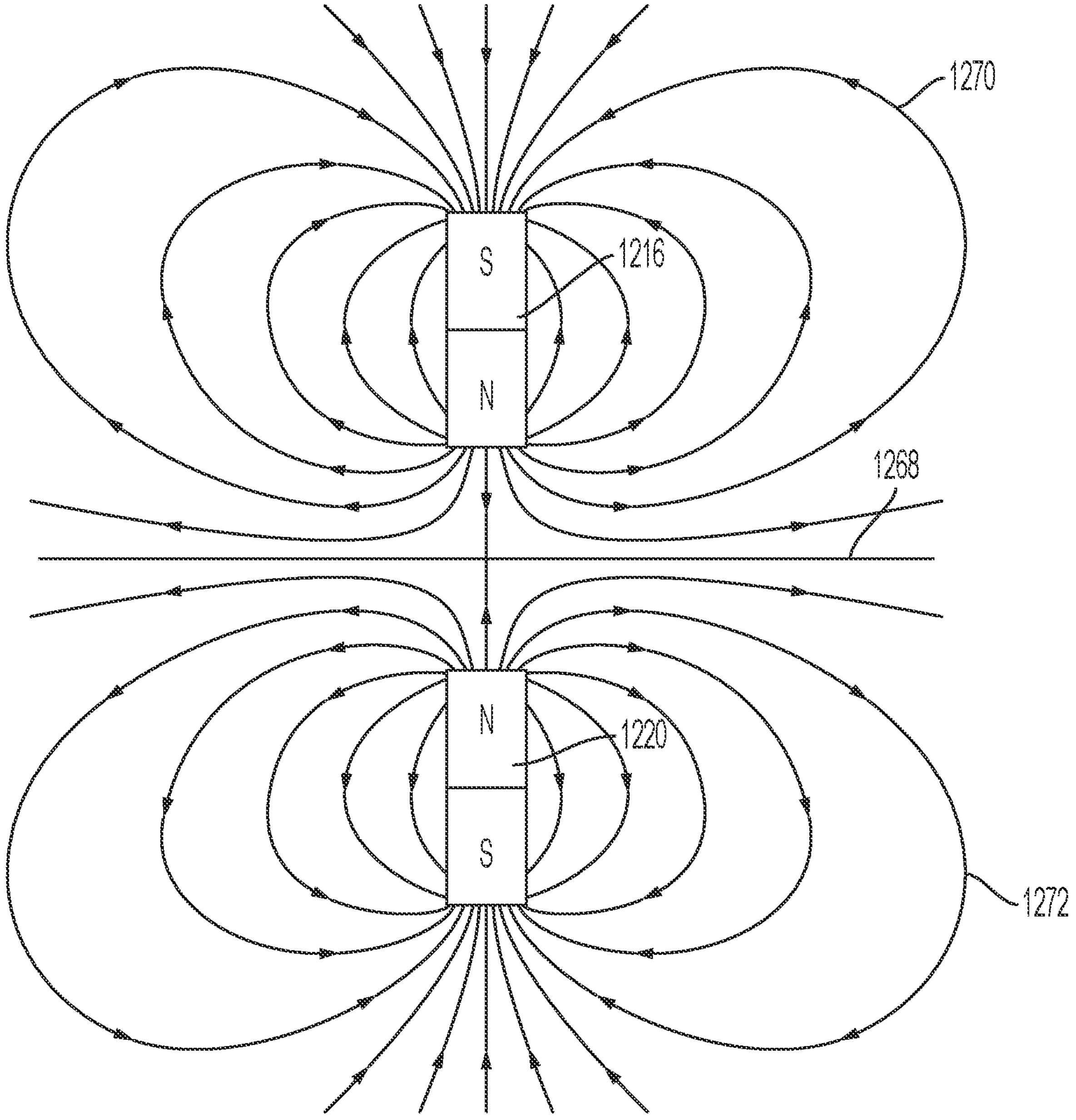
FIG. 52A illustrates magnetic fields of the magnets employed in the door shown in FIG. 52.

FIGS. 52 and 52A shows the situation where the magnetic fields are mirror configurations of each other. FIG. 52 is a cross sectional view of FIG. 48. FIG. 52A illustrates the magnets 1216, 1220 and their magnetic fields. In FIG. 52, the width 1214 of the first magnet 1216 may be equal to the width 1218 of the second magnet 1220. The magnetic field of magnet 1216 has a mirror configuration compared to the magnetic field of magnet 1220 above and below plane 1268.

However, to shape the magnetic fields of the first and second magnets 1216, 1220, one or more of the shapes, sizes and strengths of the magnets 1216, 1220 may be different from each other. By way of example and not limitation, the width 1214 of the first magnet 1216 may be different from the width 1218 of the second magnet 1220. FIGS. 53 and 54 show the opposite configurations. In particular, the width 1214 of the first magnet 1216 is greater than the width 1218 of the second magnet 1220 in FIG. 53. In FIG. 54, the width 1214 of the first magnet 1216 is smaller than the width 1218 of the second magnet 1220. Because the width 1214, 1218 of the first and second magnets 1216, 1220 are different, the magnetic fields emanating from the first and second magnets 1216, 1220 are also not symmetrical above and below a horizontal plane 1268 between the first and second magnets 1216, 1220. In contrast, the magnetic fields from the first and second magnets 1216, 1220 may be mirror images when the strength, size and shapes of the magnets 1216, 1220 are identical to each other as shown in FIG. 52A. When the width 1214, 1218 of the first and second magnets 1216, 1220 are different from each other, the smaller magnetic field (see FIGS. 53A, 54A) may interact with the larger magnetic field such that both magnetic fields may repel each other while magnet 1216 shifts laterally relative to magnet 1220. As the magnet 1216 shifts laterally along the direction of arrow 1246, the repulsive strength of the magnetic field 1270 (see FIGS. 53A, 54A) of the magnet 1216 and the magnetic field 1272 (see FIGS. 53A, 54A) of the magnet 1220 may decrease. As the lateral shift becomes larger, eventually the repulsive strength may no longer effectively repel magnets 1216, 1220 from each other to levitate the door assembly, causing the bracket 1212 to bottom out on the track 1210. In order to prevent the bracket 1212 from bottoming out on the track 1210, lateral shifting of the magnet 1216 may be limited by the stabilizing prong 1222 having limited space to move laterally within the recess 1224. Hence, given that the stabilizing prong 1222 and the magnet 1216 are both attached to the bracket 1212, the magnet 1216 may be displaced only as much as the stabilizing prong 1222. The stabilizing prong 1222 may limit lateral shifting of the magnet 1216 relative to the magnet 1220 so that lateral shifting is stopped before the repulsive strength between the magnetic fields 1270, 1272 decreases so much that the repulsive strength is no longer enough to levitate the door assembly. The maximum displacement of the magnet 1216 allowed by the stabilizing prong 1222 may be less than 2 inches or less. More preferably, the stabilizing prong 1222 is sized to even further limit lateral movement so that the forces on the stabilizing prong 1222 to vertically align the magnets 1216, 1220 does not exceed 10 lbs., 5 lbs., 1 lb. or 0.25 lb.

Referring to FIGS. 52-54, the use of the stabilizing prong 1222 and the magnets 1216, 1220 having different widths may allow for a greater margin of error when mounting the bracket 1212 onto the track 1210. In contrast, when the magnets 1216, 1220 have the same width, then magnets 1216, 1220 have to be vertically aligned almost perfectly. Otherwise, if they are even slightly off, then the door 1226 tends to want to slide off laterally. However, if the widths are different, the wider magnet provides a wider flat magnetic field upon which the smaller magnetic field can shift laterally to a small extent without creating an excessive lateral force that needs to be balanced by the stabilizing prong 1222 to prevent the bracket 1212 from falling off of the track 1210. When the track 1210 is installed, it does not need to be perfectly straight so that the magnets in the bracket and track are perfectly aligned to each other vertically. Some minor misalignment between the magnets 1216, 1220 and yet the lateral forces to keep the magnets 1216 and 1220 vertically above each other is minimal. Hence, it is easier to install when the magnets 1216, 1220 have different widths. This helps to mitigate wearing out of the stabilizing prong 1222 because allowing for lateral movement without increasing lateral forces to keep the magnets 1216, 1220 aligned means that the door 1226 would exert a small lateral load on the stabilizing prong 1222. The stabilizing prong may be sized to allow for lateral shifting of the bracket and track so that the lateral force to keep the bracket and track vertically aligned to each other is between 0.1 lb. to 10 lbs., preferably less than 5 lbs. or 1 lb. In other embodiments, for example, the fourteenth and fifteenth embodiments discussed below, a guard 1123 or a plurality of guards (see FIG. 61B) may be utilized to limit the lateral shift of the wider magnet 1116 in relation to the narrower magnet 1118 by limiting the movement of the bracket 1142 with respect to the track 1114. The lateral force that these guard(s) 1123 experience may be small when the magnets 1116, 1118 and the magnetic fields 1271, 1273 are of different widths. (see FIG. 61B)

FIGS. 52A-54A show a representative magnetic field of the magnets 1216, 1218. As shown in FIG. 52A, the magnetic fields 1270, 1272 are symmetrical with each other about a horizontal plane 1268.

In FIG. 53A, a wider magnet 1216 may be above a narrower magnet 1220. The north pole (labeled as "N") of the wider magnet 1216 and the north pole (labeled as "N") of the narrower magnet 1220 may be facing each other. In other embodiments, the south pole (labeled as "S") of the wider magnet 1216 and the south pole (labeled as "S") of the narrower magnet 1220 may be facing each other. The wider magnet 1216 may have a larger magnetic field 1270 than a smaller magnetic field 1272 of the narrower magnet 1220. The narrower magnet 1220 may have a weaker magnetic strength than that of the wider magnet 1216. The wider magnet 1216 and the narrower magnet 1220 may be vertically aligned, vertical meaning perpendicular to the plane 1268. When in vertical alignment, the larger magnetic field 1270 of the wider magnet 1216 and the smaller magnetic field 1272 of the narrower magnet 1220 may magnetically repel each other. Force of the magnetic repulsion is preferably equal to the weight of the door 1226 and other parts such as the bracket 1212, etc. (See FIG. 53) to push them away from the narrower magnet 1220, and hence the track 1210. Without this repelling force, the weight of the door 1226 and other parts would pull the wider magnet 1216 towards the narrower magnet 1220 so much that the bracket 1212 would bottom out on the track 1210.

The magnets 1216, 1220 may effectively repel each other to levitate the door assembly as the wider magnet 1216 shifts laterally relative to the narrower magnet 1220 along the direction of the arrow 1246; however, as the lateral shift leads to greater displacement, the magnets 1216, 1220 may no longer repel each other with the force necessary to levitate the door assembly, causing the bracket 1212 to bottom out on the track 1210. Hence, the stabilizing prong 1222 may be used to limit lateral shifting of the magnet 1216, as explained previously in the discussion of FIG. 53. Moreover, the stabilizing prong 1222 may limit lateral movement to prevent excessive lateral forces on the stabilizing prong 1222. Because the magnetic fields 1270, 1272 of the magnets 1216, 1220 are different, the wider magnetic field 1270 provides a flat width where the wider magnetic field 1270 can shift laterally relative to the smaller magnetic field 1272 but yet excessive lateral force is not needed on the stabilizing prong 1222.

In FIG. 54A, a narrower magnet 1216 may be above a wider magnet 1220. The north pole (labeled as "N") of the narrower magnet 1216 and the north pole (labeled as "N") of the wider magnet 1220 may be facing each other. In other embodiments, the south pole (labeled as "S") of the wider magnet 1220 and the south pole (labeled as "S") of the narrower magnet 1216 may be facing each other. The narrower magnet 1216 may have a smaller magnetic field 1270 than a magnetic field 1272 of the wider magnet 1220. The wider magnet 1220 may have a stronger magnetic strength than that of the narrower magnet 1216. The narrower magnet 1216 and the wider magnet 1220 may be vertically aligned, vertical meaning perpendicular to the plane 1268. When in vertical alignment, the larger magnetic field 1272 of the wider magnet 1220 and the smaller magnetic field 1270 of the narrower magnet 1220 may magnetically repel each other. Force of the magnetic repulsion is preferably equal to the weight of the door 1226 and other parts such as the bracket 1212, etc. (see FIG. 54) to push them away from the wider magnet 1220, and hence the track 1210. Without this repelling force, the weight of the door 1226 and other parts would pull the narrower magnet 1216 towards the wider magnet 1220 so much that the bracket 1212 would bottom out on the track 1210. The magnets 1216, 1220 may effectively repel each other to levitate the door assembly as the narrower magnet 1216 shifts laterally relative to the wider magnet 1220 along the direction of the arrow 1246; however, as the lateral shift leads to greater displacement, the magnets 1216, 1220 may no longer repel each other with the force necessary to levitate the door assembly, causing the bracket 1212 to bottom out on the track 1210. Hence, the stabilizing prong 1222 may be used to limit lateral shifting of the magnet 1216, as explained previously in the discussion of FIG. 54. Moreover, the stabilizing prong 1222 may limit lateral movement to prevent excessive lateral forces on the stabilizing prong 1222. Because the magnetic fields 1270, 1272 of the magnets 1216, 1220 are different, the wider magnetic field 1272 provides a flat width where the smaller magnetic field 1216 can shift laterally but yet excessive lateral force is not needed on the stabilizing prong 1222.

Referring now to FIGS. 53A, 54A, the shape of the magnetic fields of the first and second magnets 1216, 1220 were shaped into magnetic fields 1270, 1272 by changing the widths of the magnets. However, it is also contemplated that the shape of the magnetic fields of the first and second magnets 1216, 1220 may be shaped by changing the shape of the surfaces of the magnets 1216, 1220 and the strengths of the magnets 1216, 1220. For example, the magnets 1216, 1220 may be cylindrical prisms, rectangular prisms, triangular prisms, or cubes.

The stabilizing prong 1222 may have various configurations. As shown in FIG. 46, the stabilizing prong 1222 may have an oblong configuration. In FIG. 49, the stabilizing prong 1222 may have a square shaped configuration. In FIG. 55, the stabilizing prong 1222 may have multi parts. The stabilizing prong 1222 is formed from three different nubs 1260. One nub is oriented upward to contact the top surface of the recess 1224. Two of the nubs are opposed to each other and act to stabilize the bracket 1212 and the track 1210 laterally or side to side.

The magnets 1216, 1220 are sized so that the repelling force of the magnets 1216, 1220 are equal to or greater than the weight of the door. More particularly, the magnets 1216, 1220 are sized so that the bracket 1212 is positioned in the position shown in FIG. 49. The vertical movement of the bracket 1212 is not limited by the track 1210. In FIG. 50, the repelling force of the magnets 1216, 1220 fully push the bracket 1212 away from the track 1210 so that the stabilizing prong 1222 pushed against the upper surface of the recess 1224. In this regard, the bracket 1212 contacts the track 1210 through the stabilizing prong 1222. The bracket 1212 cannot be moved vertically downward from the track 1210 because of the track's physical structure.

The door 1226 may be assembled in the following manner. In particular, the magnet 1216 is disposed within the recess 1240 of the bracket 1212. The magnet 1220 is also disposed in the recess 1242 of the track 1210. The bracket 1212 is then placed in position on the track 1210. When the door 1226 is sold or the door 1226 is provided to the end user, the door 1226 may be disengaged from the bracket 1212. The user may attach the track 1210 to the wall(s). At this point, the bracket 1212 is in the position shown in FIG. 50. After attaching the track 1210 to the walls, the door 1226 may be attached to the bracket 1212 to hang the door 1226. At this point, the bracket 1212 may be in the position shown in FIG. 49. Although the method of assembly was used in relation to the embodiment shown in FIGS. 49 and 50, the steps for assembling the door assembly may be utilized or implemented with respect to all of the other embodiments of the door assembly.

The door in the embodiments disclosed herein may have a weight equal to or between 1 lb. to 2500 lbs. However, the door may preferably have a weight equal to or between 5 lbs. and 1000 lbs. More preferably, the door may preferably have a weight equal to or between 5 lbs. and 150 lbs.

Figure 61:
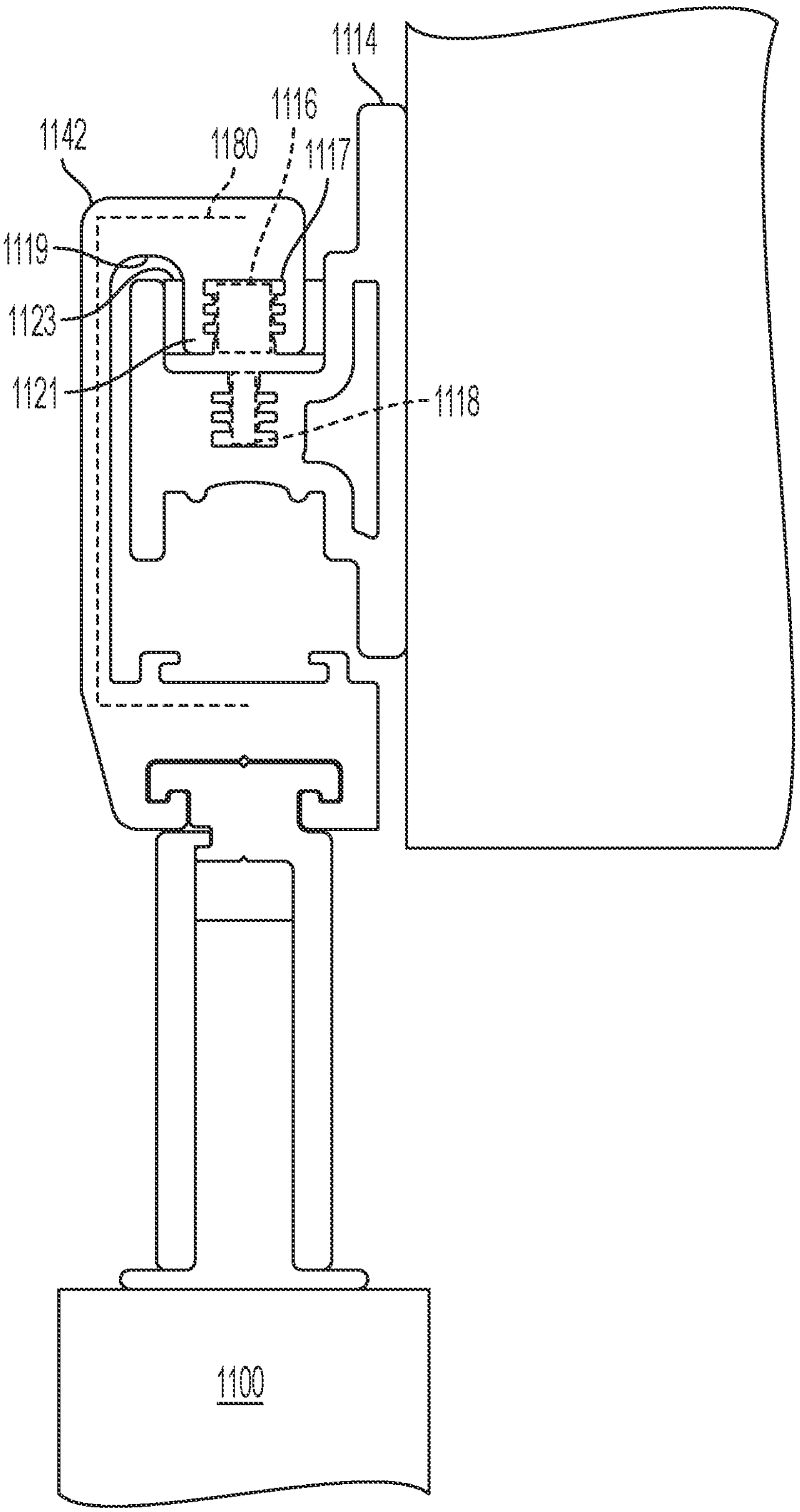
FIG. 61 is a partial traverse view of the door shown in FIG. 59 without guides.
Figure 62:
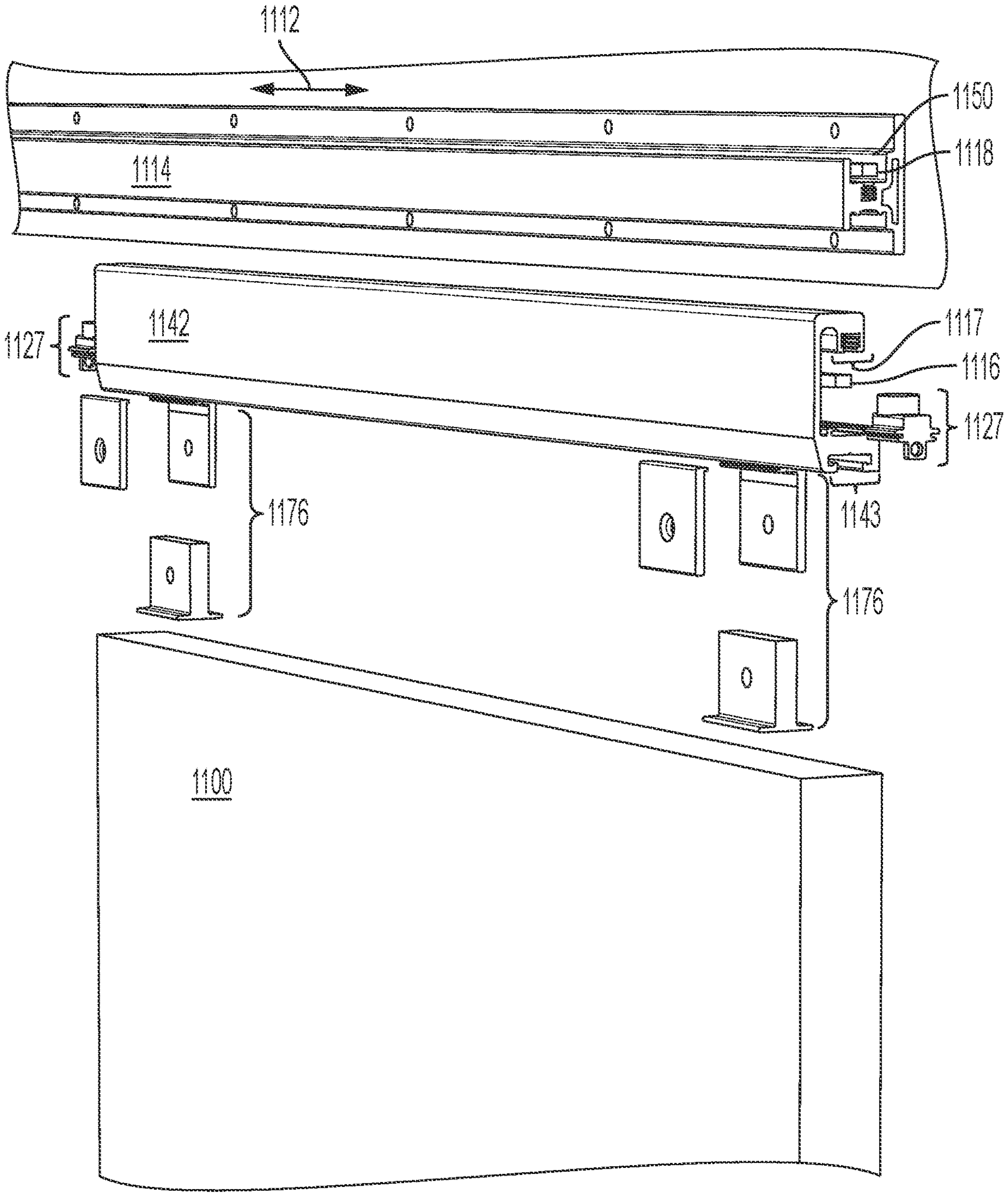
FIG. 62 is a right partial exploded perspective view of the door shown in FIG. 59.
Figure 63:
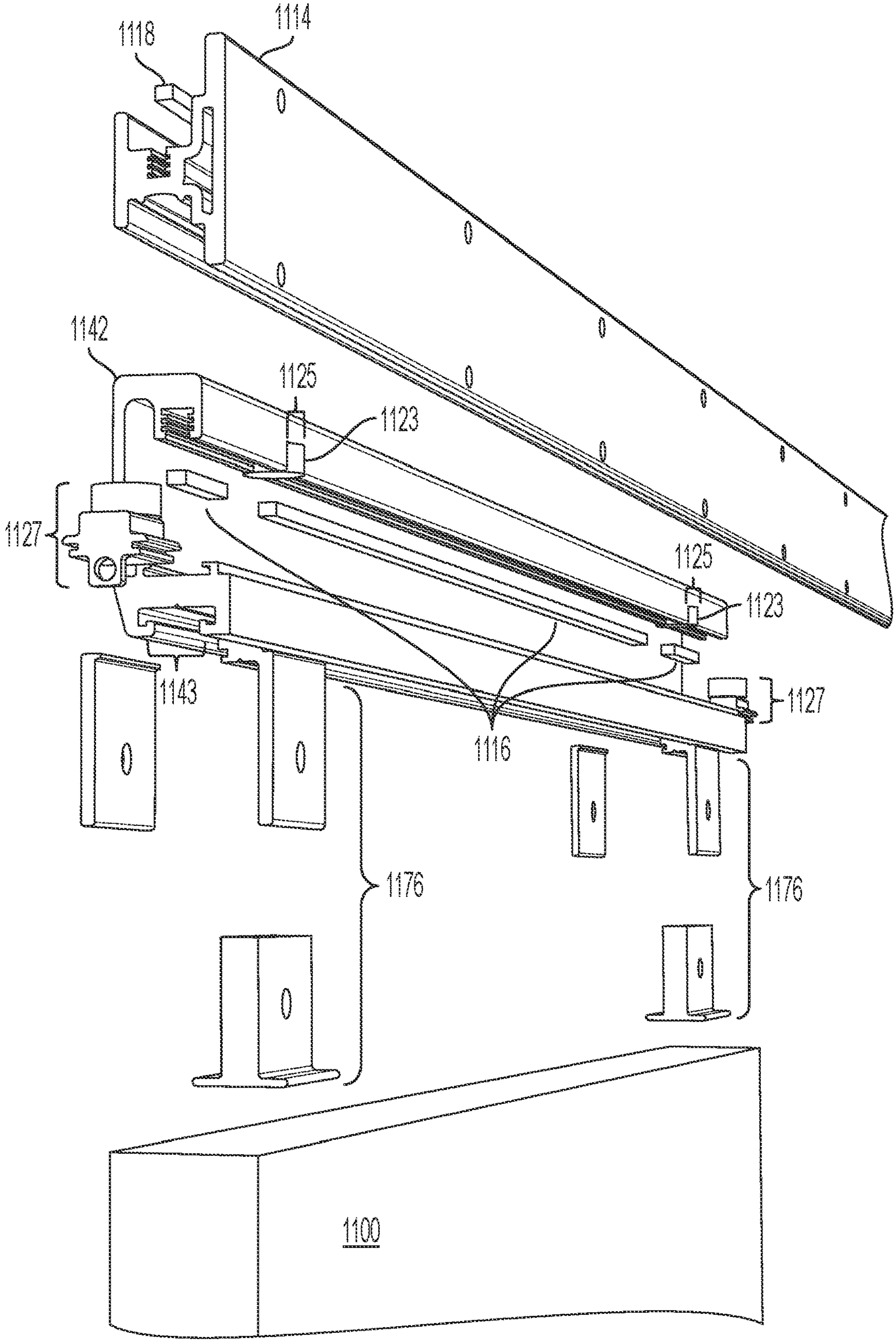
FIG. 63 is a right partial exploded perspective back view of the door shown in FIG. 59.

Referring now to FIGS. 59-63, a fourteenth embodiment of a magnetically levitating sliding door 1100 of a shower 1120 is shown. In other examples, the magnetically levitating sliding door 1100 may be used in applications other than a shower, for example as a door to access a room. Referring particularly to FIGS. 62-63, the door 1100 may slide horizontally in the direction of arrow 1112 on track 1114. The door 1100 may have a magnet 1116. The magnet 1116 may include a plurality of magnets. The magnets of the magnet 1116 may be dimensioned to have the same size or different sizes. The magnet 1116 may be housed in bracket 1142. The bracket 1142 may be attached to the door 1100. The track 1114 may have a magnet 1118. The magnet 1118 may be a singular elongate and contiguous magnet. In other examples, the magnet 1118 may include a plurality of shorter magnets. The shorter magnets may be dimensioned to have the same size or different sizes. Alike poles of the magnet 1116 and the magnet 1118 may face each other. The magnet 1116 may be repelled by the magnet 1118 to vertically lift the door 1100 when the door 1100 is assembled and hung on the track 1114, vertical meaning perpendicular the direction of the arrow 1112 on the page (see FIG. 59). Hence, as the door 1100 moves horizontally in the direction of arrow 1112, the weight of the door 1100 is transferred to the track 1114 through the magnets 1116, 1118. A minimal amount of contact or no contact may occur between the track 1114 and the door 1100 in terms of a vertical direction. When the door 1100 is slid left and right in the direction of arrow 1112, the horizontal movement of the door 1100 is quiet and smooth because the magnets 1116, 1118 do not rub against each other. The bracket 1142 may be extruded or cut out as a uniform structure. In other examples, the bracket 1142 may have separate segments attached to the door 1100 in a distribution that results in hanging the door 1100 evenly.

Figure 59:
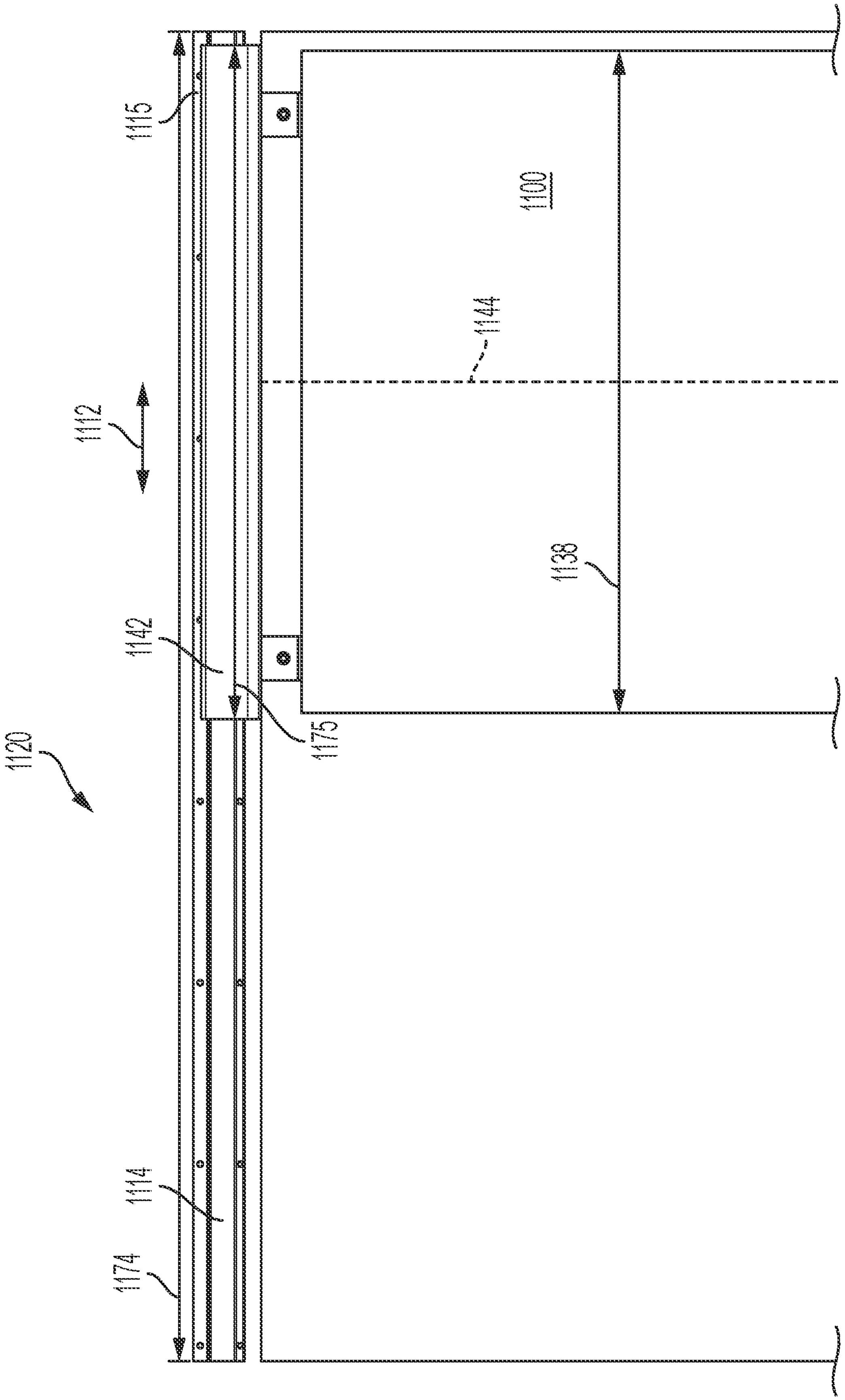
FIG. 59 is a fourteenth embodiment of the door.
Figure 60:
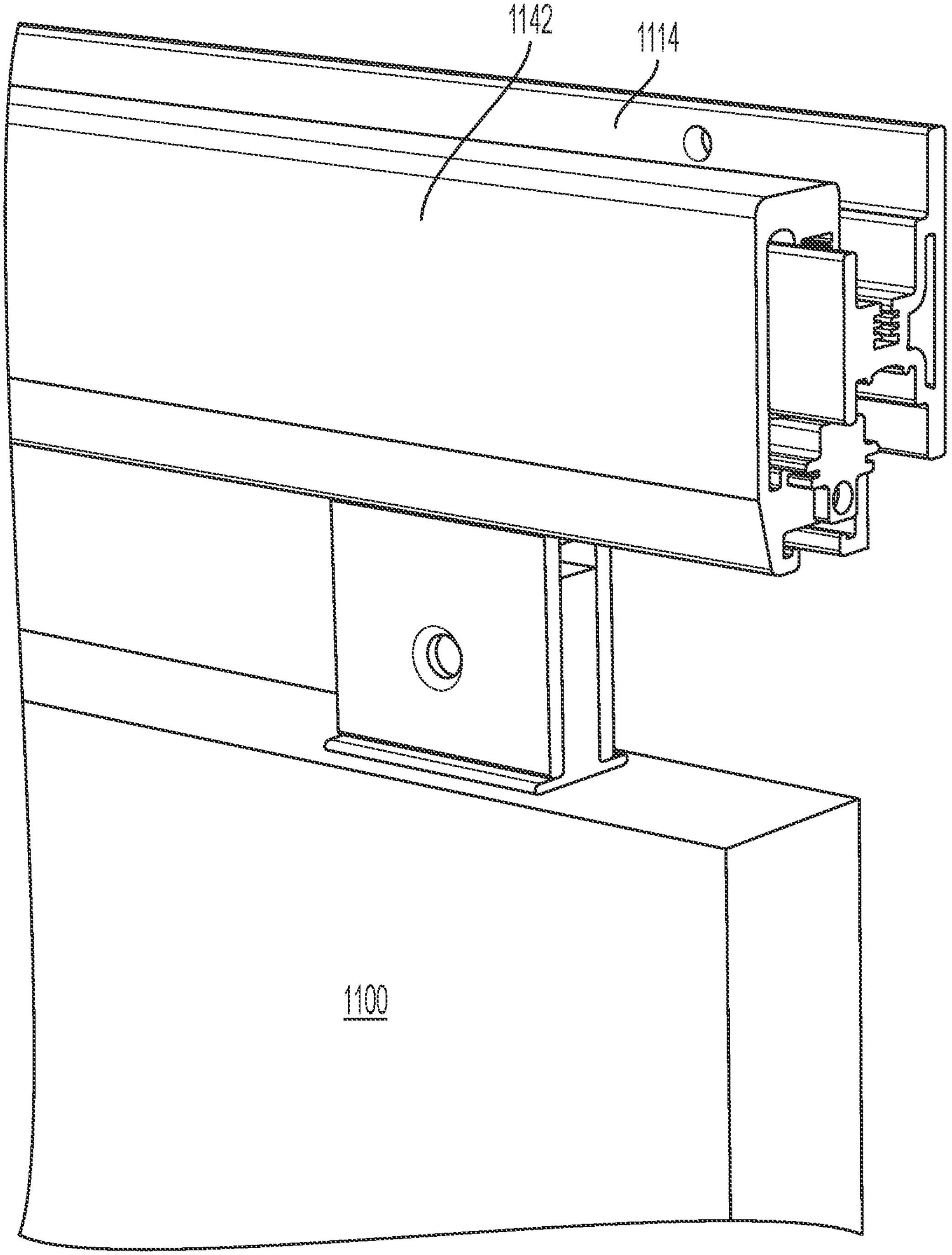
FIG. 60 is a right partial perspective view of the door shown in FIG. 59.

Referring now to FIG. 59, the shower 1120 is shown. The track 1114 may be attached lengthwise on a surface 1115 from its back. In other embodiments, the track 1114 may also be attached between two surfaces, for example, walls from its two sides. The shower 1120 may also have a stationary door that may be secured to the surface 1115 with a bracket that is not shown for clarity. The stationary door may be offset from the sliding door 1100 to allow the door 1100 to move to the left and right so that the door 1100 may be moved beside the stationary door. When the door 1100 is in the open position, the door 1100 and the stationary door may be stacked beside each other. As the door 1100 is moved to the left and right, the door 1100 may be magnetically lifted up. The movement of the door 1100 may be quiet and smooth since the magnets 1116, 1118 do not rub against each other.

A length 1174 of the track 1114 may be sufficiently long so that the door 1100 can slide laterally in the direction of arrow 1112 as needed. By way of example and not limitation, the length 1174 of the track 1114 may be about equal to or slightly less than two times a length 1138 of the door 1100.

The track 1114 may have a magnet 1118 (see FIGS. 61-63) that may extend along the length 1174 of the track 1114. More particularly, the magnet 1118 may extend along the track 1114 to the extent that the sliding door 1100 needs to slide so that a person can pass through a door opening when the sliding door 1100 is moved out of the way. By way of example and not limitation, the door 1100 may move to the left or right to provide an opening through which a person can enter about equal to the length 1138 of the door 1100. As such, length 1150 (see FIG. 62) of the magnet 1118 may be equal to about twice or slightly less than twice (e.g. 180%) the length 1138 of the door 1100.

Referring now to FIG. 61, the bracket 1142 may have a C-shaped configuration as identified by broken line 1180. The bracket 1142 may be metal. The metal may have an elastic modulus and yield strength that is equal to the elastic modulus and yield strength of aluminum. The bracket 1142 may have a magnet housing 1117 extending downward, or towards the door 1100, from a ceiling 1119 of the C-shaped bracket 1142. The magnet housing 1117 may be a groove. The magnet housing 1117 may have two walls 1121 that retain magnet 1116 within the magnet housing 1117. The walls 1121 may be ribbed along length 1175 (see FIG. 59) of the bracket 1142. The elastic modulus and yield strength of the bracket 1142 may allow the ribbed walls 1121 to flex when magnet 1116 is being inserted. Following insertion, the ribbed walls 1121 may close in on the magnet 1116 and provide for a tight hold.

The bracket 1142 may have a guard 1123 along the length 1175 (see FIG. 59). More than one guard 1123 may be attached to the bracket 1142, for example two guards 1123 as shown in FIG. 63. The guard 1123 may be a plastic material having a low coefficient of friction, such as polyurethane. The guard 1123 rubs against the track 1114 when the door 1100 slides along the track 1114. The guard 1123 may be shaped so that a surface of the guard 1123 rubbing against the track 1114 is arcuate, for example a disk or cylinder as shown in FIG. 63. The guard 1123 may be inserted to the bracket 1142 at a slot 1125 (see FIG. 63) that interrupts the magnet housing 1117. The guard 1123 may extend out from the walls 1121 of the magnet housing 1117. The bracket 1142 may have a plurality of slots 1125, for example as shown in FIG. 63. The guard 1123 or plurality of guards may be between the plurality of magnets of magnet 1116. The magnet 1116 may be touching the guard 1123.

Figure 61A:
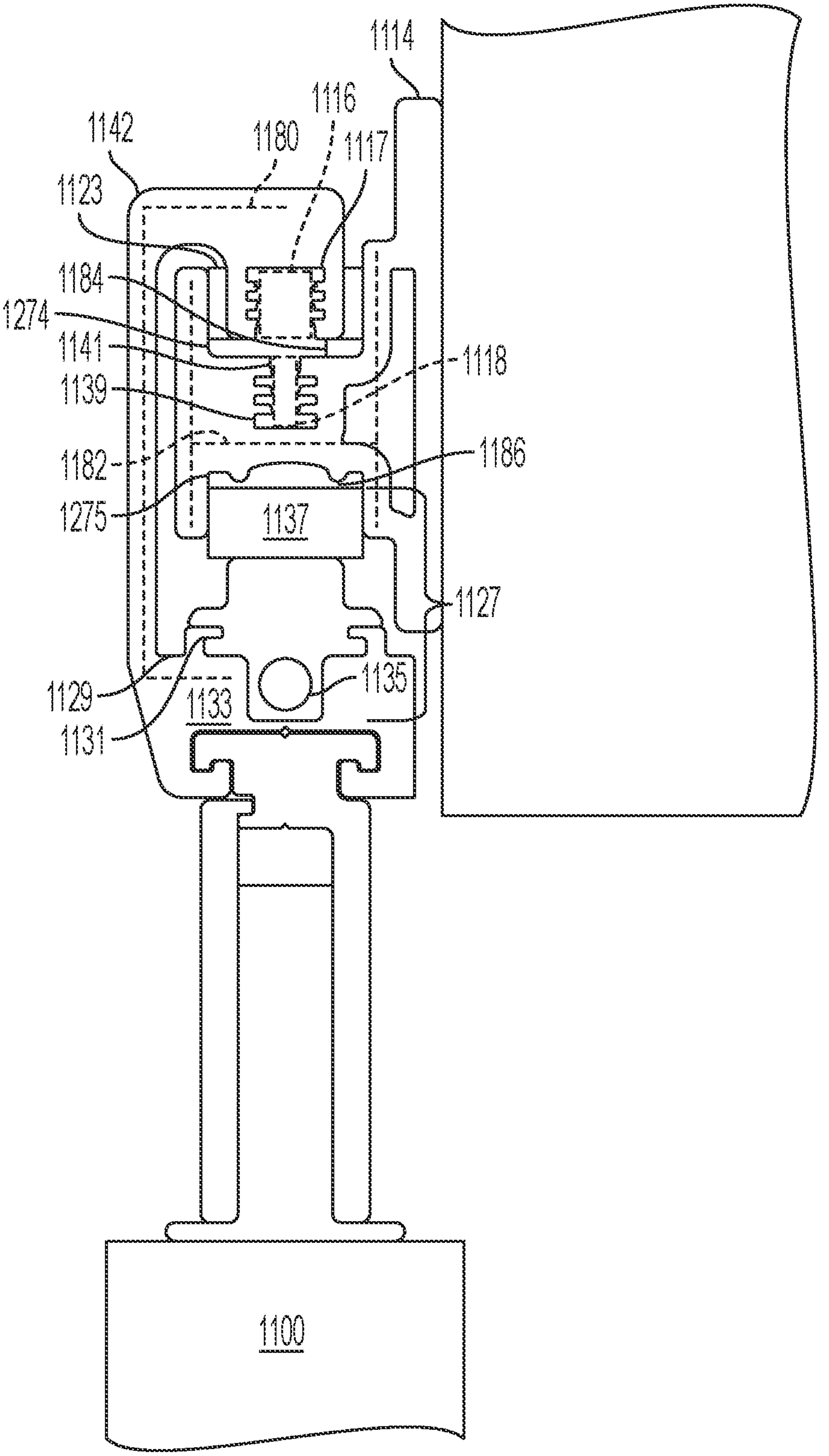
FIG. 61A is a partial traverse view of the door shown in FIG. 59.

Referring now to FIG. 61A, a guide 1127 may be attached to the bracket 1142. Once attached to the bracket 1142, the guide 1127 may engage with the H-shaped configuration of the track 1114 shown by broken lines 1182. The engagement may prevent the bracket 1142 from detaching from the track 1114 once mounted. In contrast, as can be seen from FIG. 61, the bracket 1142 can be removed from the track 1114 when the guide 1127 is not installed. Further, the engagement may help maintain the vertical alignment between the bracket 1142 and the track 1114 (vertical meaning perpendicular the direction of the arrow 1112 in FIG. 59) as well as the magnets 1116, 1118. A user may install the door assembly by attaching the track adjacent to the door opening. Next, the installer may hook the top curve of the C-shape of the bracket 1142 to a top cavity 1274 of the H-shape of the track 1114, as shown in FIG. 61. The user may then attach the guide 1127 or guides to a floor 1129 of the C-shaped bracket 1142. The guide 1127 may be receptive to a bottom cavity 1275 of the H-shape of the track 1114, as shown in FIG. 62. The floor 1129 may have a track 1131 along the length 1175 (see FIG. 59) of the bracket 1142. The guide 1127 may be inserted onto the track 1131 from each end of the bracket 1142. Following insertion, the guide 1127 may be fastened to an end surface 1133. By example and not limitation, the fastening may be carried out via drilling a screw or nailing through a hole 1135 into the bracket 1142. The bracket 1142 may have a plurality of guides 1127, for example as shown in FIGS. 62-63. The guide 1127 may have a top portion 1137 directly touching the track 1114. The top portion 1137 may be a plastic material having a low coefficient of friction, such as polyurethane. The top portion 1137 rubs against the track 1114 when the door 1100 slides along the track 1114. Generally, the top portion 1137 may last many sliding cycles such that the bracket 1142 may slide functionally for more sliding cycles than sliding shower door mechanisms in the market before requiring maintenance. The top portion 1137 may be shaped so that the guide's surface rubbing against the track 1114 is arcuate, for example a disk or cylinder as shown in FIG. 63. The top portion 1137 and the guard 1123 may have the same dimensions. The top portion 1137 and the guard 1123 may extend out from the bracket 1142 equidistantly. The top portion 1137 and the guard 1123 may be parallel to each other. The top portion 1137 may contact or be in close proximity to the sides of the bottom cavity 1275. The top portion 1137 may have space, widthwise, to move within the bottom cavity 1275. Preferably, the space may be 0.010 inches to ¼ inch in width. The door 1100 may be attached to the bracket 1142 either before or after the bracket 1142 is attached to the track 1114, preferably after. The attachment of the door 1100 to the bracket 1142 will be detailed in the later discussion of FIGS. 62-63.

Still referring to FIG. 61A, the track 1114 may be metal. The metal may have an elastic modulus and yield strength that is equal to the elastic modulus and yield strength of aluminum. The track 1114 may have a magnet housing 1139 along the horizontal bridge of the H-shape. The magnet housing 1139 may face toward the ceiling 1119 of the C-shaped bracket 1142 when the bracket 1142 is mounted on the track 1114. The magnet housing 1139 may be a groove. The magnet housing 1139 may have two walls 1141 that retain magnet 1118 within the magnet housing 1139. The walls 1141 may be ribbed along length 1174 (see FIG. 59) of the track 1114. The elastic modulus and yield strength of the track 1114 may allow the ribbed walls 1141 to flex when magnet 1118 is being inserted. Following insertion, the ribbed walls 1141 may close in on the magnet 1118 and provide for a tight hold. The walls 1141 may be situated closer to each other than the walls 1121 of the magnet housing 1117 of the bracket 1142. Hence, the magnet housing 1117 of the bracket 1142 may accommodate a magnet with a greater width than the magnet housing 1139 of the track 1114. In other examples, the opposite may be true where the magnet housing 1139 of the track 1114 is wider and can accommodate a wider magnet than the magnet housing 1117 of the bracket 1142. Having different sized magnets 1116, 1118 may prevent a situation where a great force is required to keep the bracket 1142 vertically aligned to the track 1114, the magnets 1116, 1118 and magnetic fields 1271, 1273 (see FIG. 61B). In this situation, when the magnet 1116 of the bracket 1142 slides laterally away from the centerline of the track's magnet 1118 to a small degree, the force required to keep the bracket 1142 vertically aligned to the track 1114 is minimal (e.g., less than 10 lbs., and preferably less than 5 lbs. or 1 lb.). Because the magnetic fields 1271, 1273 (sec FIG. 61B) of the magnets 1116, 1118 have different widths, the wider magnetic field 1271 provides a wide support for the smaller magnetic field 1273 to be supported upon. Having two magnets 1116, 1118 of different widths vertically above each other may allow for a greater margin of error when mounting the bracket 1142 onto the track 1114 since the magnets 1116, 1118 may effectively repel each other and levitate the door assembly even when the magnet 1116 shifts laterally while displacement of the magnet 1116 relative to the magnet 1118 is limited by the guard 1123 without excessive lateral force on the guard 1123, which is explained further below in discussing FIG. 61B.

Figure 61B:
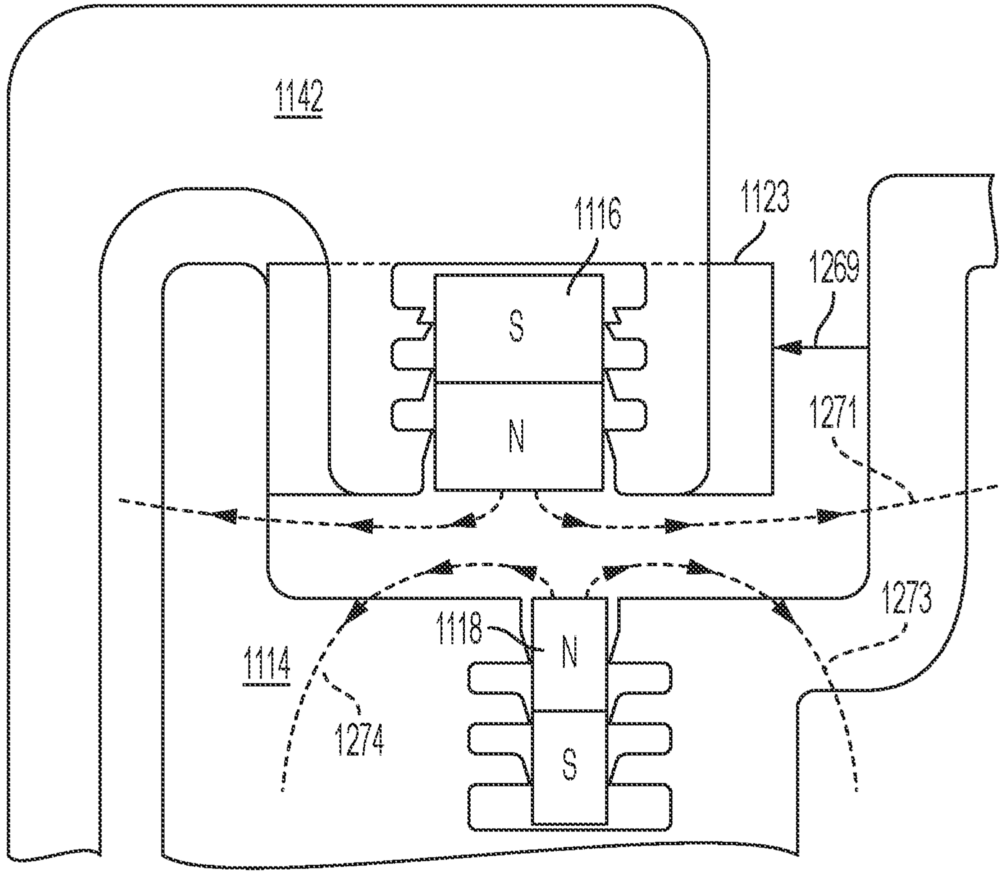
FIG. 61B illustrates a portion of the magnetic fields of the magnets employed in the door shown in FIG. 59 in a laterally shifted state.

Referring now to FIG. 61B, the bracket 1142 shifted laterally to the left in the direction of the arrow 1269 with respect to the track 1114 is shown. In order to preserve magnetic repulsion between the magnets 1116, 1118 that can levitate the weight of the door 1100 (see FIG. 61) and other parts such as the bracket 1142, movement of the magnet 1116 to the left relative to the magnet 1118 may be limited by the guard 1123 being stopped by the top cavity 1274 so that lateral shifting is stopped before the repulsive strength between the magnetic fields 1271, 1273 (shown partially) decreases so much that the repulsive strength is no longer enough to levitate the door assembly. In other examples (not shown), movement of the magnet 1116 to the right relative to the magnet 1118 may be limited by the guard 1123 being stopped by the top cavity 1274. Since the widths of the magnets 1116, 1118 are different, the wider magnet 1116 provides a wider flat magnetic field 1271 to shift laterally relative to the smaller magnetic field 1273 without creating an excessive lateral force that needs to be balanced by the guard 1123 to prevent the bracket 1142 from falling off of the track 1114. The guard 1123 and the top cavity 1274 may be sized so that the greatest lateral force exerted on the guard 1123 is less than 10 lbs., and preferably less than 5 lbs. or 1 lb. Preferably, the guard 1123 and the top cavity 1274 may be sized so that the guard can only move between 0.010 inches to 2 inches laterally inside the top cavity 1274. The magnet 1116 may be displaced only as much as the guard 1123. Without the guard 1123 and lateral movement of the guard 1123 being limited by the top cavity 1274, the lateral shift could be so great that the magnets 1116, 1118 might no longer repel each other with the force necessary to levitate the door assembly. If this were to happen, the bracket 1142 would bottom out on the track 1114, which could lead to unwanted rubbing between the bracket 1142 and the track 1114, and thus uneven sliding of the door 1100 (see FIG. 61) or, in some instances, no sliding at all. Thus, the guard 1123 mitigates unwanted movement of the door 1100 both in the same and opposite direction of the arrow 1269.

When the track 1114 is installed, it does not need to be perfectly straight to prevent minor misalignment between the magnets 1116, 1118. Hence, it is easier to install when the magnets 1116, 1118 have different widths. This helps to mitigate wearing out of the guard 1123 because allowing for lateral movement without increasing lateral forces to keep the magnets 1116, 1118 aligned means that the door 1226 may exert a small lateral load on the guard 1123. Generally, the guard 1123 may last many sliding cycles such that the bracket 1142 may slide functionally for more sliding cycles than other sliding shower door mechanisms on the market before requiring maintenance. A plurality of guards 1123 may be attached evenly with respect to each side of the midline 1144 (see FIG. 59) of the door 1100. The even distribution of the guards 1123 may further prevent unwanted movement of the door 1100 both in the same and opposite direction of the arrow 1269, and allow for the door 1100 to slide smoothly along the track 1114.

Referring now to FIGS. 62-63, the sliding door 1100 may be attached to the bracket 1142. The door 1100 itself may be attached to the bracket 1142 by way of clamps 1176. The clamps 1176 may be clamped onto a body of the door 1100. The clamps 1176 may have a protrusion that is engageable with a track 1143 of the bracket 1142. To level the door 1100, a nut may be adjusted so that the door 1100 appears level to the ground. The bracket 1142 may position the magnet 1116 above the magnet 1118 attached to the track 1114. This configuration may lift the door 1100 upward due to the repelling forces of the magnets 1116, 1118. The magnet 1116 attached to the door 1100 may be a plurality of magnets, for example as shown in FIG. 63. The guard 1123 may be between each magnet of magnet 1116. Regardless of the number of magnets 116 that is provided in the bracket 1142, the one or more magnets 1116 may be evenly distributed about a midline 1144 (see FIG. 59) of the door 1100 that intersects a center of gravity of the door 1100. The magnet 1116 may be evenly distributed in that the magnet 1116 provides an equal upward force on the left of the midline 1144 compared to the right of the midline 1144 so that the door 1100 is raised evenly upward. The door 1100 may appear horizontal or level to the ground. While the magnet 1116 is provided as separate magnets or individual magnets, the magnet 1118 may be provided as a singular elongate and contiguous magnet along the length 1174 (see FIG. 59) of the track 1114 as needed to provide the repelling force as the door 1100 slides left to right.

The repelling force of the magnets 1116, 1118 may be adjusted by increasing or decreasing the strength of the magnets 1116, 1118. The repelling force of the magnets 1116, 1118 may be further adjusted by increasing or decreasing the size of the magnets 1116, 1118. It is also contemplated that the shape of the magnetic fields 1271, 1273 (see FIG. 61B) of the magnets 1116, 1118 may be shaped by changing the shape of the surfaces of the magnets 1116, 1118, where surfaces of the magnets 1116, 1118 facing each other remain horizontally flat (parallel to the direction of arrow 1269 in FIG. 61B). For example, the magnets 1116, 1118 may be cylindrical prisms, rectangular prisms, triangular prisms, or cubes.

Preferably, the repelling force created by the magnets 1116, 1118 is equal to the weight of the door 1100 and lifts the door 1100 evenly upward. A gap 1184 (see FIG. 61A) exists between the bracket 1142 and the track 1114 when the door 1100 is stationary. The door 1100 can be pushed down if needed due to the gap 1184. Further, a gap 1186 (see FIG. 61A) may also exist between the guide 1127 of the bracket 1142 and the track 1114 when the door 1100 is stationary. The door 1100 can be pushed upward if needed due to the gap 1186. When the user moves the door 1100 left and right in the direction of the arrow 1112, the inertia of the door may cause the left and right sides of the door 1100 to shift up and down. The repelling force generated by the magnets 1116, 1118 cannot be laterally balanced through magnetic forces either when the sliding door 1100 is in motion or stationery. When the magnets 1116, 1118 are vertically disposed above each other, the magnets 1116, 1118 would laterally fall off one another unless restrained by the guard 1123. In this context, laterally means to the left or right, which is normal to the arrow 1112 and out of the page in FIG. 62.

Figure 64:
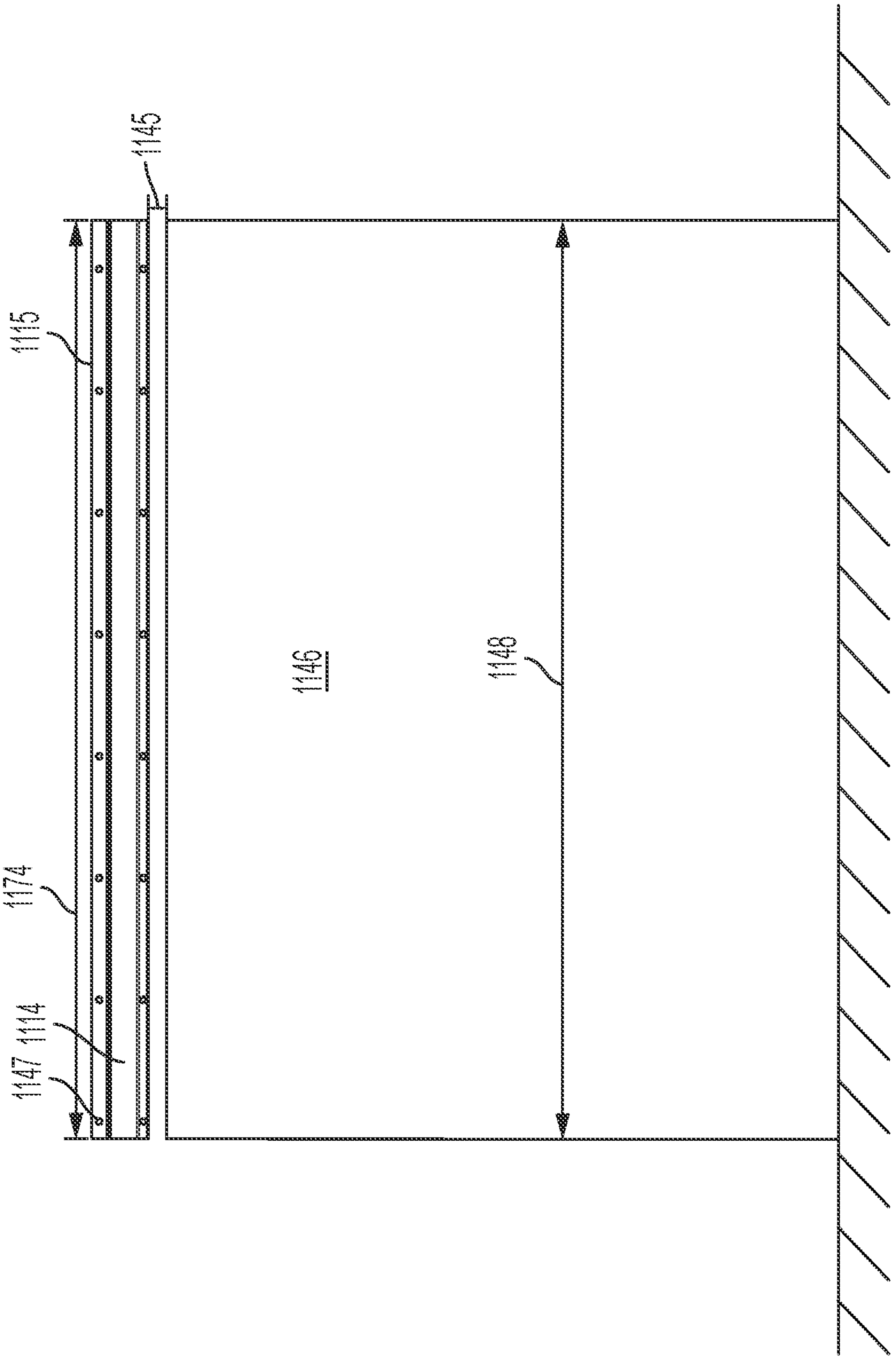
FIG. 64 shows a completed first stage of installation of the door shown in FIG. 59.

Referring now to FIG. 64, a first stage of installation of the magnetically levitating sliding door 1100 is shown. The installation may take place at the installation site without requiring any pre-assembly. The first stage may include mounting the track 1114 lengthwise on the surface 1115 from its back. In other embodiments, the track 1114 may also be attached between two surfaces, for example, walls from its two sides. By example and not limitation, the fastening may be carried out via drilling a screw or nailing through a hole 1147 into the surface 1115. There may be a plurality of the hole 1147. The holes may be distributed evenly along the length 1174 of the track 1114. A space 1145 may be left between an opening 1146 that is to be covered by the door 1100 and the track 1114. The bracket (see FIG. 59) may not extend over the opening 1146 due to the space 1145 once mounted on the track 1114 in a second stage of installation discussed in FIG. 65. The track 1114 may be prefabricated so that a length 1174 of the track 1114 is approximately equal a length 1148 of the opening 1146. In other embodiments, a plurality of tracks may be mounted lengthwise next to each other as needed to conform with the length 1148 of the opening.

Figure 65:
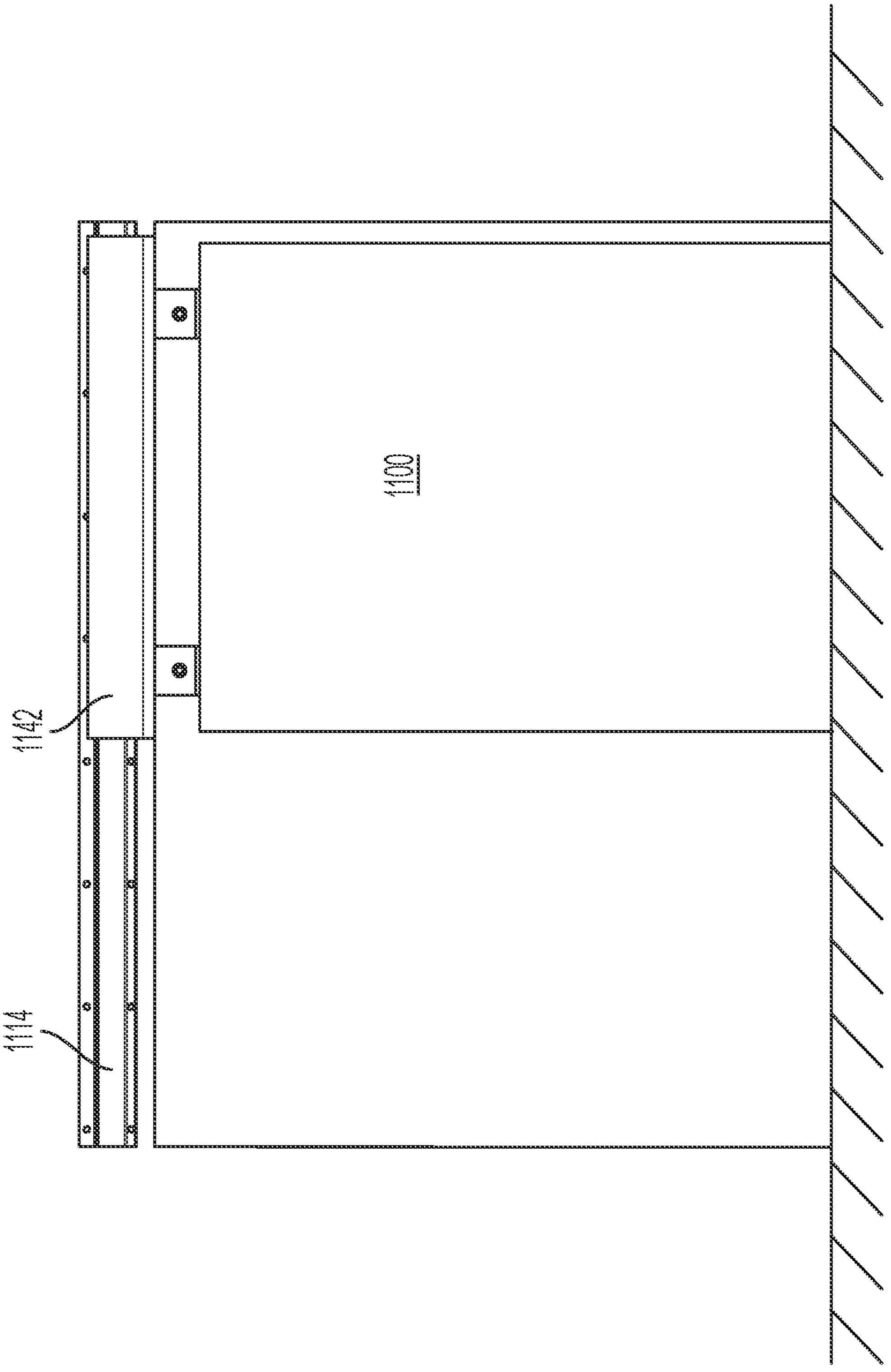
FIG. 65 shows a completed second stage of installation of the door shown in FIG. 59.

Referring now to FIG. 65, a second stage of the installation of the magnetically levitating sliding door 1100 is shown. The second stage may include hooking the bracket 1142 onto the track 1114 first, and then, as a third stage, installing the guide 1127 or guides onto the bracket 1142 as discussed above for FIG. 61A. In other examples, the guide 1127 or guides may be installed onto the bracket 1142 first, and then the bracket 1142 may be slid over the track 1114. Preferably, the door 1100 may be attached to the bracket 1142 after the bracket 1142 is attached to the track 1114. In other examples, the door 1100 may be attached to the bracket 1142 before the bracket is attached to the track 1114. In some embodiments, the magnets 1116, 1118 (see FIGS. 61-63) may be attached to the bracket 1142 and the track 1114, respectively, prior to being packaged and shipped for installation. In some embodiments, the magnets 1116, 1118 may be attached to the bracket 1142 and the track 1114, respectively, at the installation site. The greater margin of error provided by the magnets 1116, 1118 having different widths, as discussed previously for FIG. 61B, may allow for the second stage of the installation to take place without the need for a professional installer or fine adjustment. The stationary door that may be offset from the door 1100 and stacked next to the door 1100 in an open position is not shown for clarity.

Figure 66:
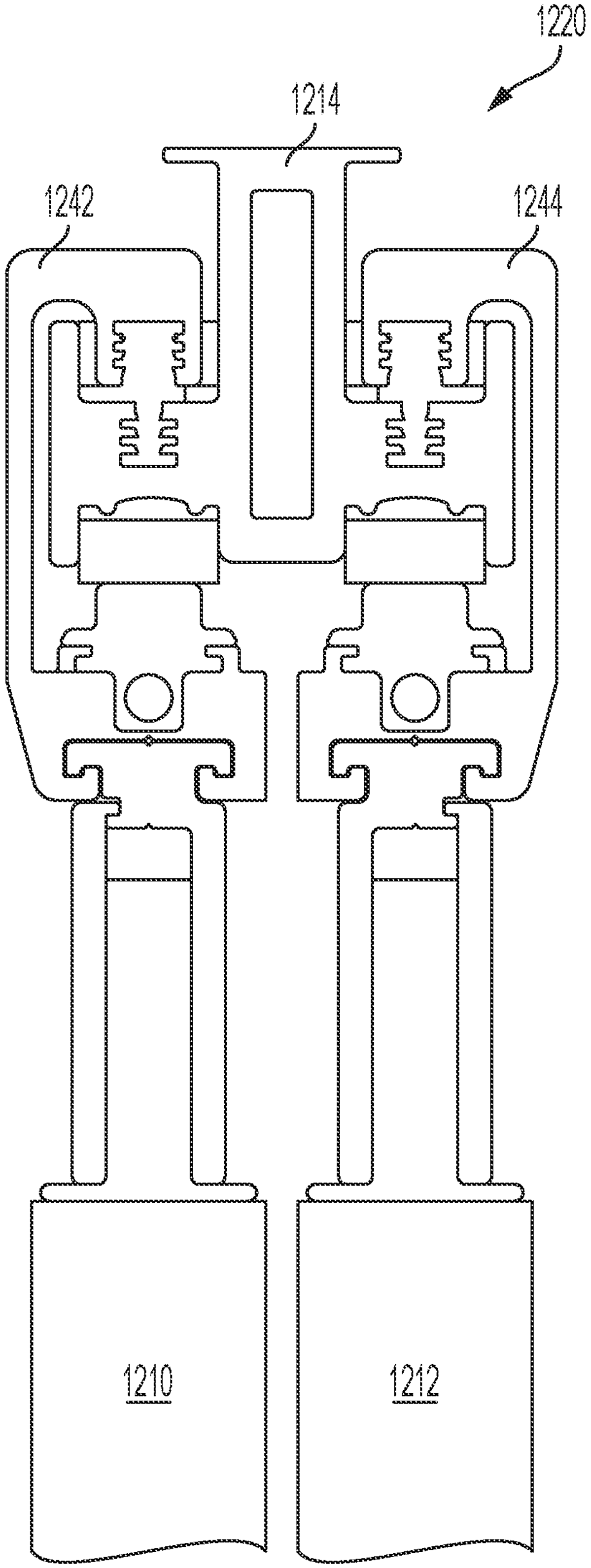
FIG. 66 is a fifteenth embodiment of the door.

Referring now to FIG. 66, a fifteenth embodiment of a door assembly of a shower 1220 is shown. In other examples, the door assembly may be utilized in other applications such as a room door. The fifteenth embodiment operates identical to the fourteenth embodiment shown in FIGS. 59-65 and discussed herein except as discussed below. FIG. 64 illustrates the door assembly of FIGS. 59-63 mirrored about a horizontal axis extending out of the page and parallel to the length 1174 of the track 1114. A track 1214 may have a track identical to the track 1114 and a track that mirrors the track 1114 about the horizontal axis as a single conjugate structure. There may be two doors 1210, 1212 each attached to the track 1214 with two brackets 1242, 1244, respectively, which are identical to bracket 1142 (see FIGS. 59-63). The doors 1210, 1212 may slide independently from each other since brackets 1242, 1244 move on separate but parallel lanes of the track 1214. The brackets 1242, 1244 and thus the doors 1210, 1212 may be spaced away from each other so that the doors 1210, 1212 may slide without rubbing or hitting each other. The doors 1210, 1212 may cover a wider opening when moved in an opposite direction from each other along the track 1214. The magnets of each bracket and track pair (not shown for clarity) may be spaced away from each other. The spacing may prevent the magnetic fields of each bracket and track pair from impacting each other in a way that disturbs the doors 1210, 1212 from being levitated and slid across the track 1214.

The various aspects and embodiments described herein are directed to a magnetic levitation door and illustrated by way of a shower door. However, the various aspects and embodiments of the magnetic levitation door may be incorporated into a sliding screen door, sliding patio door, horizontally sliding window or any other door or opening with a panel that that horizontally slides to open and close the opening. The door in any of the embodiments can be any type of material or configuration. By way of example and not limitation, the door can be fabricated from wood, metal, plastic, cloth, accordion panels. The door assembly in any of the embodiments can be attached or hung between two walls (e.g., see FIG. 1) or hung on the side with cleats or tongue and groove connections (e.g., see FIG. 53).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A cover assembly with a cover disposable in front of a cover opening and traversable between an open position and closed position, the cover assembly comprising:

the cover being slidable to the open and closed positions, the cover defining a length;

a bracket attached to the cover;

a first permanent magnet attached to the bracket, the first permanent magnet defining a length and a width and having north and south poles, the width being horizontally transverse to the length of the cover;

a guard attached to the bracket and extending out from an exterior surface of the bracket at a direction horizontally transverse to the length of the cover;

a track disposed adjacent to the cover opening, the bracket being slidably mounted to the track;

a second permanent magnet attached to the track and having north and south poles, the like poles of the first and second permanent magnets facing each other to repulsively lift an entire weight of the cover up, the second permanent magnet having a width horizontally transverse to the length of the cover, the second permanent magnet having a length greater than a length of the cover, the first and second permanent magnets being vertically aligned to each other; and at least one guide attached to the bracket, wherein vertical alignment and engagement between the bracket and the track is maintained as the cover is traversed between the open and closed positions, and the guard limits lateral movement of the first permanent magnet relative to the second permanent magnet.

2. The cover assembly of claim 1 wherein the bracket comprises first and second brackets disposed on either side of a vertical midline of the cover.

3. The cover assembly of claim 1 wherein the length of the second permanent magnet is greater than 80% of the length of the track.

4. The cover assembly of claim 1 wherein the second permanent magnet is a plurality of permanent magnets, each permanent magnet of the plurality of permanent magnets of the second permanent magnet having a length less than the length of the cover, and the plurality of permanent magnets collectively having a length greater than the length of the cover.

5. The cover assembly of claim 1 wherein the second permanent magnet is a single continuous permanent magnet or a plurality of permanent magnets positioned end to end to suspend the cover evenly as the cover is traversed between the open and closed positions.

6. The cover assembly of claim 1 wherein a repelling force of the first and second permanent magnets is equal to or less than a weight of the cover.

7. The cover assembly of claim 1 wherein the second permanent magnet width is greater or less than the first permanent magnet width.

8. The cover assembly of claim 1 wherein the guard and the at least one guide each have curved surfaces directly and slidably contacting the track.

9. The cover assembly of claim 1 wherein the cover assembly is a first cover assembly further comprising a second cover assembly mirroring the first cover assembly about a vertical plane and the cover of the first cover assembly and the cover of the second cover assembly are slidable independent from each other.

10. The cover assembly of claim 1 wherein a magnetic field of the first permanent magnet is wider or narrower compared to a magnetic field of the second permanent.

11. The cover assembly of claim 1 wherein the second permanent magnet width being different than the first permanent magnet width.

12. The cover assembly of claim 1 wherein the first permanent magnet is a plurality of permanent magnets.

13. The cover assembly of claim 12 wherein some of the plurality of permanent magnets of the first permanent magnet are disposed on opposed sides of the cover so that the cover is balanced on the second permanent magnet.

14. A method of assembling a cover assembly with a cover disposable in front of a cover opening and traversable between an open position and a closed position, the method comprising the steps of:

providing the cover being slidable to the open and closed positions after assembly of the cover assembly, the cover defining a length;

providing a bracket attachable to the cover;

providing a first permanent magnet, the first permanent magnet defining a path as the cover slides between the open and closed positions;

providing a guard attachable to the bracket;

providing a track disposable adjacent to the cover opening, the bracket being slidably mountable to the track, the track having a recess along a length of the track;

providing a second permanent magnet attachable to the track, the second permanent magnet having a length greater than a length of the cover, the first and second permanent magnets vertically alignable to each other;

providing at least one guide attachable to the bracket;

attaching the first permanent magnet to the bracket;

attaching the guard to the bracket;

disposing the track adjacent to the cover opening;

attaching the at least one guide to the bracket along the path of a moving first permanent magnet;

slidably mounting the bracket to the track, the track being in direct contact with the guard and the at least one guide;

vertically aligning the first and second permanent magnets to each other with like poles of the first and second permanent magnets facing each other, strengths of the first and second permanent magnets being sufficiently strong to repulsively lift an entire weight of the cover; and disposing the first and second permanent magnets vertically above each other, the guard limiting lateral movement of the first permanent magnet relative to the second permanent magnet such that the cover is repulsively lifted.

15. The method of claim 14 wherein the second permanent magnet is a plurality of permanent magnets, each permanent magnet of the plurality of permanent magnets of the second permanent magnet having a length less than the length of the cover, and the plurality of permanent magnets collectively having a length greater than the length of the cover.

16. The method of claim 14 wherein the second permanent magnet is a single continuous permanent magnet or a plurality of permanent magnets positioned end to end to suspend the cover evenly as the cover is traversed between the open and closed positions.

17. The method of claim 14 wherein the providing the first permanent magnet step and the providing the second permanent magnet step include the step of providing the first permanent magnet with a magnetic field wider or narrower than a magnetic field of the second permanent magnet.

18. The method of claim 14 wherein the first permanent magnet is a plurality of permanent magnets.

19. The method of claim 18 wherein some of the plurality of permanent magnets of the first permanent magnet are disposed on opposed sides of the cover so that the cover is balanced on the second permanent magnet.

20. The method of claim 14 wherein the second permanent magnet width is different than the first permanent magnet width.

* * * * *